US011354477B1

(12) United States Patent
Ahuja et al.

(10) Patent No.: US 11,354,477 B1
(45) Date of Patent: Jun. 7, 2022

(54) SYSTEM AND METHOD FOR PERFORMANCE ESTIMATION FOR ELECTRONIC DESIGNS USING SUBCIRCUIT MATCHING AND DATA-REUSE

(71) Applicant: Cadence Design Systems, Inc., San Jose, CA (US)

(72) Inventors: Jasleen Kaur Ahuja, New Delhi (IN); Taranjit Singh Kukal, Delhi (IN); Vikrant Khanna, Noida (IN); Nikhil Gupta, New Delhi (IN); Rohit Shukla, Noida (IN); Kunal Gupta, Shahpura Jaipur (IN); Charu Kapoor, Uttar Pradesh (IN)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 17/143,371

(22) Filed: Jan. 25, 2021

(51) Int. Cl.
  *G06F 30/00* (2020.01)
  *G06F 30/392* (2020.01)
  *G06F 30/3953* (2020.01)
  *H01F 27/06* (2006.01)

(52) U.S. Cl.
  CPC ........ *G06F 30/392* (2020.01); *G06F 30/3953* (2020.01); *H01F 2027/065* (2013.01); *H05K 2201/10* (2013.01)

(58) Field of Classification Search
  CPC ............... G06F 30/392; G06F 30/3953; H01F 2027/065; H05K 2201/10
  See application file for complete search history.

(56) References Cited

U.S. PATENT DOCUMENTS

| | | | | |
|---|---|---|---|---|
| 6,330,705 B1 * | 12/2001 | Matsushita | .......... | H05K 3/0005 716/112 |
| 6,587,989 B2 * | 7/2003 | Rosenbaum | ............ | G06F 30/39 716/102 |
| 7,444,612 B2 * | 10/2008 | Ariyama | ................. | G06F 30/39 716/100 |
| 7,784,011 B2 * | 8/2010 | Kato | ...................... | G06F 30/34 716/102 |
| 7,913,220 B2 * | 3/2011 | Kato | ...................... | G06F 30/34 716/137 |
| 8,438,524 B1 * | 5/2013 | Kohli | ...................... | G06F 30/39 716/120 |
| 8,769,466 B2 * | 7/2014 | Baba | ..................... | G06F 30/392 716/122 |

(Continued)

*Primary Examiner* — Naum Levin
(74) *Attorney, Agent, or Firm* — Mark H. Whittenberger, Esq.; Holland & Knight LLP

(57) ABSTRACT

Embodiments include herein are directed towards a method for use in an electronic design environment is provided. Embodiments may include receiving a printed circuit board schematic and one or more electronic circuits. Embodiments may further include automatically generating, one or more circuit templates based upon, at least in part, the printed circuit board schematic and one or more electronic circuits. The one or more circuit templates may be stored at an electronic design database. Embodiments may also include receiving a current printed circuit board schematic and automatically determining whether a subcircuit of the current printed circuit board schematic is an exact or approximate match with the one or more circuit templates.

20 Claims, 64 Drawing Sheets

(56) References Cited

U.S. PATENT DOCUMENTS

| | | | | |
|---|---|---|---|---|
| 9,015,647 | B2* | 4/2015 | Suiter | G06F 30/39 |
| | | | | 716/137 |
| 9,348,960 | B1* | 5/2016 | Ginetti | G06F 30/20 |
| 10,043,222 | B1* | 8/2018 | Bromley | G06Q 50/04 |
| 10,285,276 | B1* | 5/2019 | Kukal | G06F 30/392 |
| 10,467,370 | B1* | 11/2019 | Kukal | H05K 3/0005 |
| 10,714,885 | B2* | 7/2020 | Sugiyama | H05K 1/181 |
| 2016/0246914 | A1* | 8/2016 | Sun | G06F 30/367 |
| 2016/0378900 | A1* | 12/2016 | Okubo | G06F 30/394 |
| | | | | 716/119 |

* cited by examiner

FIG. 39
(Continued)

| Components and Nets | N1 | N2 | N3 | N4 | N5 | N6 | N7 | N8 | Critical Components |
|---|---|---|---|---|---|---|---|---|---|
| Q1 | - | - | 3 | 13 | 11 | - | - | - | 1 |
| Q2 | - | - | 3 | - | - | 11 | - | 13 | 1 |
| Q3 | 7 | - | - | - | 85 | - | - | - | 1 |
| Q4 | 7 | - | - | - | 17 | 5 | - | - | 1 |
| Q5 | - | - | - | - | - | 13 | 11 | 3 | 1 |
| R6 | - | 2 | 2 | - | - | - | - | - | 0 |
| R7 | - | 2 | - | - | - | - | - | 2 | 0 |
| Interface net | 0 | 0 | 0 | ① | 0 | 0 | ② | 0 | |
| Power type | 1 | ① | 0 | ② | 0 | 0 | 0 | 0 | |

FIG. 43

```
* Source netlist for subcircuit1
.LIB "stress.lib"
.OPTIONS ADVCONV                        Simulation settings
.AUTOCONVERGE ITL1=1000 ITL2=1000 ITL4=1000 RELTOL=0.05
ABSTOL=1.0E-6 VNTOL=0.001 PIVTOL=1.0E-10
.TEMP 27
.PARAM frequency=2meg
.PARAM var_r6=510
.PARAM var_r7=510
X_Q1 N5 N4 N3 npnstress
R_ROPEN2_Q1 N4 0 10MEG
X_Q2 N6 N8 N3 npnstress
X_Q3 N5 N5 VCC pnpstress
X_Q4 N6 N5 VCC pnpstress
X_Q5 N7 N6 N8 npnstress              Load
R_RLOAD_Q5 N7 0 10MEG
R_R6 0 N3 var_r6
R_R7 0 N8 var_r7                     Stimulus
V_VSIN1 N4 0 SIN 0.5v 2meg
V_DC1 VCC 0 PWL(0 1.2)
.TRAN/OP 1ns {{ 10 / frequency }}
.PROBE64 V(alias(*)) I(alias(*)) W(alias(*)) D(alias(*)) NOISE(alias(*))
```

FIG. 44

SYSTEM AND METHOD FOR PERFORMANCE ESTIMATION FOR ELECTRONIC DESIGNS USING SUBCIRCUIT MATCHING AND DATA-REUSE

BACKGROUND

Design engineers may often desire to simulate an IC (integrated circuit) design within the context of a system design that spans across the IC design fabric, the package design fabric, and PCB (printed circuit board) design fabric. Today's PCBs are quite complicated running into many hundreds of pages and thousands of components with a mix of connectors, digital content and analog content and it is almost impossible to simulate such a circuit. Large PCB circuits cannot be simulated to estimate electrical overstress. Electrical stress generally refers to the measure of the component's operating conditions with respect to maximum ratings. It is necessary to simulate the circuit to estimate voltages and currents in the devices, which then can be post-processed to calculate power-dissipation, voltage-breakdowns and current-stress in the devices used in PCB circuit.

SUMMARY

In one or more embodiments of the present disclosure, a computer-implemented method for use in an electronic design environment is provided. The method may include receiving a printed circuit board schematic and one or more electronic circuits. The method may further include automatically generating, one or more circuit templates based upon, at least in part, the printed circuit board schematic and one or more electronic circuits. The one or more circuit templates may be stored at an electronic design database. The method may also include receiving a current printed circuit board schematic and automatically determining whether a subcircuit of the current printed circuit board schematic is an exact or approximate match with the one or more circuit templates.

One or more of the following features may be included. The method may include separating the current printed circuit board schematic into a plurality of simulateable circuits. The method may further include returning a matched template with one or more stimulus or load setup parameters. The parameters may also include at least one of input port information, output port information, stimulus type, load type, power nets, and type of power to be applied. The method may further include simulating the current printed circuit board schematic with the matched template. Automatically determining may be based upon, at least in part, a component candidate list and/or a net candidate list. The method may also include representing the one or more electronic circuits as a connection matrix and a netlist. The method may also include performing iterative filtering of at least one of the component candidate list and the net candidate list. The method may further include automatically adding a new subcircuit from the current printed circuit board schematic to the electronic design database.

In one or more embodiments of the present disclosure a computer-readable storage medium having stored thereon instructions, which when executed by a processor result in one or more operations is provided. Operations may include receiving a printed circuit board schematic and one or more electronic circuits. Operations may further include automatically generating, one or more circuit templates based upon, at least in part, the printed circuit board schematic and one or more electronic circuits. The one or more circuit templates may be stored at an electronic design database. Operations may also include receiving a current printed circuit board schematic and determining whether a subcircuit of the current printed circuit board schematic is an exact or approximate match with the one or more circuit templates.

One or more of the following features may be included. Operations may include separating the current printed circuit board schematic into a plurality of simulateable circuits. Operations may further include returning a matched template with one or more stimulus or load setup parameters. The parameters may also include at least one of input port information, output port information, stimulus type, load type, power nets, and type of power to be applied. The method may further include simulating the current printed circuit board schematic with the matched template. Determining may be based upon, at least in part, a component candidate list and/or a net candidate list. Operations may also include representing the one or more electronic circuits as a connection matrix and a netlist. Operations may also include performing iterative filtering of at least one of the component candidate list and the net candidate list. Operations may further include automatically adding a new subcircuit from the current printed circuit board schematic to the electronic design database.

In one or more embodiments of the present disclosure, a system for use in an electronic design environment is provided. The system may include at least one processor configured to receive a printed circuit board schematic and one or more electronic circuits. The at least one processor may be further configured to automatically generate one or more circuit templates based upon, at least in part, the printed circuit board schematic and one or more electronic circuits. The at least one processor may be further configured to store the one or more circuit templates at an electronic design database. The at least one processor may be further configured to receive a current printed circuit board schematic and automatically determine whether a subcircuit of the current printed circuit board schematic is an exact or approximate match with the one or more circuit templates.

One or more of the following features may be included. The at least one processor may be further configured to separate the current printed circuit board schematic into a plurality of simulateable circuits.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 43 illustrates an example showing a matrix consistent with embodiments of automatic simulation process;

FIG. 44 illustrates an example showing example of code consistent with embodiments of automatic simulation process;

DETAILED DESCRIPTION

Various embodiments are directed to a method, system, and computer program product for computing electrical over-stress in an electronic design. In some embodiments, the present disclosure may allow for the determination of electrical over-stress of devices on a PCB using transient simulations of automatically partitioned circuits. Other objects, features, and advantages of the invention are described in the detailed description, figures, and claims.

Various embodiments of the methods, systems, and articles of manufacture will now be described in detail with reference to the drawings, which are provided as illustrative examples of the invention so as to enable those skilled in the art to practice the invention. Notably, the figures and the examples below are not meant to limit the scope of various embodiments, unless otherwise specifically described in particular embodiment(s) or recited in the claim(s). Where certain elements of embodiments may be partially or fully implemented using known components (or methods or processes), portions of such known components (or methods or processes) that are necessary for an understanding of the present invention will be described, and the detailed descriptions of other portions of such known components (or methods or processes) will be omitted for ease of explanation and to not obscure embodiments of the invention. Further, embodiments encompass present and future known equivalents to the components referred to herein by way of illustration. More details about various processes or modules to implement various embodiments are further described below with reference to FIGS. 1-29.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Figure 1A:
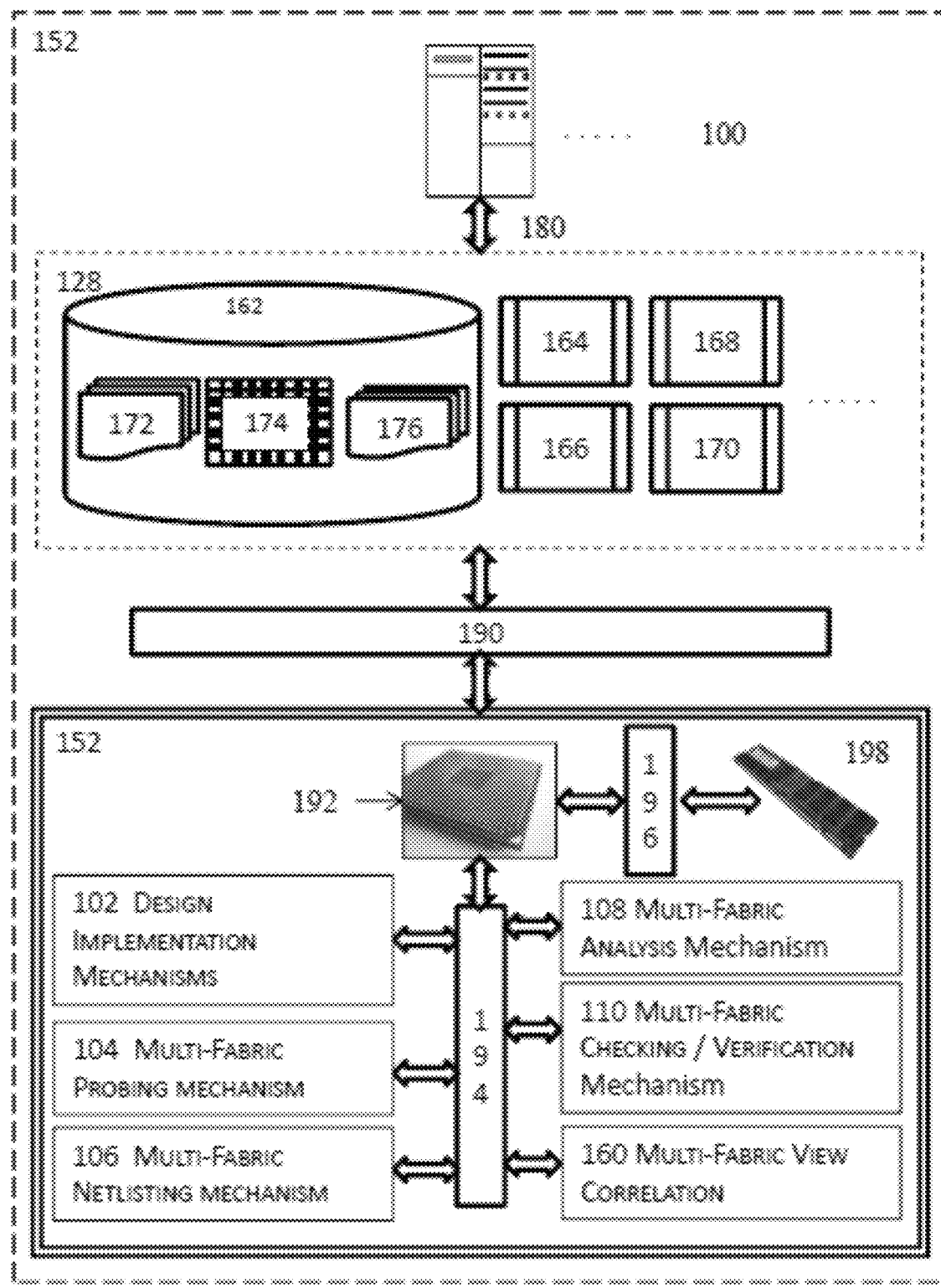
FIG. 1A illustrates a high level schematic block diagram for power-grid aware simulation of an IC-Package schematic in one or more embodiments.

FIG. 1A illustrates a high level schematic block diagrams for computing electrical over-stress of one or more devices in one or more embodiments. More specifically, FIG. 1A illustrates an illustrative high level schematic block diagrams for computing electrical over-stress and may comprise one or more computing systems 100, such as a general purpose computer described in the System Architecture Overview section to implement one or more special purposes.

In some embodiments, the one or more computing systems 100 may invoke various system resources such as the processor(s) or processor core(s), memory, disks, etc. The one or more computing systems 100 may also initiate or interact with other computing systems to access, via a computer bus architecture (e.g., a system bus, a control bus, a data bus, or any combinations thereof), various resources 128 that may comprise a floorplanner, a global routing engine, and/or a detail routing engine 164, a layout editor 166, a design rule checker 168, a verification engine 170, etc.

The one or more computing systems 100 may further write to and read from a local or remote non-transitory computer accessible storage 162 that stores thereupon data or information such as, but not limited to, one or more databases (174) such as schematic design database(s) or physical design database(s), electronic circuit design specification database(s), various statistics, various data, rule decks, various design rules, constraints, etc. (172), or other information or data (176) that may be used to facilitate the performance of various functions to achieve the intended purposes.

In some embodiments, the one or more computing systems 100 may include or, either directly or indirectly through the various resources 128, invoke a set of mechanisms 152 including hardware mechanisms and software modules or combinations of one or more hardware mechanisms and one or more software modules that may comprises a plurality of design implementation modules 102 (e.g., schematic design tool, layout tool, etc.) to insert, remove, modify, improve, optimize, or otherwise operate upon designs in different fabrics (e.g., the die design fabric, the integrated circuit or IC packaging design fabric, the printed circuit board or PCB design fabric, the test bench design fabric, etc.), one or more multi-fabric probing modules 104 to probe multi-fabric designs across multiple design fabrics.

The set of mechanisms 152 may further optionally include one or more multi-fabric netlisting modules 106 to netlist multi-fabric designs across multiple design fabrics, one or more multi-fabric analysis modules 108 to simulate or analyze multi-fabric design across multiple design fabrics, one or more check or verification modules 110 to check or verify the correctness of multi-fabric designs across multiple design fabrics, and one or more multi-fabric view correlation modules 160 to correlate various symbolic views, schematic views, and/or layout views with the schematic design data or the layout data in different design fabrics at various hierarchical levels, etc.

In some embodiments, the computing system 100 may include the various resources 128 such that these various resources may be invoked from within the computing system via a computer bus 180 (e.g., a data bus interfacing a microprocessor 192 and the non-transitory computer accessible storage medium 198 or a system bus 190 between a microprocessor 192 and one or more engines in the various resources 128). In some other embodiments, some or all of these various resources may be located remotely from the computing system 100 such that the computing system may access the some or all of these resources via a computer bus 180 and one or more network components.

The computing system may also include one or more mechanisms in the set of mechanisms 152. One or more mechanisms in the set 152 may include or at least function in tandem with a microprocessor 192 via a computer bus 194 in some embodiments. In these embodiments, a single microprocessor 192 may be included in and thus shared among more than one mechanism even when the computing system 100 includes only one microprocessor 192. A microprocessor 192 may further access some non-transitory memory 198 (e.g., random access memory or RAM) via a system bus 196 to read and/or write data during the microprocessor's execution of processes.

Figure 1B:
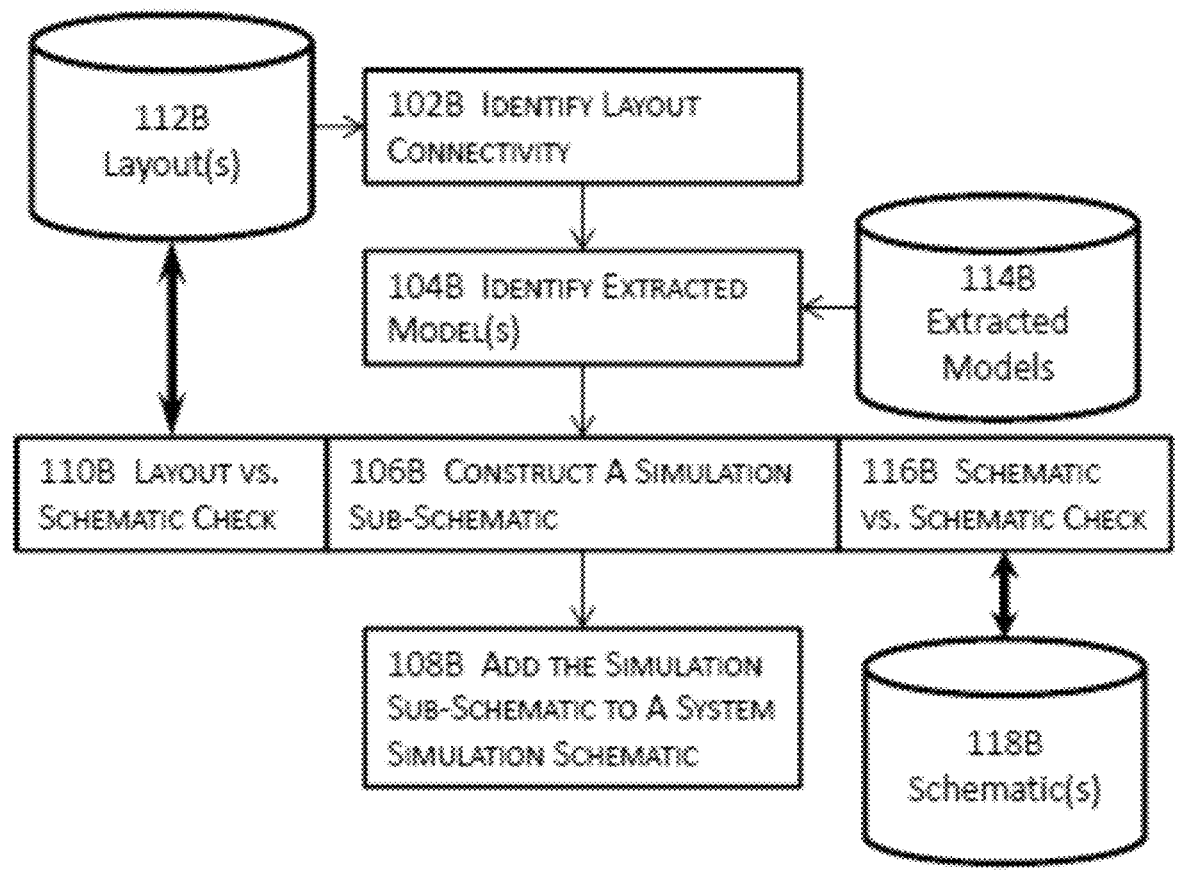
FIG. 1B illustrates another high level schematic block diagrams for power-grid aware simulation of an IC-Package schematic in one or more embodiments.

FIG. 1B illustrates another high level schematic block diagrams for computing electrical over-stress of one or more devices in one or more embodiments. In these embodiments, one or more layouts 112B may be identified from one or more non-transitory computer readable storage media or devices. These one or more layouts may include one or more integrated circuit (IC) layouts, one or more IC package layouts for the one or more IC layouts, and/or a printed circuit board (PCB) layout, etc.

Layout connectivity may be identified or extracted at 102B from these one or more layouts 112B, and the extracted layout connectivity may be used to interconnect various models in the simulation schematic. One or more extracted models may be identified at 104B from a list of extracted models 114B obtained from the same electronic design or one or more prior electronic designs.

It shall be noted that various schematics may or may not necessarily exist in these one or more embodiments illustrated in FIG. 1B. Existing schematic symbols or models may be leveraged such that extracted models need not be constructed every time they are needed in a simulation schematic. A schematic cellview symbol or model may be used directly as an extracted model in a simulation schematic in some embodiments or may be annotated, stitched, or associated with parasitic data to form an extracted model in some other embodiments.

In some embodiments where one or more schematic designs (e.g., the schematic of a PCB design, the schematic of an IC package, the schematic of an IC design, etc.) do exist, the schematic models or cellview symbols for circuit component designs in a plurality of design fabrics may thus be extracted from the respective schematic designs and imported as the extracted models into the simulation schematic. In some embodiments, a schematic cellview symbol or model may further be annotated or stitched with parasitic data and stored as an extracted model in a central repository.

These one or more schematic designs may or may not necessarily be in a format that is compatible or recognizable by the native editor of a simulation schematic. Schematic cellview symbols or models from these one or more schematic designs may be imported as extracted models into a simulation schematic via transformation in some embodiments or may be constructed anew and stored in a central repository in some other embodiments.

In some other embodiments where the schematic designs are unavailable or incomplete such that some circuit component designs extracted from one or more layouts (e.g., an IC layout, an IC package layout, a PCB layout, etc.) do not correspond to any existing schematic models or cellview symbols that may be used in simulation schematics, the extracted models for these layout circuit component designs may be constructed anew.

An extracted model includes a simplified model to represent one or more layout circuit component designs in a simulation schematic in some embodiments. In some of these embodiments, an extracted model is placeable in a simulation schematic and includes model connectivity information (e.g., net names, port names, pin names, etc.) that may be used to interconnect the extracted model to one or more other models or external circuitry in the simulation schematic. For example, extracted models may be interconnected by straight or rectilinear flight-lines in some embodiments.

An extracted model may be constructed anew for a layout circuit component (e.g., an instance of a cell or block) and include a flat or a hierarchical structure of multiple hierarchies or a plurality of circuit components. For example, it may be determined that a circuit component design extracted from a layout does not correspond to any existing extracted models.

In some embodiments, an extracted model may be constructed by using a corresponding schematic cellview symbol or model from the schematic design (if available) or from a schematic cellview symbol data structure. For example, various techniques may first examine a schematic symbol cellview data structure (e.g., a list, a table, a database, etc.) to determine whether a schematic cellview symbol exists for the circuit component design. If an existing schematic cellview symbol exists for the circuit component design based on, for example, the type, identification, function, and/or connectivity, etc. of the circuit component design, the schematic cellview symbol may be retrieved from the schematic cellview symbol data structure to represent the layout circuit component.

The schematic cellview symbol may be further associated with other data (e.g., the identifications of ports for interconnection, the identifications of the layer, the instance, the hierarchy, etc.) specific to this particular circuit component to represent this particular circuit component in simulation schematics. In some other embodiments where no schematic cellview symbols or models correspond to the circuit component design extracted from the layout, a new schematic cell view symbol may be constructed anew with a native schematic editor that is capable of natively editing the simulation schematics in one or more design fabrics.

In some of these embodiments, an extracted model may include a geometric entity (e.g., a rectangle) that has any shape or size and is placeable in a simulation schematic or in the schematic design corresponding to the layout from which the circuit design component is extracted. In some other embodiments, an extracted model may include a geometric entity (e.g., a rectangle) that exactly, approximately, or proportionally represents the actual geometries of the circuit component (or circuit components).

These existing and newly constructed extracted models may thus be used to construct a simulation schematic at 106B for the electronic design that spans across multiple design fabrics. One or more layout versus schematic checks may be performed at 110B on the layouts 112B and the simulation schematic determined at 108B to determine whether the simulation schematic determined at 108B correctly corresponds to the layouts of the electronic design in these multiple design fabrics. In some embodiments where at least some schematic designs 118B are available, one or more schematic versus schematic checks may also be performed at 118B on these at least some schematics and the simulation schematic to determine whether the constructed simulation schematic correctly corresponds to these at least some schematics 118B.

The simulation schematic may be incrementally constructed and added as a simulation sub-schematic to a system simulation schematic at 108B. For example, an IC layout may be identified; circuit design components may be extracted from the identified IC layout; extracted models may be identified or constructed anew for these IC layout circuit design components; the simulation sub-schematic for the IC layout may be constructed with these extracted models; and the simulation sub-schematic may be incrementally constructed into a system simulation schematic (e.g., a system simulation schematic for a PCB design including the IC design).

Figure 1C:
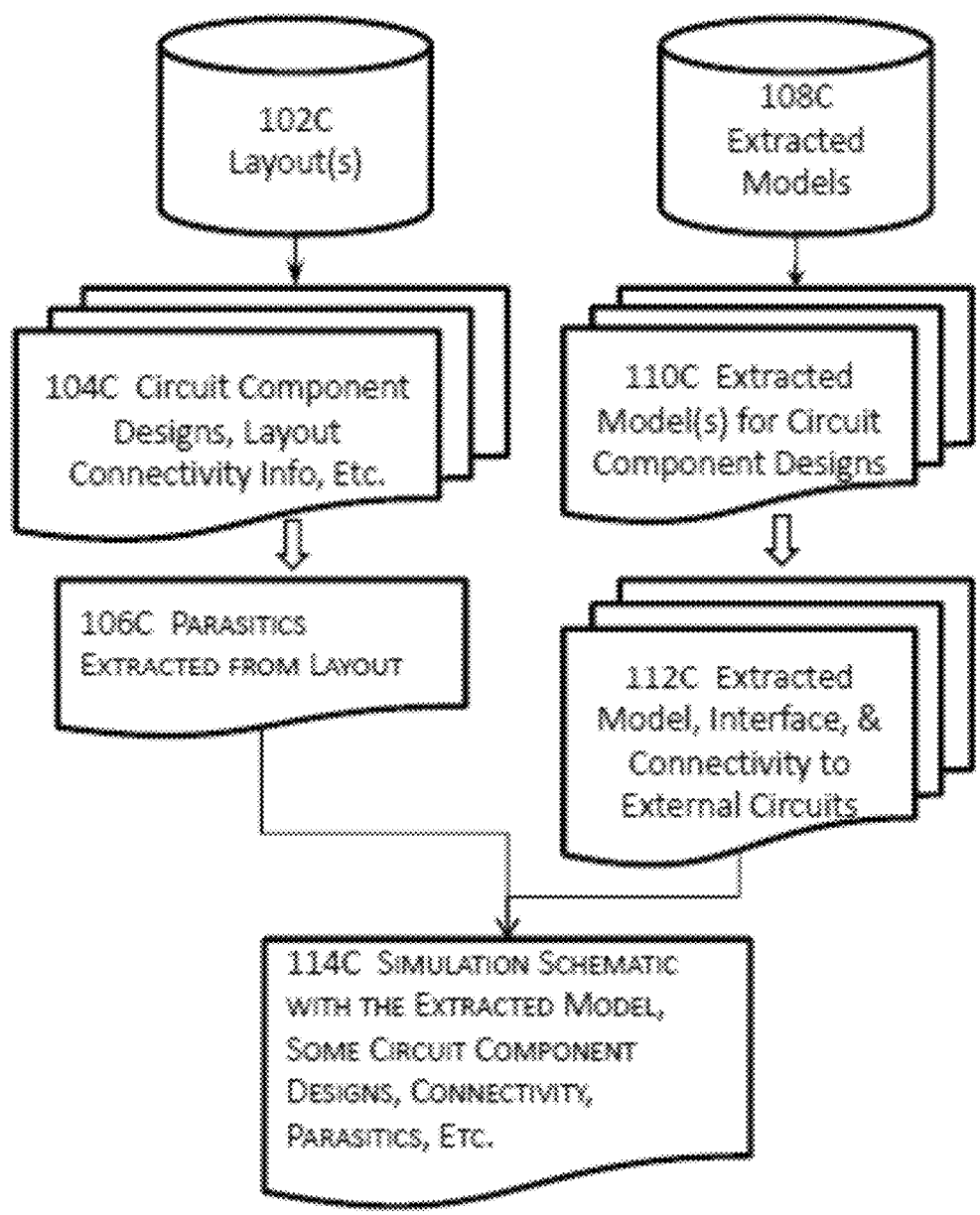
FIG. 1C illustrates another high level schematic block diagrams for power-grid aware simulation of an IC-Package schematic in one or more embodiments.

FIG. 1C illustrates another high level schematic block diagrams for determining electrical over-stress in one or more embodiments. In these embodiments, one or more layouts (e.g., one or more IC layouts, one or more IC package layouts corresponding to the one or more IC layouts, a PCB layout, etc.) may be identified from a non-transitory computer accessible store medium or device 102C; and existing extracted models corresponding to respective layout circuit components may be retrieved from an extracted model data structure 108C in the same or a different non-transitory computer accessible store medium or device. Circuit component designs and layout connectivity information for interconnecting among these circuit component designs and external circuitry 104C may be extracted from the one or more layouts 102C. Parasitic data 106C may also be extracted from these one or more layouts 102C.

If extracted models 108C exist for at least some circuit component designs in the one or more layout 102C, these extracted models 110C may be retrieved from the extracted model data structure 108C. These existing extracted models, their respective interface information (e.g., the names of the ports, the names of nets connected to the interface, etc.), and/or connectivity information to external circuitry of an extracted model 112C may be identified. In some embodiments, these extracted models themselves may already include or be associated with parasitics and connectivity information.

These existing extracted models for some layout circuit component designs together with newly constructed extracted models for other layout circuit component designs for which no extracted models exist may be placed into a simulation schematic 114C. For example, a layout may include circuit component designs L1, C1, R2, Q4, U1, U2, and L7, where existing extracted models are determined to be available for layout circuit component designs C1, R2, and L7. In this example, the simulation schematic for this layout may include the existing extracted models for C1, R2, and L7 as well as newly constructed extracted models for L1, Q4, U1, and U2.

Figure 1D:
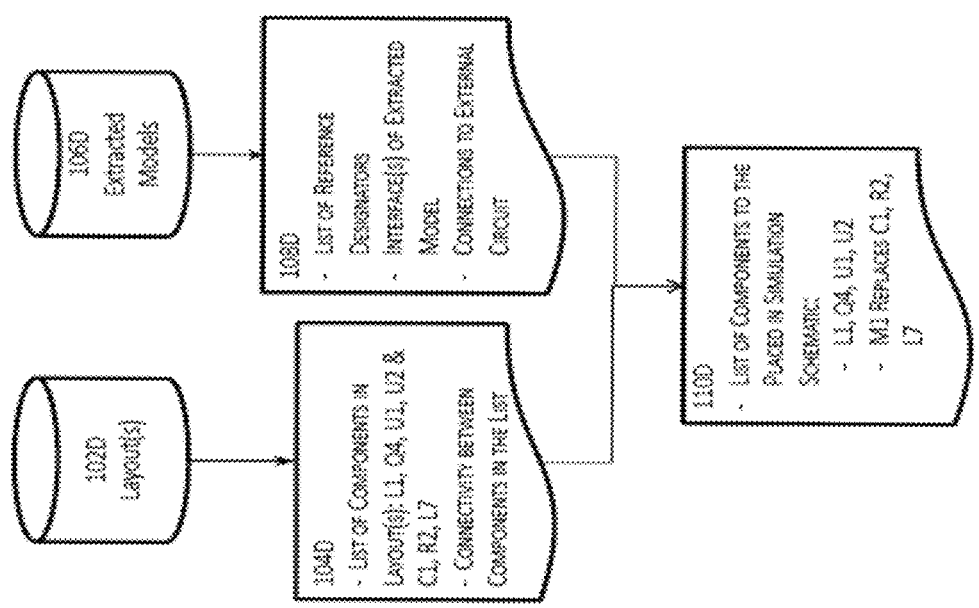
FIG. 1D illustrates an example of determining a list of circuit component designs to place in a simulation schematic in one or more embodiments.

This example is further illustrated in FIG. 1D which illustrates an example of determining a list of circuit component designs to place in a simulation schematic in one or more embodiments. From the layout 102D, a list of circuit component designs 104D in the layout (e.g., L1, Q4, U1, U2, C1, R2, and L7) may be obtained from the layout 102D. In addition, the connectivity between these circuit component designs in the list may also be determined and added to 104D. As described above, an extracted model M1 already exists for the circuit component designs C1, R2, and L7 and may be retrieved from a data structure or database 106D including extracted models. A list of reference designators and the interfaces for the extracted models (e.g., M1) may also be retrieved from the data structure or database 106D. The connectivity information of an extracted model (e.g., M1) may also be retrieved from the data structure or database 106D of extracted models. With the list of components and the connectivity from 104D and the list of reference designators and the interface and connectivity for the extracted model (M1), a list of components or models to be placed in the corresponding simulation schematic 110D may be determined. In this example, the simulation schematic 110D may include the circuit component designs or the schematic symbols or models thereof for L1, Q4, U1, and U2 that do not correspond to any extracted models. The simulation schematic may further include the extracted model M1 that is to replace the circuit component designs (or the schematic symbols or models thereof) for circuit component designs C1, R2, and L7. In some embodiments, an extract model (e.g., M1 in this example illustrated in FIG. 1D) may include, for example, an s-parameter (scattering-parameter) model.

In some embodiments where individual extracted models may not be available or exist, but an aggregated extracted model may nevertheless exist for a plurality of interconnected circuit component designs. In these embodiments, the aggregated extracted model may be identified and used to represent the plurality of interconnected circuit component designs in simulation schematics. In the aforementioned example where no extracted models exist for layout circuit components L1, Q4, U1, and U2, but an aggregated extracted model nevertheless exists and includes these layout circuit components L1, Q4, U1, and U2.

In this example, the aggregated extracted model together with the data of its interface to external circuits, rather than individual extracted models for L1, Q4, U1, and U2, may be used in a simulation schematic in some embodiments. In some embodiments, all the circuit component designs may be first added to a placement list. For a circuit component that corresponds to an existing extracted model, the existing extracted model may be placed in the simulation schematic. For another circuit component design for which no existing extracted models exist, a new extracted model may be constructed and placed into the simulation schematic.

It shall be noted that various techniques described herein do not require schematic designs to perform their intended functions to achieve their intended purposes although elements (e.g., schematic model or cellview symbols, connectivity, etc.) of schematic designs, regardless of whether these schematic designs are complete or partial, may nevertheless be used to reduce the computational resources and/or time needed to constructed a simulation schematic for an electronic design across multiple design fabrics in some embodiments.

A schematic model may include a schematic symbol and connectivity information for interconnecting the schematic symbol to external circuitry. The identified schematic models may be stored in a data structure such as a list, a table, a database, etc. For the ease of explanation or description, the data structure includes and will be referred to as a placement list although other types of data structures may also be used.

Schematic models, like schematic designs, may have the same format or different formats. For example, a PCB schematic design or a PCB schematic model therein may have a different format than an IC schematic design or an IC schematic model therein. In some embodiments, schematic models in different formats may be transformed into a format that is recognized by a native schematic editing tool in one of the multiple design fabrics. For example, PCB schematic models in a first format and IC package schematic models in a second format may be transformed into another format recognizable by an IC schematic editor. In some other embodiments, a new schematic model may be constructed for a schematic model in a different format.

In some embodiments, extracted models may be retrieved from existing sources or constructed anew for layout circuit designs in the layout. An extracted model includes a simplified model having a geometric entity to represent one or more layout circuit component designs in a simulation schematic in some embodiments. In some of these embodiments, an extracted model is placeable in a simulation schematic and includes model connectivity information (e.g., net names, port names, pin names, etc.) that may be used to interconnect the extracted model to one or more other models or external circuitry in the simulation schematic. These extracted models may also be stored in a data structure such as the aforementioned placement list.

In some embodiments, a simulation schematic may be constructed by placing the extracted models into the simulation schematic and further by interconnecting the extracted models with connectivity information extracted from the layout. In some embodiments where schematic cellview symbols or models are also identified for one or more layout circuit components that correspond to no extracted models or aggregated models, the schematic cellview symbols or models may also be placed in the simulation schematic. In addition or in the alternative, parasitic data extracted from the layout may also be stitched into or associated with the corresponding schematic cellview symbols or models or may be placed into the simulation schematic if these schematic cellview symbols or models are also placeable.

In some embodiments, the electronic design includes at least one PCB design having one or more IC package designs interconnected together and encompassing the one or more corresponding IC designs. A schematic model may include an object that includes a schematic symbol, some connectivity information for interconnecting the schematic model to external circuitry, and parasitic information in some embodiments. In some other embodiments, a schematic model may include a schematic cellview symbol or model that is retrieved from a schematic cellview data structure storing therein a plurality of schematic cellview symbols each having one or more parameters awaiting their corresponding one or more values to determine the characteristics or attributes of a specific circuit component that is represented by the schematic cellview symbol or model in a schematic design.

In some embodiments, the schematic cellview symbol or model for a particular layout circuit component may be elaborated by identifying the one or more corresponding parameter values such as names or identifications of the schematic circuit component design represented by the symbol, nets, ports, pins, layer(s), instance(s), etc., interface or interfaces, connectivity information for interconnecting the interface or interfaces to external circuits, or any other information suitable for creating a schematic cellview symbol or model to uniquely represent one or more such schematic circuit component designs in a schematic design.

In some embodiments, layout circuit component designs may be extracted from one or more layouts of the electronic design spanning across multiple design fabrics. In some embodiments, these layout circuit components or information therefor (e.g., identifications of layout circuit component designs with pointers, link structures, or symbolic links to these layout circuit component designs) may be stored in a data structure such as a list, a table, a database, etc. such as a placement list.

One or more layout extracted models corresponding to the one or more identified layout circuit component designs may be retrieved or extracted from a non-transitory computer accessible storage medium or device. In some embodiments where no extracted models are available for certain layout circuit component designs, additional extracted models may be constructed anew for these certain layout circuit component designs. An extracted model includes a simplified model to represent one or more layout circuit component designs in a simulation schematic in some embodiments.

In some of these embodiments, an extracted model is placeable in a simulation schematic and includes model connectivity information (e.g., net names, port names, pin names, etc.) that may be used to interconnect the extracted model to one or more other models or external circuitry in the simulation schematic. In addition or in the alternative, an extracted model may further include parasitic information that is stitched into or associated with the elements (e.g., circuit components, traces, wires, interconnects, etc.), parasitic models encompassing the parasitic information, or a combination thereof.

In some embodiments, existing parasitic models indicative of parasitic information or data of one or more layout circuit components may be identified. A parasitic model may include an s-parameter or SPICE model that represents the R/L/C parasitics of the traces, interconnects, and/or metal structures in an electronic design. In some embodiments where parasitic models are unavailable for certain layout circuit component designs, new parasitic models may be constructed by extracting the corresponding parasitic information or data for these layout circuit component designs from the layout.

In some embodiments, connectivity may include, for example, how various circuit component designs in the PCB layout are connected, the terminal order and/or identifications of an interface of a circuit component design, and/or a mapping to a split symbol instances or nets, etc. in some embodiments. A testbench may be created at by updating the simulation schematic via cross-probing, updating parameter values, and/or modifying the underlying electronic design in some embodiments.

In some embodiments, a layout versus schematic check may be performed on the testbench created at by referencing the PCB layout in some embodiments to cross check the correctness of the testbench, the simulation schematic, and/or the PCB layout. In some embodiments where the PCB schematic is available, a schematic versus schematic check may also be performed on the simulation schematic or the testbench by referencing the PCB schematic to cross check the correctness of the testbench, the simulation schematic, and/or the PCB schematic.

In some embodiments, the testbench may be represented in a hierarchical structure at according to the hierarchical structure of the PCB design in some embodiments or in a flat structure having only one hierarchical level in some other embodiments. Simulations may be performed with the simulation schematic to generate simulation results including, for example, waveforms of signals, etc. In some embodiments where the PCB schematic is available, the PCB schematic may also be associated with the simulation results generated previously.

As used herein, the phrase "stimulus" may refer to a voltage signal applied as per device properties. The phrase "electrical stress" may refer to a measure of a given component's operating conditions with respect to maximum ratings. An "analog topology" may refer to a portion of a schematic that impacts the device under test. This portion if analyzed for simulations suffices the analysis of device for certain purposes like stress.

Figure 2:
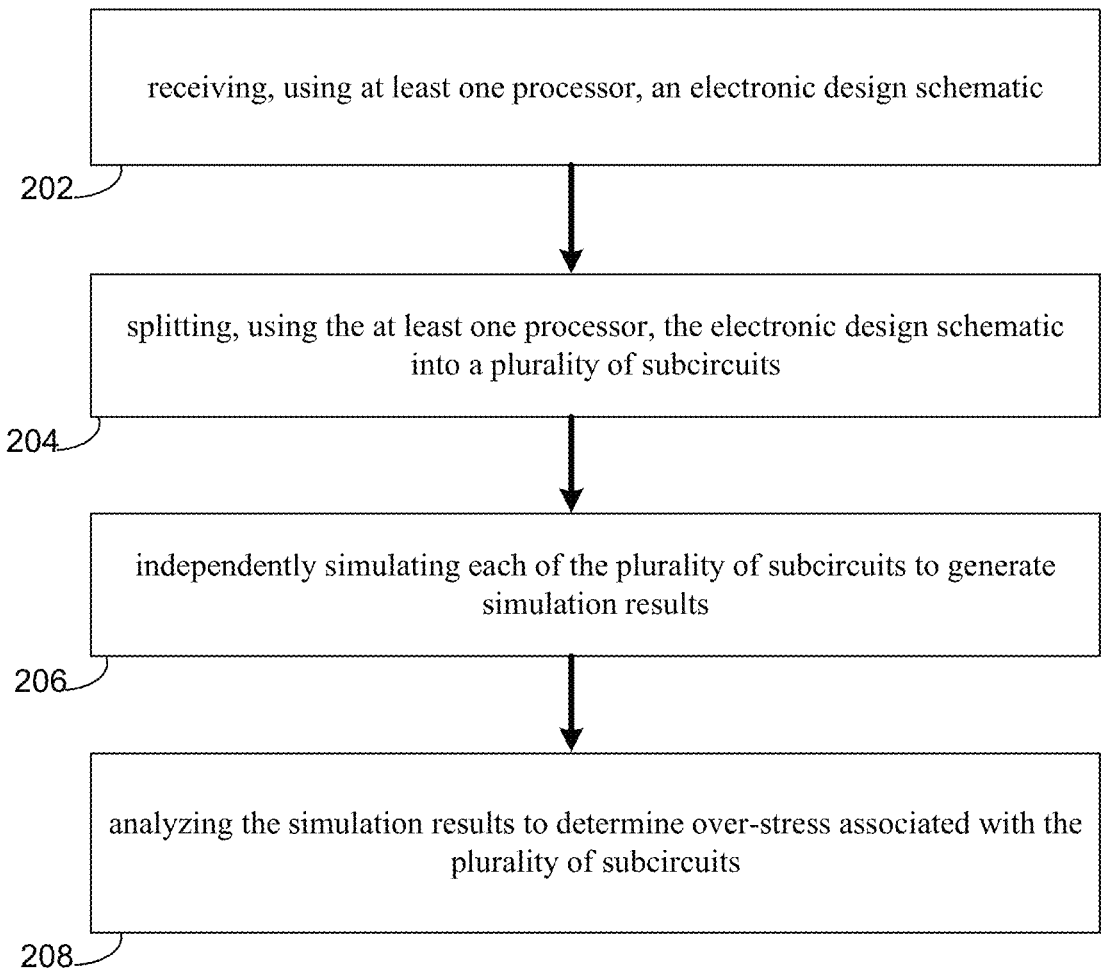
FIG. 2 illustrates a flowchart depicting operations consistent with embodiments of overstress identification process.

FIG. 2 illustrates a high-level flowchart that includes one or more operations that may be employed for use in an electronic design environment is provided. The method may include receiving (202), using at least one processor, an electronic design schematic and splitting (204), using the at least one processor, the electronic design schematic into a plurality of subcircuits. The method may further include independently simulating (206) each of the plurality of subcircuits to generate simulation results and analyzing (208) the simulation results to determine over-stress associated with the plurality of subcircuits.

Figure 3:
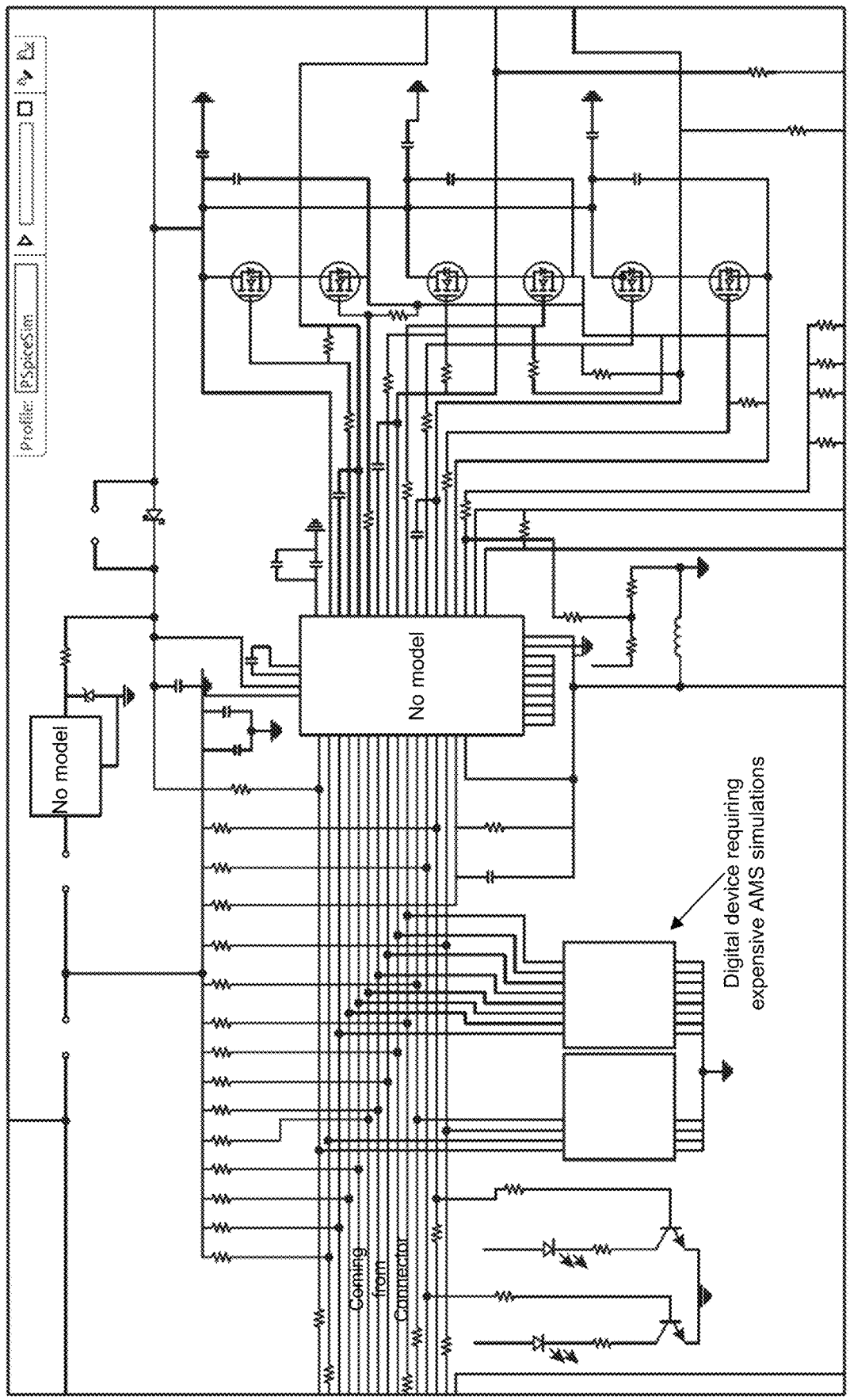
FIG. 3 illustrates an example of a circuit that cannot be simulated due to an absence of models.

Referring now to FIG. 3, an embodiment showing an example circuit using existing approaches is provided. In this example, the circuit cannot be simulated due to the absence of models. Existing approaches generally involve the manual creation of multiple small circuits. In these approaches, a sub-schematic may be manually created with appropriate stimulus to represent the interface of a sub-schematic with the rest of the system-schematic. It becomes cumbersome to create such circuits manually for 1000s of devices on a PCB-board. Some of these approaches utilize DC calculations and do not perform time-domain simulations. As such, this information lacks details such as ripple, signal and peaking. Other approaches utilize transient simulations, however then the user may need to simulate the complete circuit which is not possible for large PCBs.

Accordingly, embodiments of the present disclosure provide for the automatic extraction of small sub-circuits from a PCB design. These may be independently simulated for purposes of estimating figures of merit for a PCB. In some embodiments, the process may intelligently hook stimulus through the use of IO-technology of interface-pins. The term "hooking" as used herein, may refer to connecting the stimulus to a circuit for the purpose of simulation.

In some embodiments, the process may be configured to calculate stress analysis of PCB device, trace-thickness based on estimated transient currents, as well as creepage distances on a particular PCB. The term "creepage", as used herein, may relate to the distance between two conducting tracks on a PCB. This distance should be more than certain threshold to avoid spark-over from one trace to another due to a large voltage difference. The term "trace-thickness" generally refers to the width*height of a copper track made on a PCB in order to establish a connection. The term "stress" may imply electrical stress on a device or a connecting track due to high current, voltage, power-dissipation, temperature-rise etc.

Figure 4:
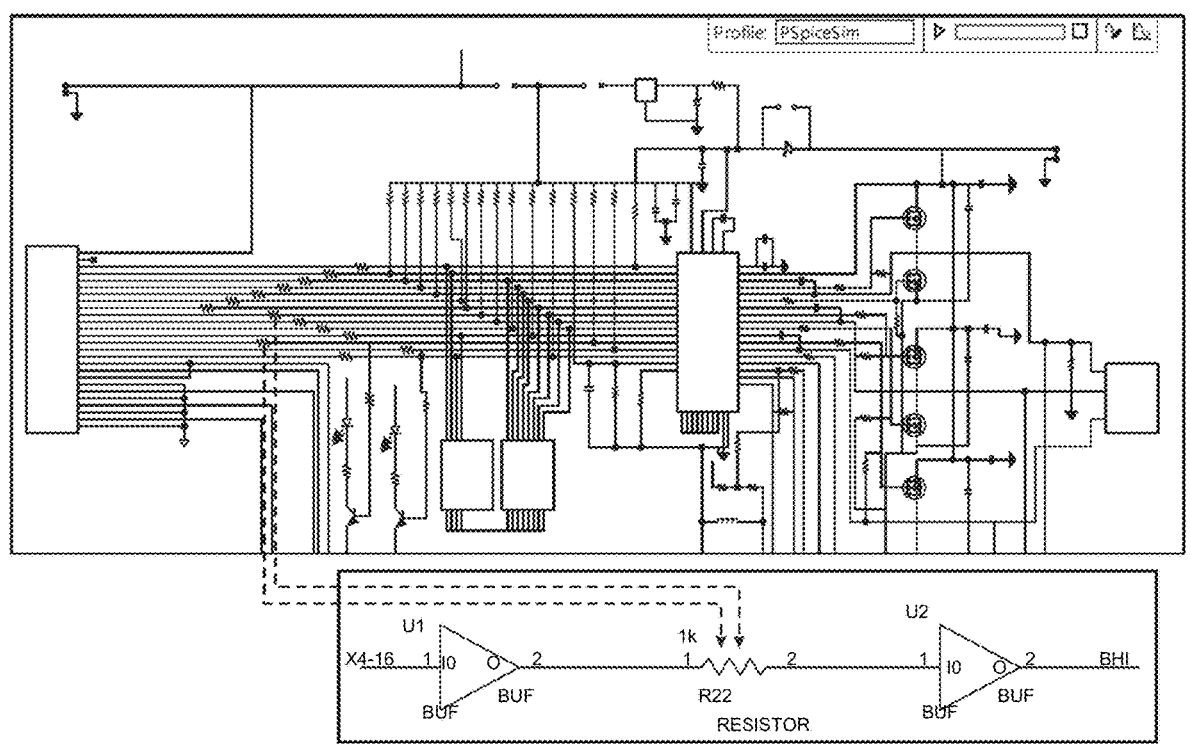
FIG. 4 illustrates an example showing an extraction of a small circuit.
Figure 5:
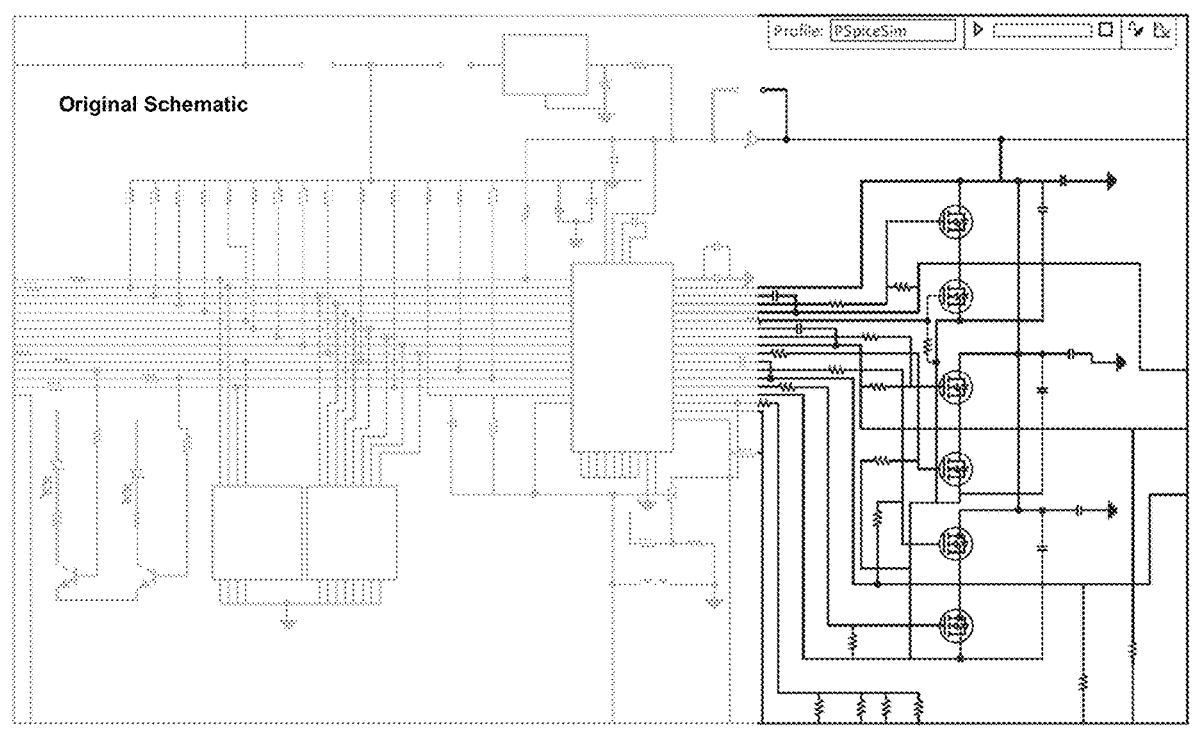
FIG. 5 illustrates another example showing an extraction of a small circuit.
Figure 5:
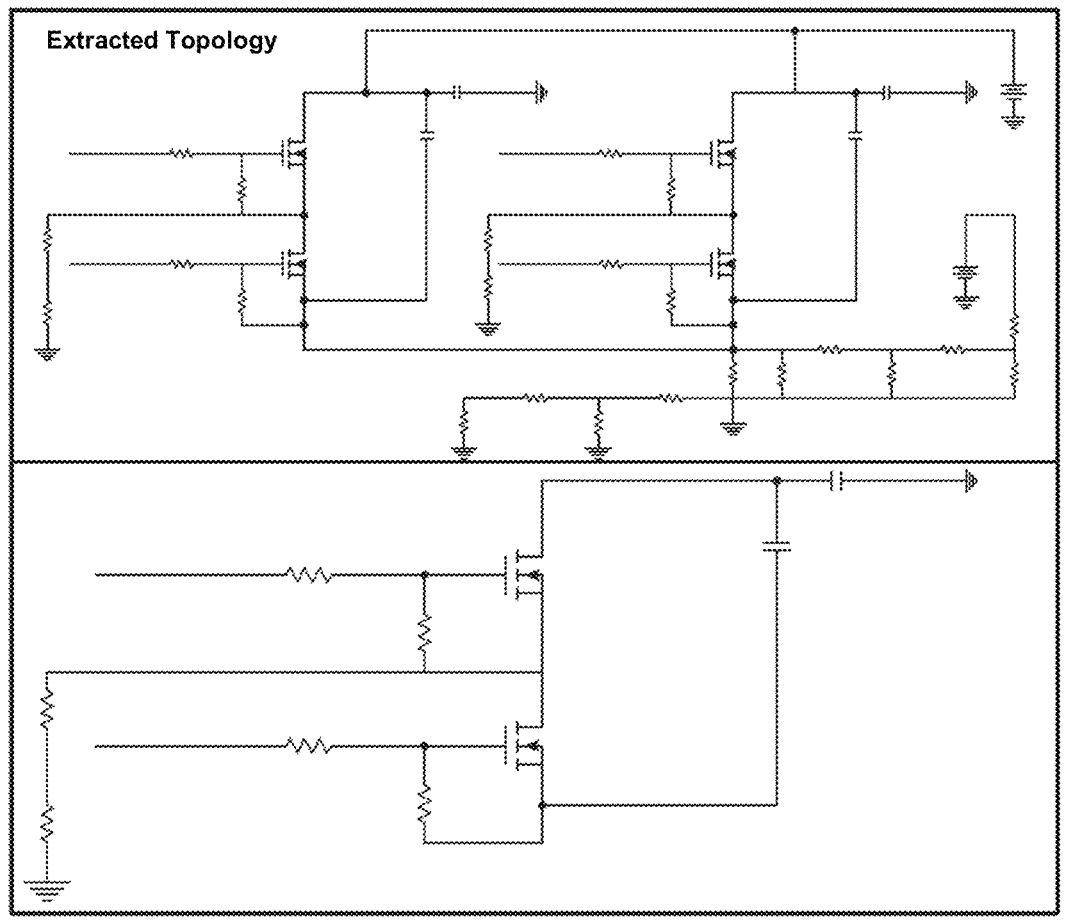

Referring now to FIG. 4, an embodiment showing an example graphical user interface is provided. In this particular example, the extraction of a small circuit is shown. FIG. 5 shows an additional example depicting an original schematic and an extracted topology or subcircuit.

Figure 6:
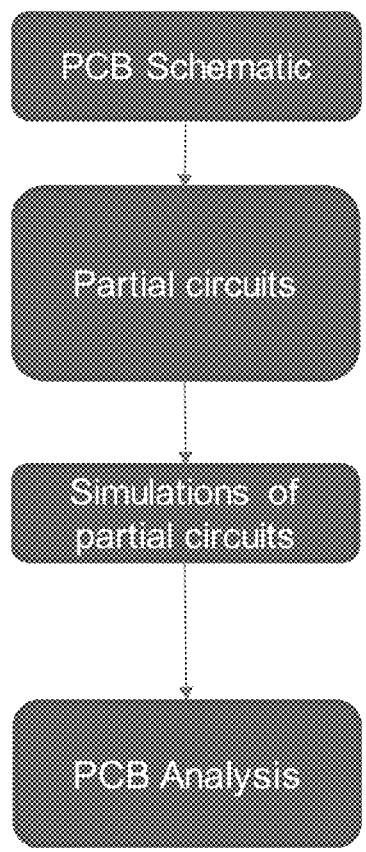
FIG. 6 illustrates a flowchart depicting operations consistent with embodiments of overstress identification process.

Referring now to FIG. 6, an embodiment showing an example flowchart consistent with the overstress determination process is provided. In some embodiments, an electrical schematic may be automatically split into multiple small circuits. Each small circuit may be simulated independently of other. In some embodiments, the automatic hook of stimulus may be performed at nodes where the small-circuit breaks from main circuit. Simulation results may then be analyzed to determine stress on devices associated with the PCB.

Figure 7:
FIG. 7 illustrates a diagram showing operations consistent with embodiments of overstress identification process.

Referring now to FIG. 7, an embodiment showing an example diagram consistent with the overstress determination process described herein. The process may include extracting a connectivity model where a schematic netlist may be parsed and processed. This may create a data model of the netlist in memory. The process may further include an automatic/configurable setup, which may include, but is not limited to, device types and subtypes, global nets, ground aliases, and default load impedance and stimulus. The process may then build stress topologies. Some portions of a circuit may be able to be simulated whereas non-simulatable portions may include IC pins at a topology boundary. The process may be configured to automatically detect stimulus pins and load pins to complete the circuit. In some embodiments, the stimulus may be applied automatically based on pin-properties of the stimulus pins. In some embodiments, the simulation may include using a SPICE simulator to simulate one or more stress topologies as well as performing a transient analysis. The output may be in the form of a result file having the voltage, current, and power at all the nodes of the topology. In some embodiments, the process may read the maximum operating values per device from a part-library and generate a control-file that contains the maximum operating conditions for each device and the tests to run. Simulation results may be post-processed and compared against maximum values for displaying results.

Figure 8:
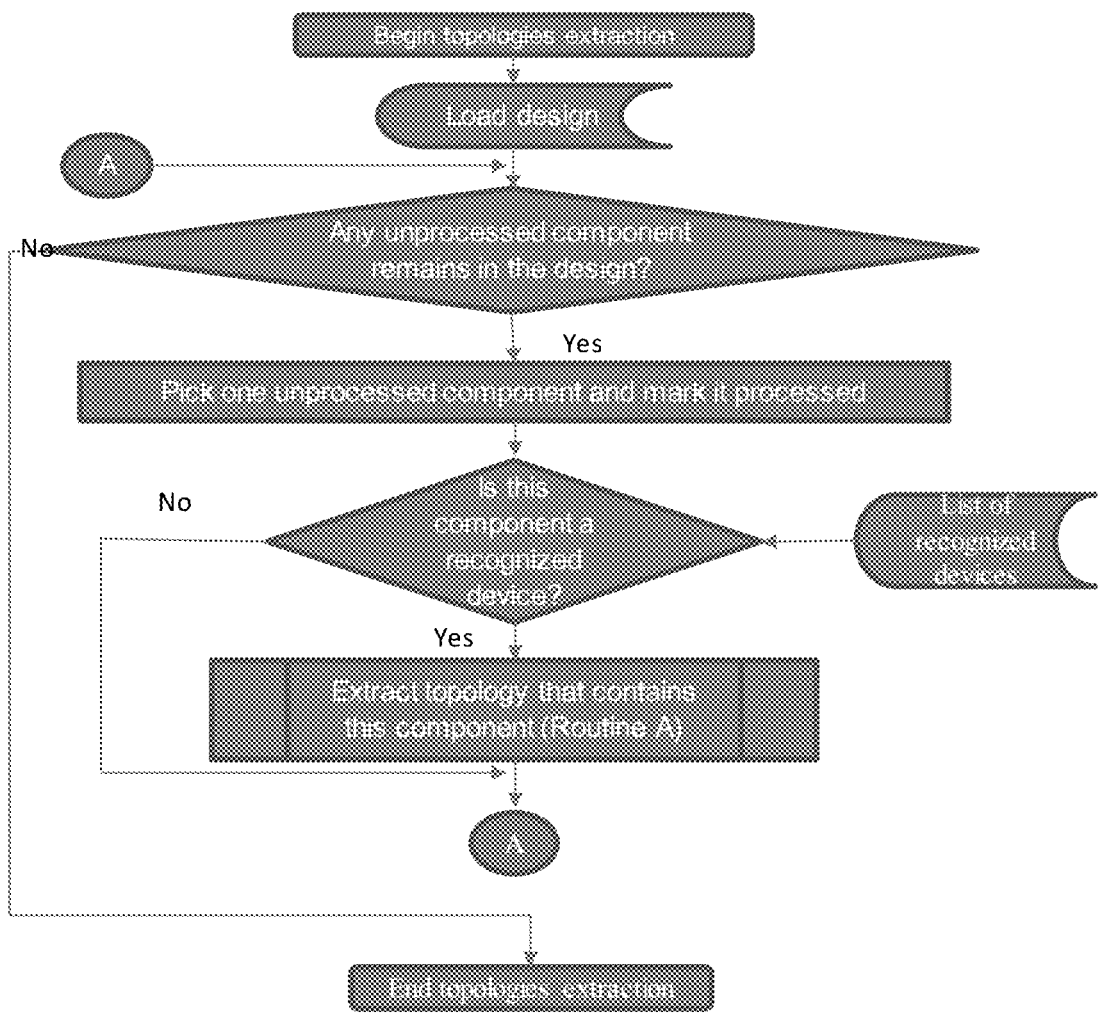
FIG. 8 illustrates a flowchart depicting operations consistent with embodiments of overstress identification process.
Figure 9:
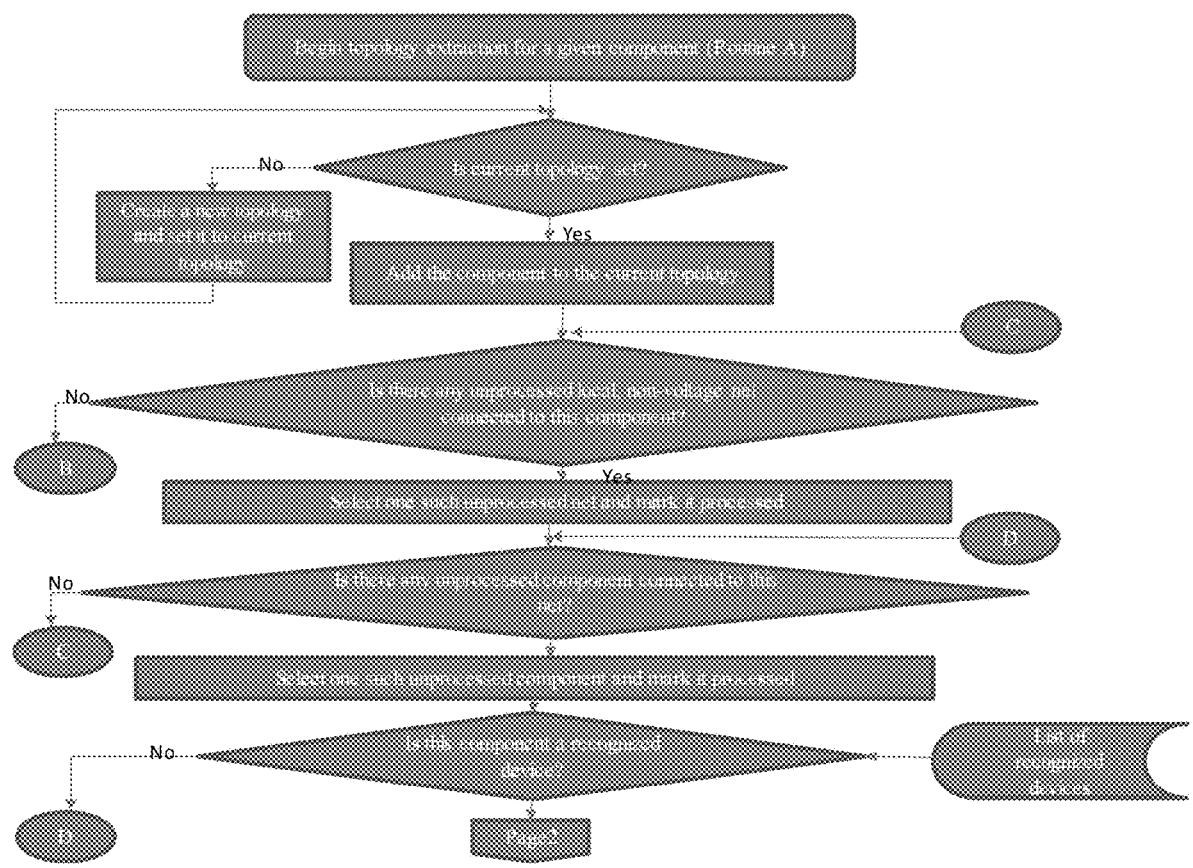
FIG. 9 illustrates a flowchart depicting operations consistent with embodiments of overstress identification process.
Figure 10:
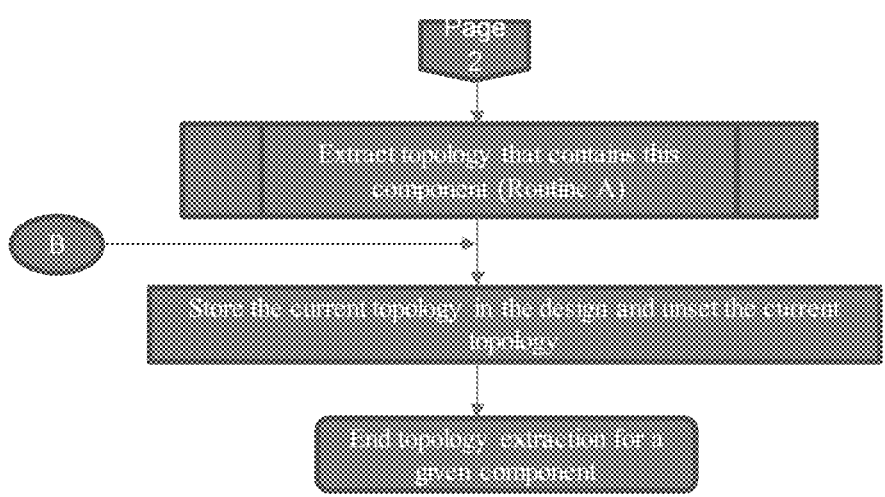
FIG. 10 illustrates a flowchart depicting operations consistent with embodiments of overstress identification process.

Referring now to FIGS. 8-10, an embodiment showing an example flowchart consistent with overstress determination process is provided. In operation, the process may include selecting a device and estimating its category. Some devices may include, but are not limited to, resistors, inductors, capacitors, etc. Device-category detection and processing of abstract-data helps select default-model for device. The process may keep iterating over all nets connected to pins of this device until it hits another device. The process may continue iterating on the next device and the iteration may stop when either the device-pin is connected to Power-signal (VDD/GND . . . ), the device-pin is connected to pin of IC, and/or the device-pin is connected to un-identifiable category of device. The process may be configured to detect stimulus points of topology based upon, at least in part, whether a device-pin is an IC pin, an unrecognized device pin, a power-pin, etc. Accordingly, pulse-stimulus, load or power may be applied to enable simulations. Apply a stimulus that reflects a typical close-loop condition.

Figure 11:
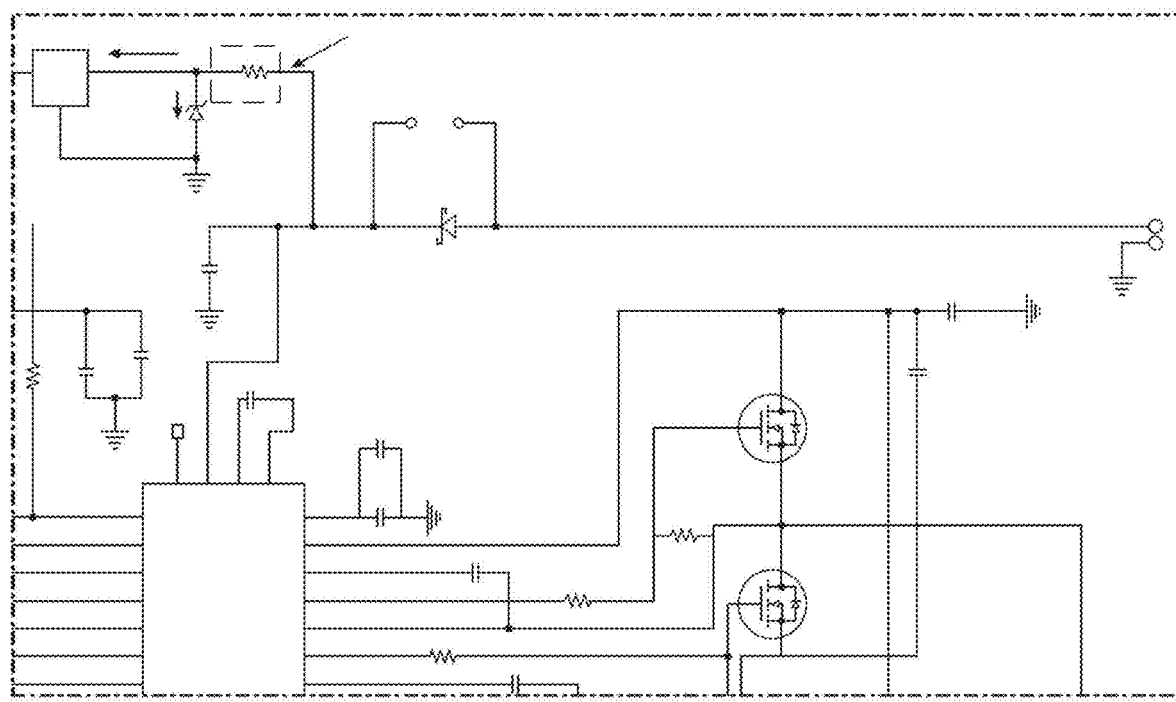
FIGS. 11-18 illustrate diagrams showing a proposed example consistent with embodiments of overstress identification process.
Figure 12:
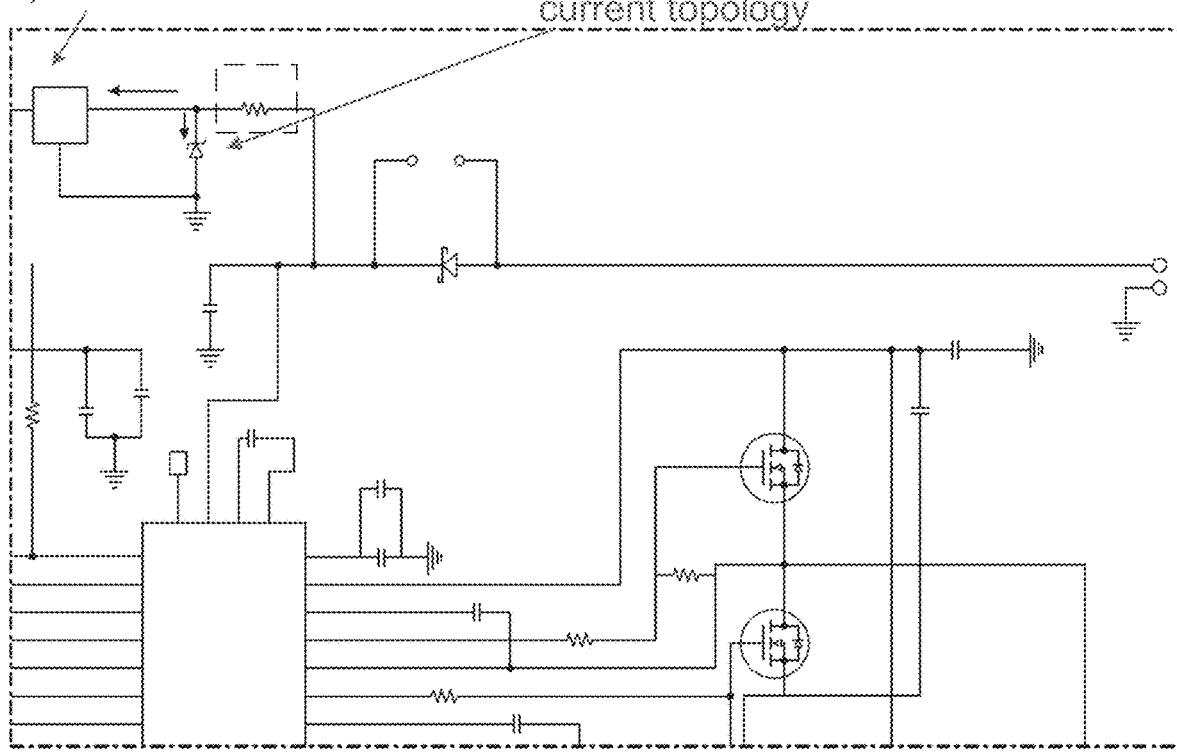

Referring now to FIG. 11, an embodiment showing an example diagram consistent with an overstress determination process is provided. In operation, the process may include selecting an unprocessed component that is a recognized device and following its unprocessed connections one-by-one after marking it processed. As shown in FIG. 12, if a device is not recognized the process may stop at that device and mark it as processed. However, if the device is recognized the traversal may continue in a depth-first manner after marking the device as having been processed and adding it to the current topology. The phrase "depth-first" may refer to an approach whereby the circuit is treated as a tree and each branch of the tree may be traversed until reaching the leaf level nodes. This may occur prior to backtracking and exploring other branches of the tree.

Figure 13:
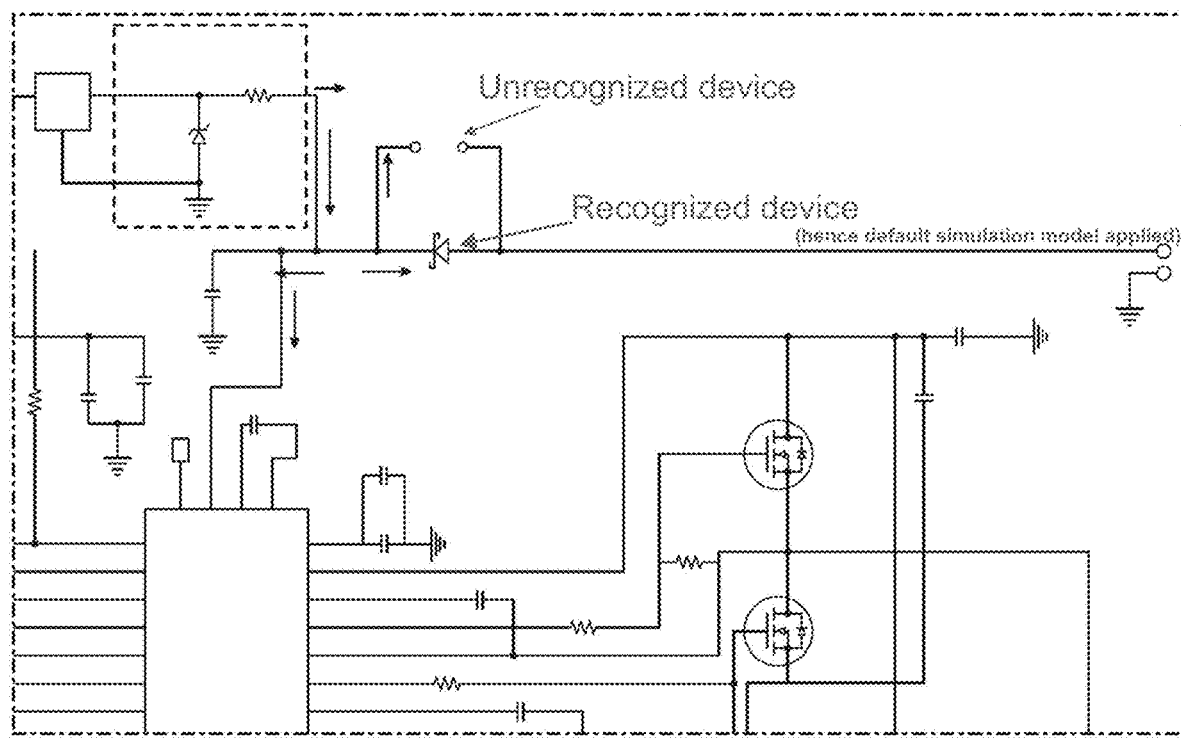

As shown in FIG. 13, in some embodiments if there are no further connections to recognized devices on the diode, the process may backtrack to the resistor and select another unprocessed connection and traverse that connection. A recognized device may have a default simulation model applied.

Figure 14:
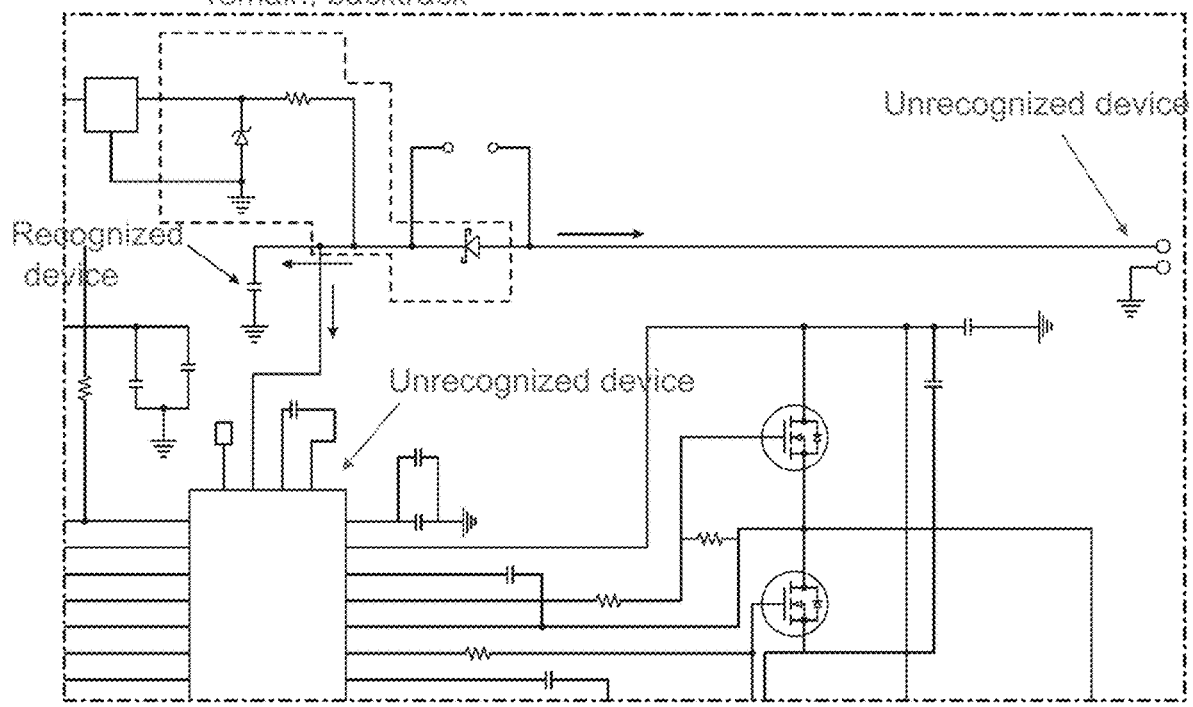

As shown in FIG. 14, examples of recognized and unrecognized devices are provided. In operation, the process may add the recognized device to the current topology, mark it as processed and keep on following its remaining unprocessed connection. If no unprocessed connections remain, the process may backtrack.

Figure 15:
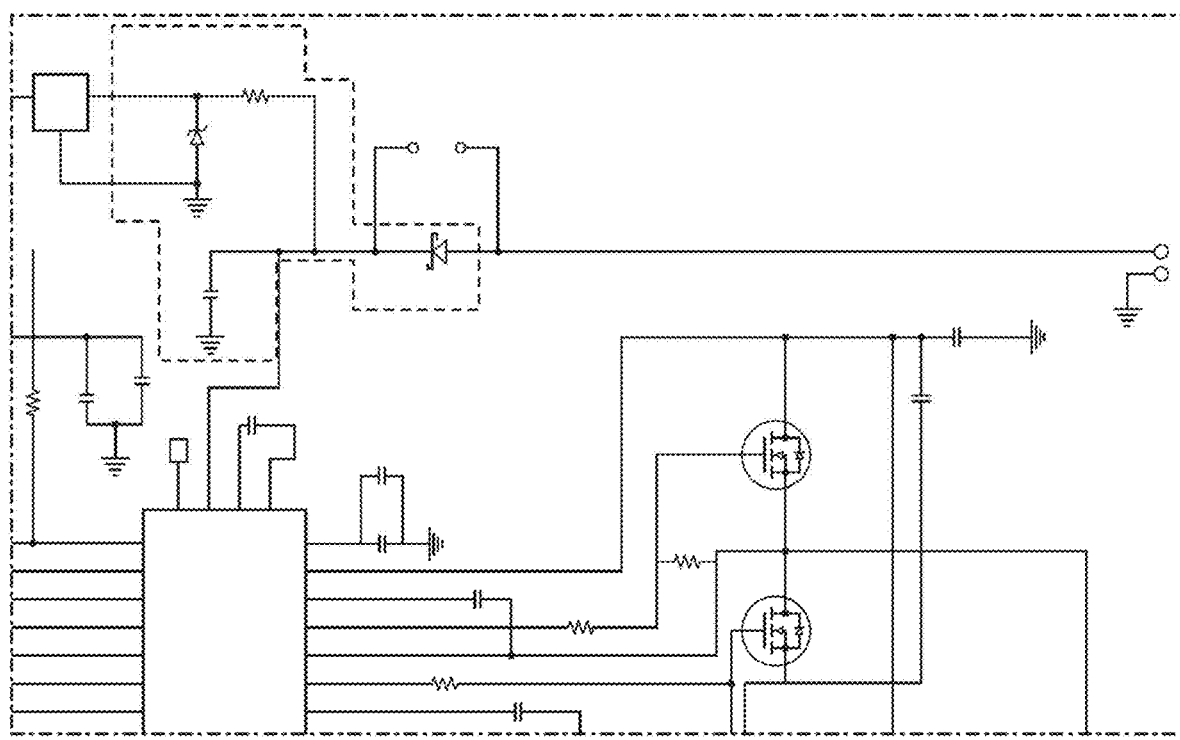
Figure 16:
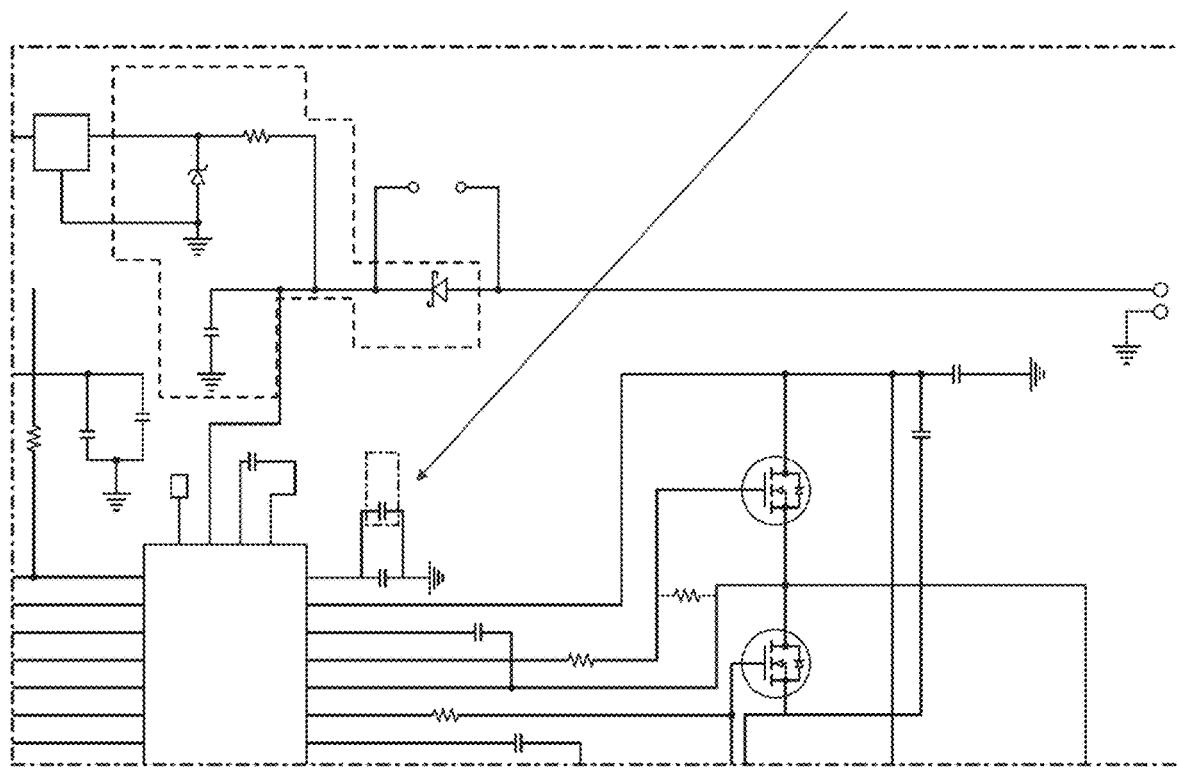
Figure 17:
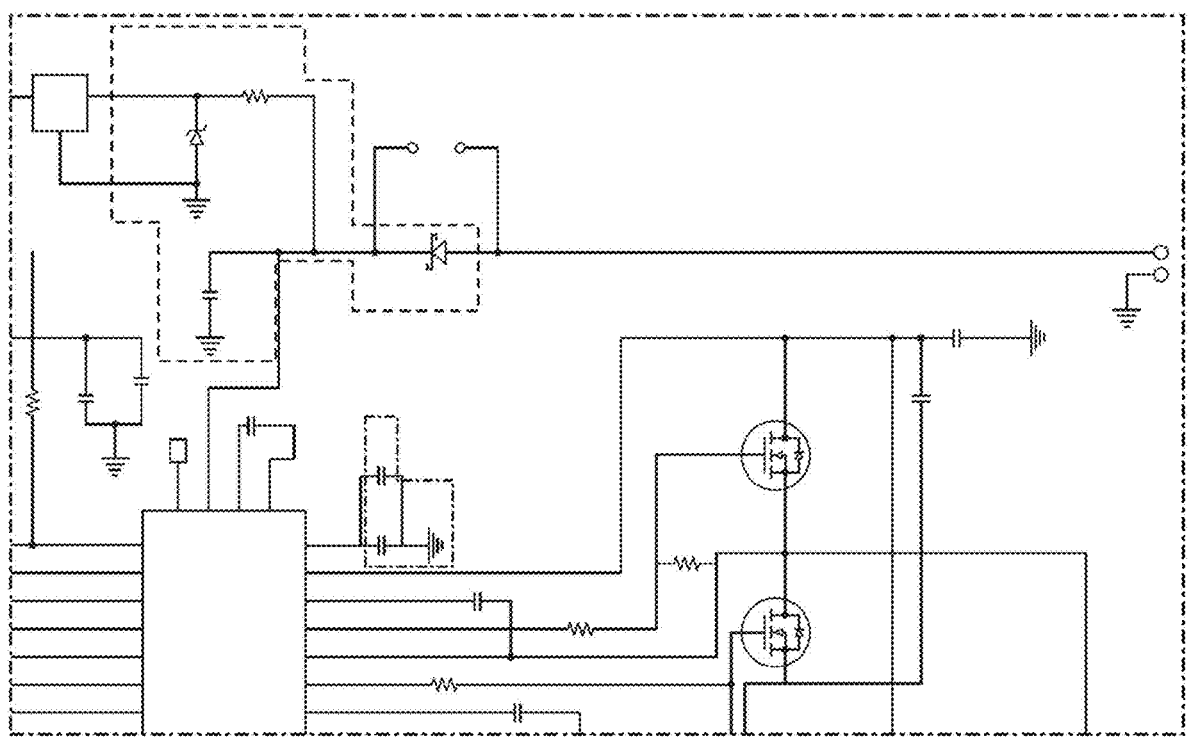
Figure 18:
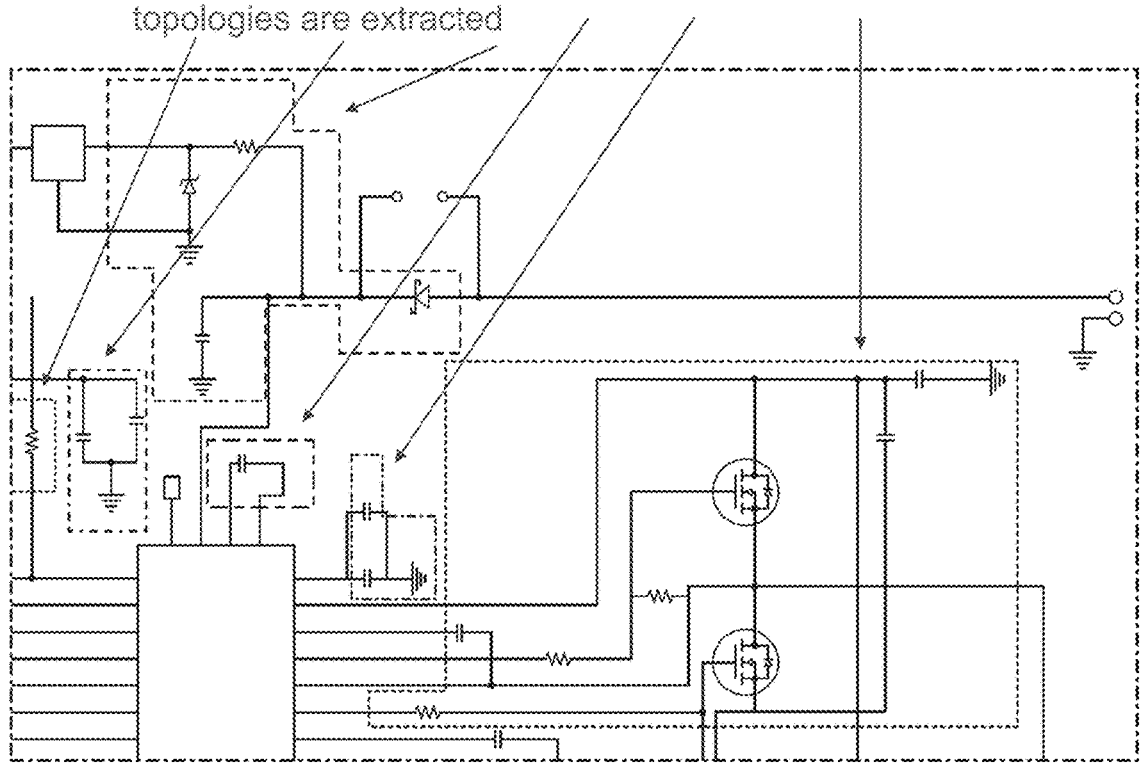

As shown in FIG. 15, in some embodiments the process may add the recognized device to the current topology, mark it as processed and proceed following its remaining unprocessed connection. If no unprocessed connections remain, the process may backtrack. The process may stop when no further traversal is possible. The topology may be complete at this point. FIG. 16 shows another unprocessed component that may be selected to initiate a new topology. The same operations as described above may be used for this new component. The process may continue for each component as shown in FIGS. 17-18.

Figure 19:
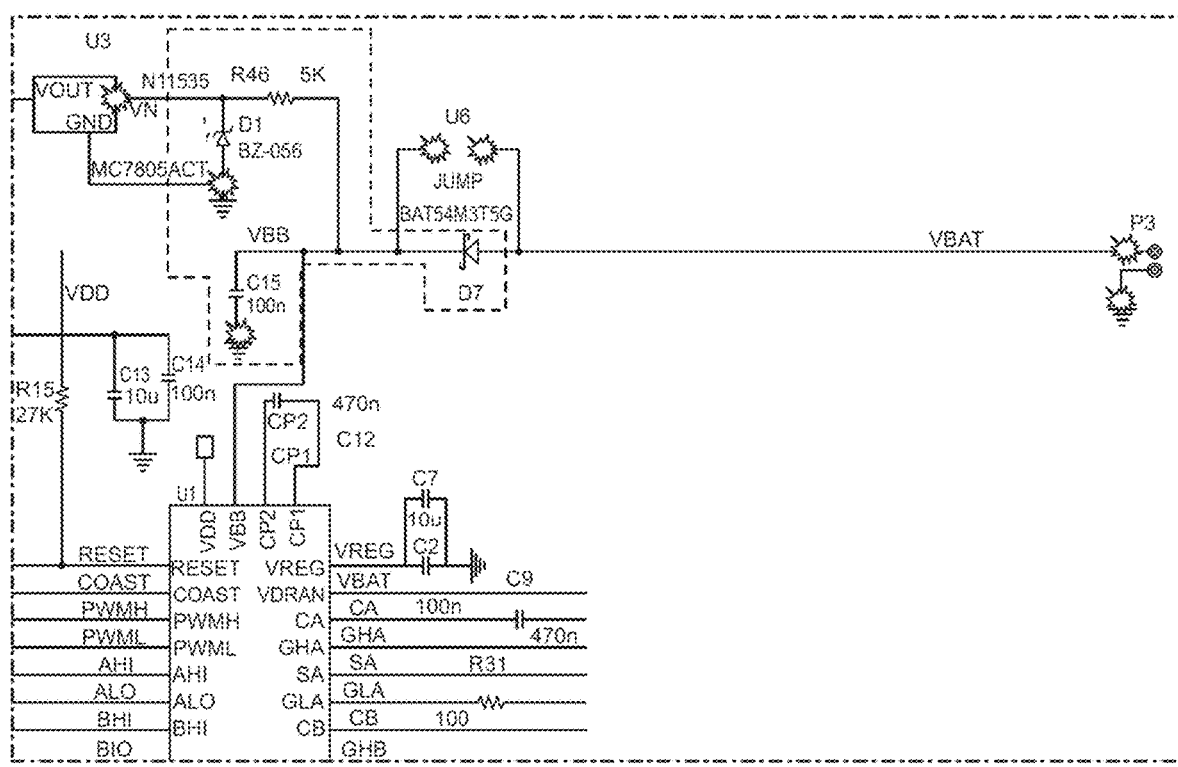
FIG. 19 illustrates a diagram enabling simulation through a stimulus application.
Figure 20:
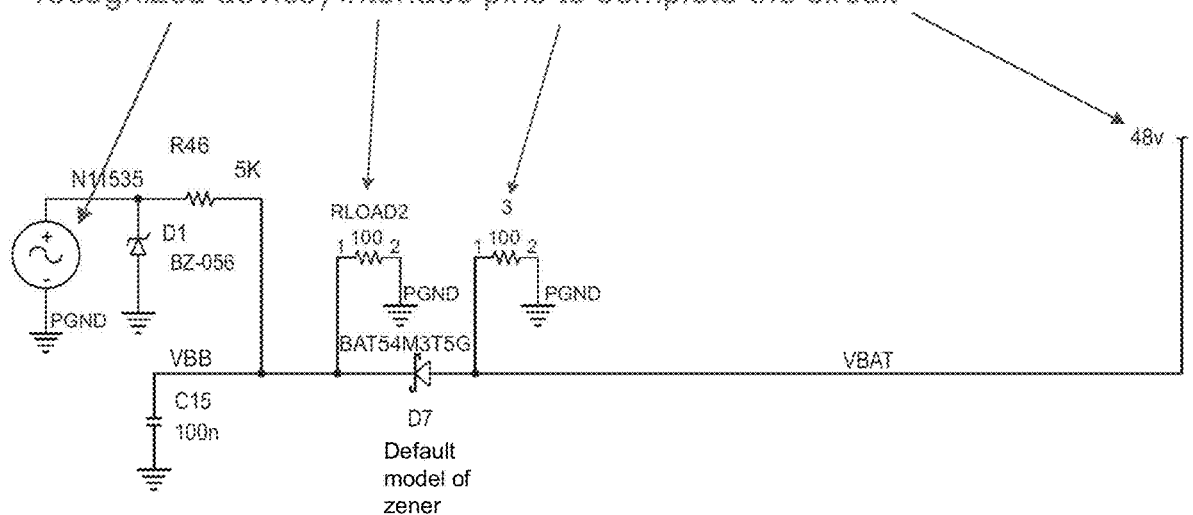
FIG. 20 illustrates a diagram enabling simulation through a stimulus application.

Referring now to FIGS. 19-20, an example embodiment showing the application of a stimulus to enable simulation is provided. As shown in FIG. 19, stimulus points of topology may be detected. For example, interface pins of IC, interface pins of unrecognizable device, GND, VDD nets, etc. As shown in FIG. 20, for each topology, the process may apply a stimulus and load to one or more relevant IC (non-recognized device) interface pins to complete the circuit. In this particular example, a pulse may be applied based upon IO technology (or pin properties) of a pin. For example, a transistor-transistor logic ("TTL") IO-pin would have a pulse of 0 to 5V with certain rise/fall times. For an interface pin of an unrecognized device, the process may apply loads with high impedance and for GND or VDD nets the process may apply voltages as indicated by labels on nets.

Embodiments of the present disclosure may be used for simulating large PCBs for useful calculations like device-stress, trace-thickness, creepage, etc. Such partitioning into small circuits may speed up simulations significantly. Since each device may now be associated with a small circuit, it may be debugged in the context of same small circuit. Repeated circuits need to be simulated just one time, which increases efficiency. In some embodiments, results of such simulations may be used for estimating conducted emissions, estimating trace-thicknesses and creepage-clearances, etc.

In some embodiments, the overstress determination process included herein may be used to simulate a PCB circuit by automatically splitting one or more circuits into small simulate-able circuits in order to compute device-stress. This may be achieved without requiring simulation models. In some embodiments, the process may include extracting a sub-circuit (estimated topology) using one or more of bias-nets, digital-nets and connectors as terminating interfaces. The process may include a method of hooking stimulus using pin information. When a stressed model is selected the process may include displaying a portion of design as highlighted.

Referring now to FIGS. 21-28, embodiments of the present disclosure depicting cross-probing capabilities are provided. As used herein, the phrase "cross probing" may refer to navigation from one view to a second, related view.

Figure 21:
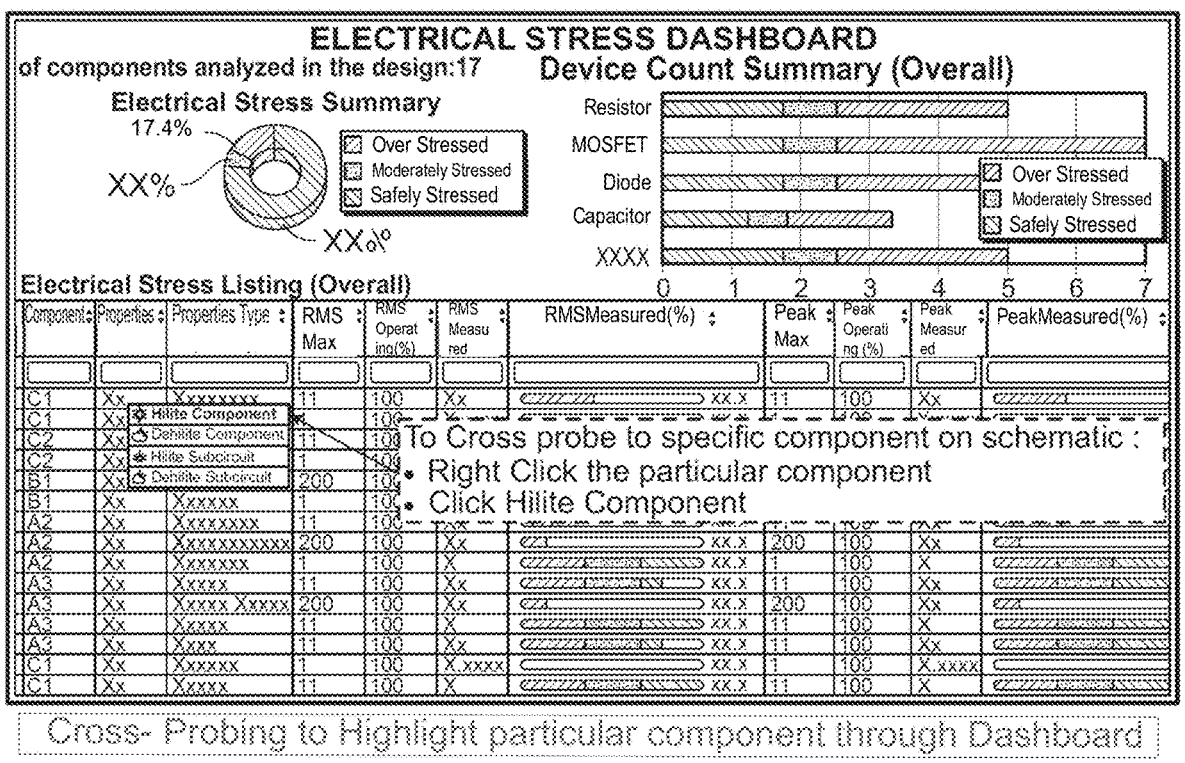
FIG. 21 illustrates an example showing cross-probing consistent with embodiments of overstress identification process.
Figure 22:
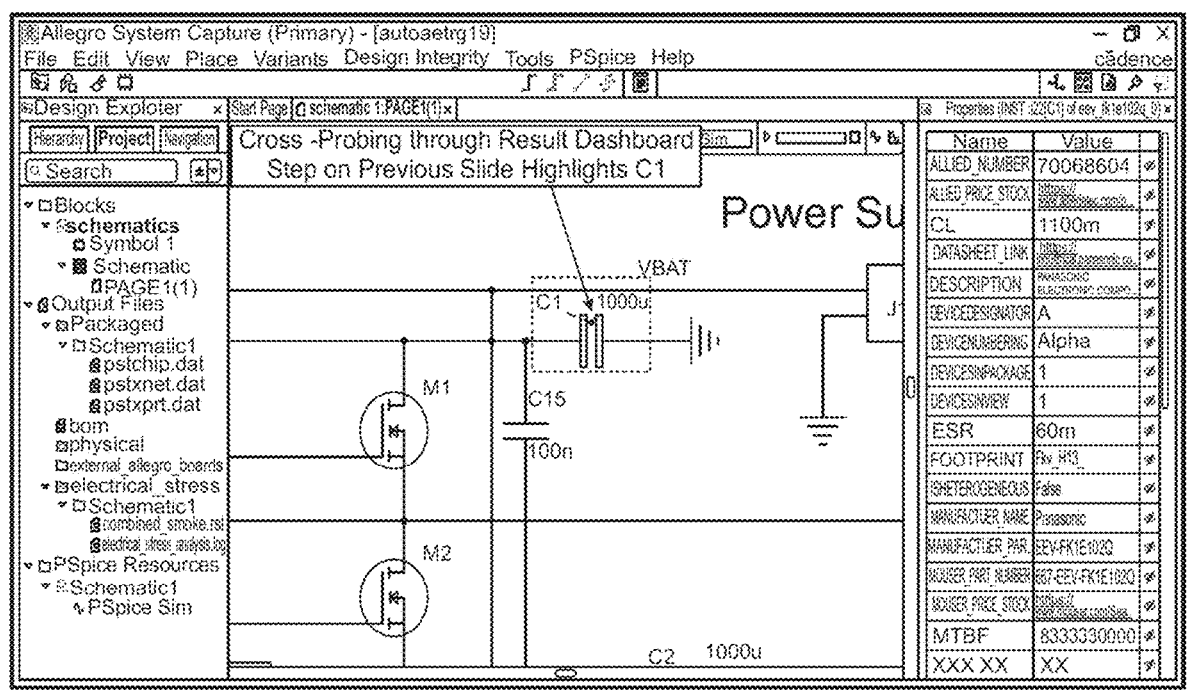
FIG. 22 illustrates an example showing cross-probing consistent with embodiments of overstress identification process.
Figure 23:
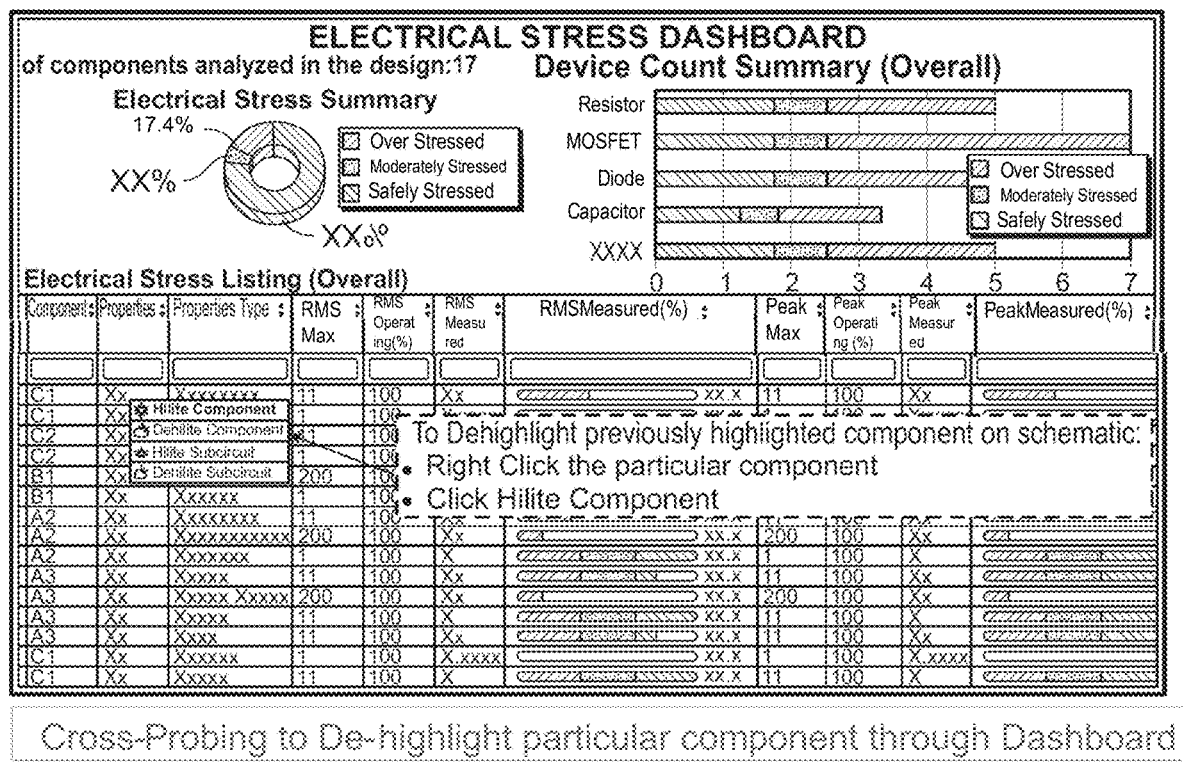
FIG. 23 illustrates an example showing cross-probing consistent with embodiments of overstress identification process.
Figure 24:
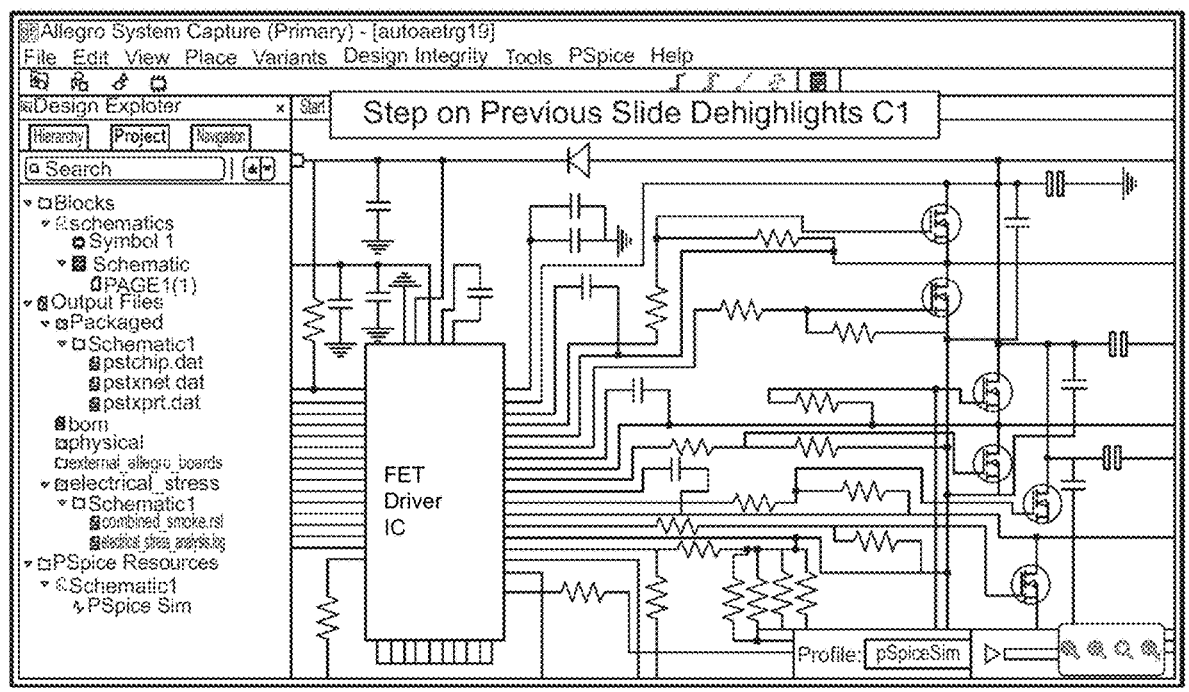
FIG. 24 illustrates an example showing cross-probing consistent with embodiments of overstress identification process.

In some embodiments, and as shown in FIGS. 21-22, the process may include a graphical user interface that may be configured to highlight all the components of a extracted subcircuit that are electrically associated to each other and impact the electrical stress analysis. In operation, the process may allow a user to select (e.g., using a right click, etc.) a component and the subcircuit associated with that component may be highlighted at the graphical user interface. In this way, all of the associated components affecting the stress on that component may be highlighted together automatically. Similarly, the process may allow for the de-emphasizing or de-highlighting a selected component as shown in FIGS. 23-24.

Figure 25:
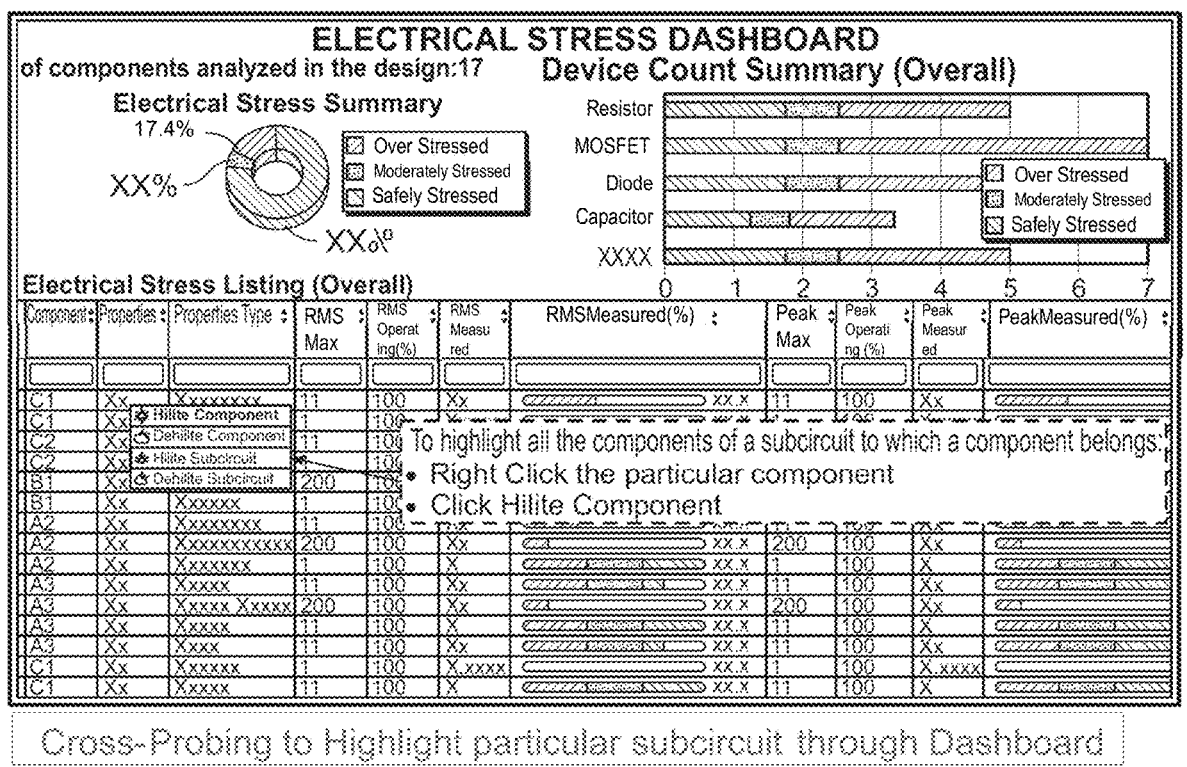
FIG. 25 illustrates an example showing cross-probing consistent with embodiments of overstress identification process.
Figure 26:
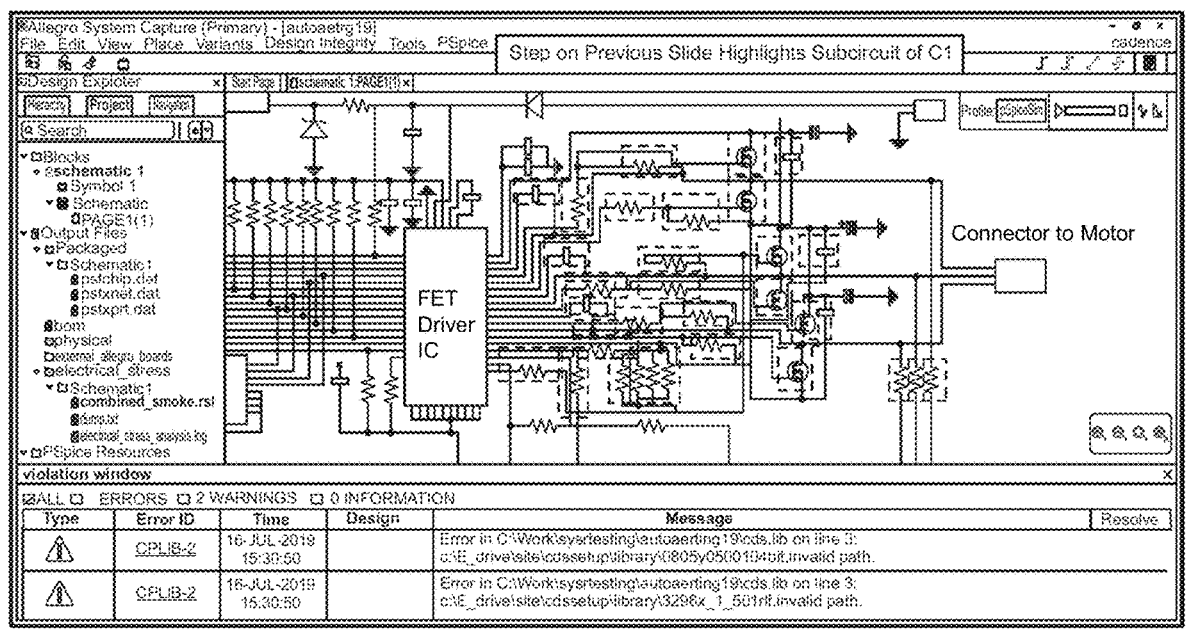
FIG. 26 illustrates an example showing cross-probing consistent with embodiments of overstress identification process.

In some embodiments, and as shown in FIGS. 25-26, the process may allow for highlighting of all of the components of a subcircuit to which a component belongs. An example of the selection is shown in FIG. 25 and the resulting display in FIG. 26.

Figure 27:
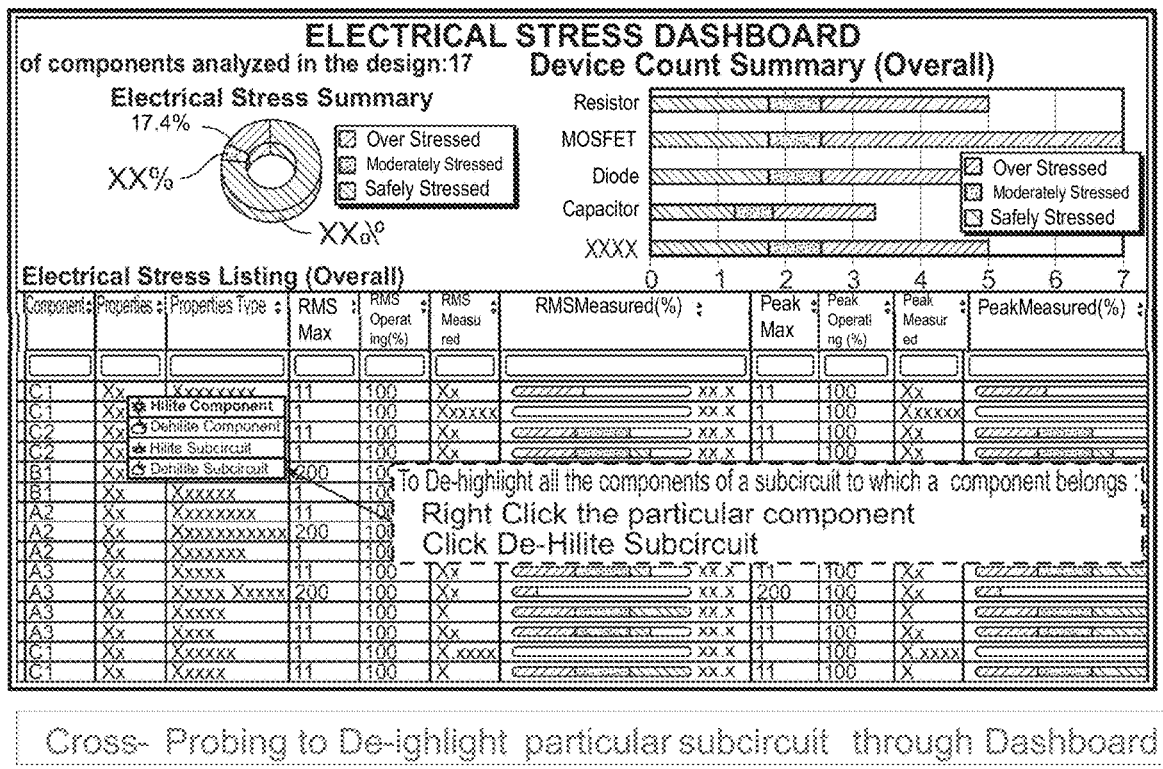
FIG. 27 illustrates an example showing cross-probing consistent with embodiments of overstress identification process.
Figure 28:
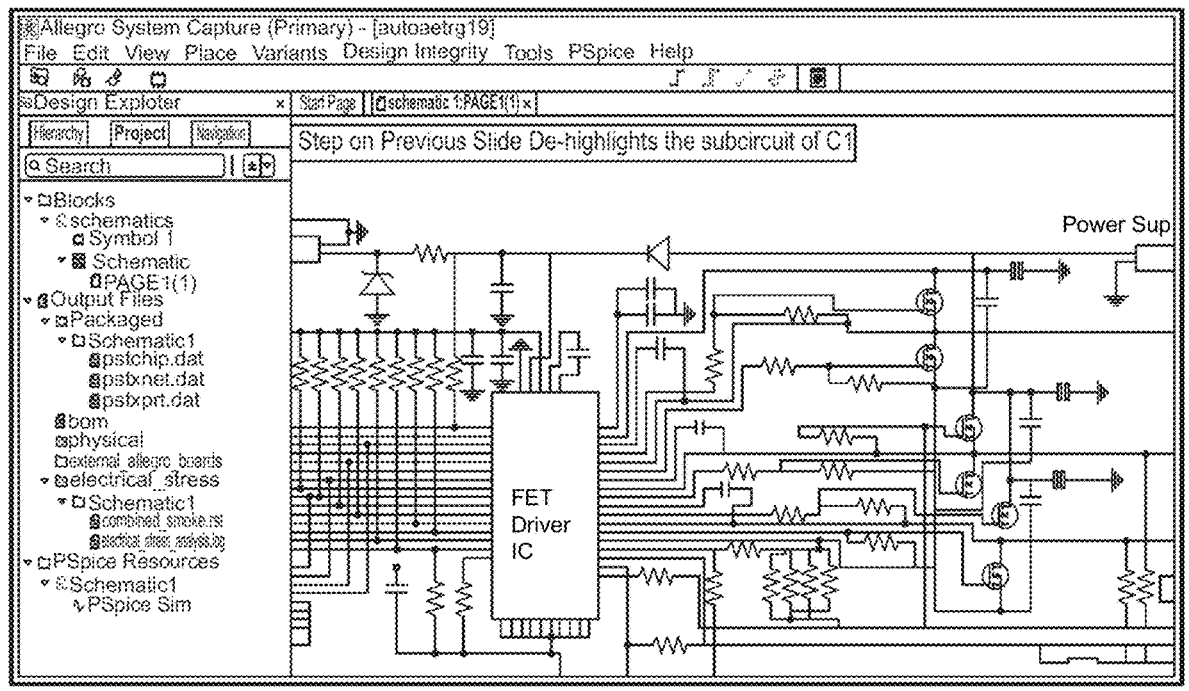
FIG. 28 illustrates an example showing cross-probing consistent with embodiments of overstress identification process.

In some embodiments, and as shown in FIGS. 27-28, the process may allow for de-highlighting of all of the components of a subcircuit to which a component belongs. An example of the selection is shown in FIG. 27 and the resulting display in FIG. 28. Accordingly, the teachings of the present disclosure requires no setup from the user and enables instant debugging.

Figure 29:
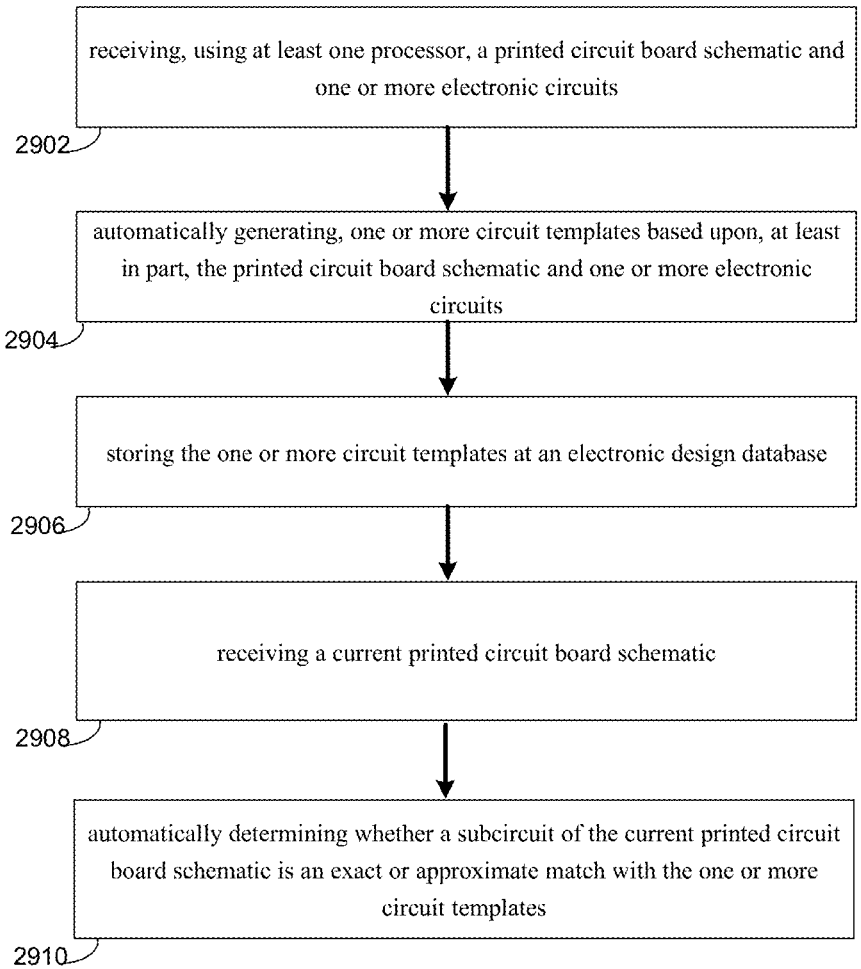
FIG. 29 illustrates a flowchart depicting operations consistent with embodiments of automatic simulation process.

Referring now to FIGS. 29-60, embodiments depicting an automatic simulation process for use with analog circuits embedded in a PCB design are provided. As shown in FIG. 29, in some embodiments, the process may include receiving 2902 a printed circuit board schematic and one or more electronic circuits. Embodiments may further include automatically generating 2904, one or more circuit templates based upon, at least in part, the printed circuit board schematic and one or more electronic circuits. The one or more circuit templates may be stored 2906 at an electronic design database. Embodiments may also include receiving 2908 a current printed circuit board schematic and automatically determining 2910 whether a subcircuit of the current printed circuit board schematic is an exact or approximate match with the one or more circuit templates. Numerous other operations are also within the scope of the present disclosure as discussed in further detail hereinbelow.

In some existing systems, designers need to extract the analog portions manually from the PCB Design into separate schematics in order to simulate them to estimate the performance. This requires expert knowledge to setup and simulate. For example, the designer may need to extract the relevant analog circuit and identify the nodes where stimulus needs to be provided. To do this, the designer needs to understand the circuit to correctly apply the stimulus and also enable the load conditions to appropriately mimic the operating conditions. The process is time-consuming and requires expert knowledge.

Figure 30:
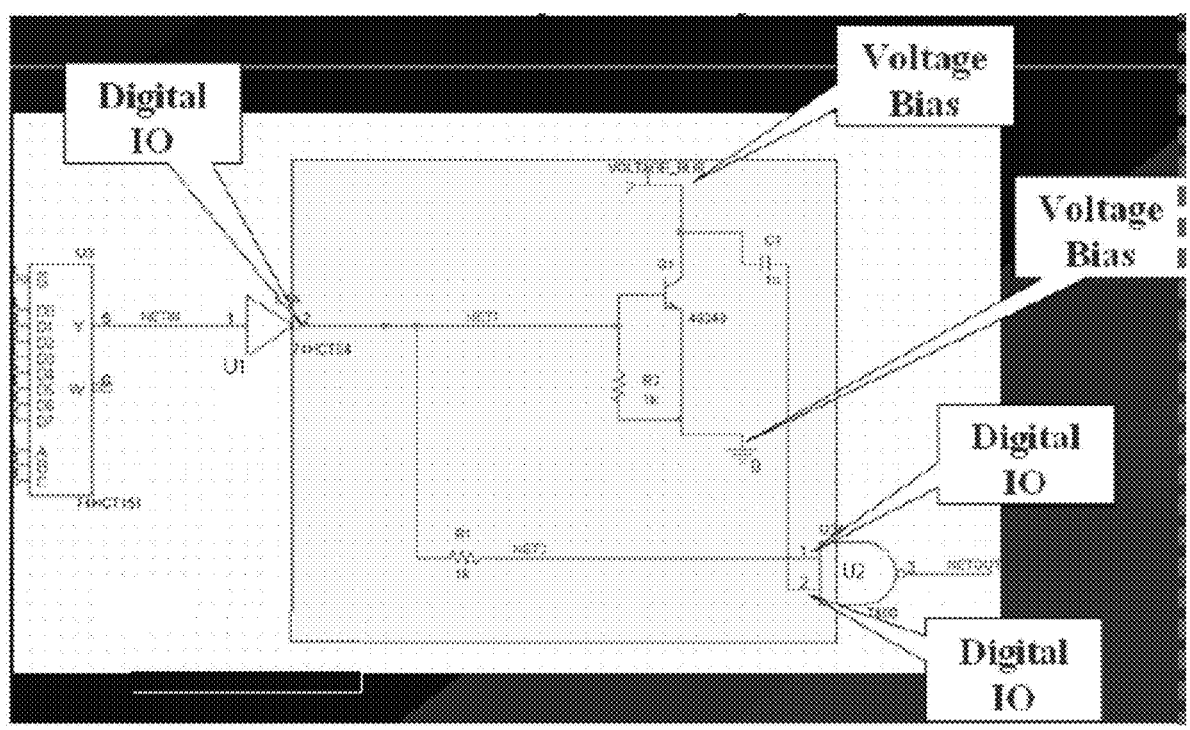
FIG. 30 illustrates an example showing analog subcircuits consistent with embodiments of automatic simulation process.
Figure 31:
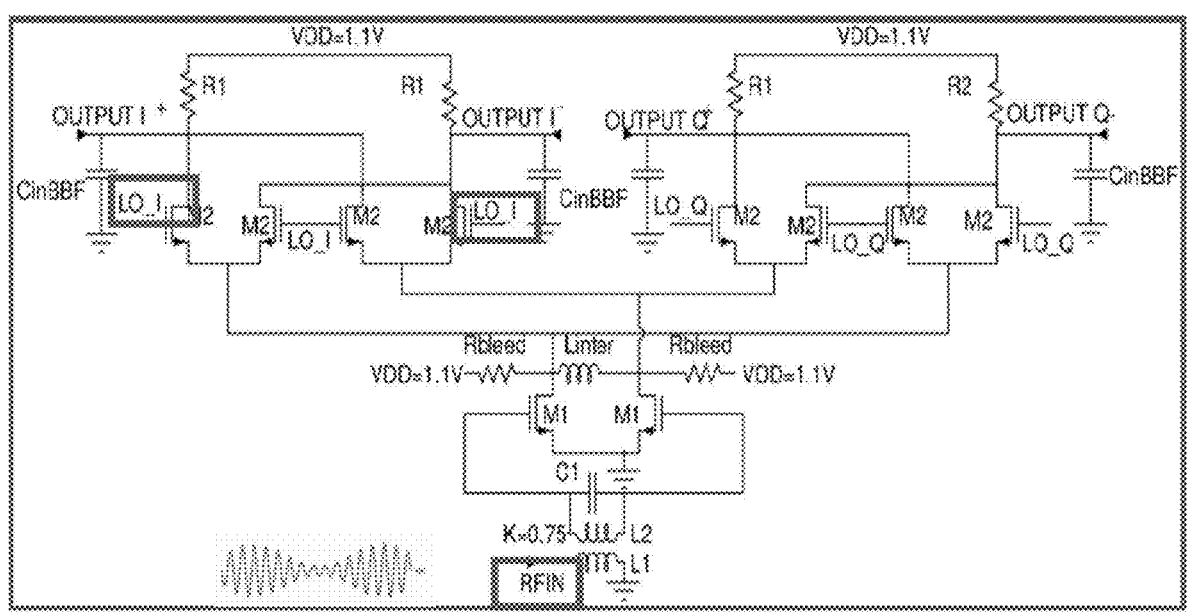
FIG. 31 illustrates an example showing analog subcircuits consistent with embodiments of automatic simulation process.

Referring now to FIGS. 30-31, graphical user interface examples showing analog sub-circuits with complex stimulus combinations are provided. In the example of FIG. 30, IOs and bias points may act as break points for extracting topology. Driver IO buffers may be replaced by a pulse stimulus of appropriate swings. FIG. 31 shows an example of complex analog circuits where stimulus may not be approximated as simple pulse inputs. The stimulus could be a complex waveform and/or may be multiple stimuli. In this example, the mixer circuit functions with a local oscillator sine-wave and RF-input.

Figure 32:
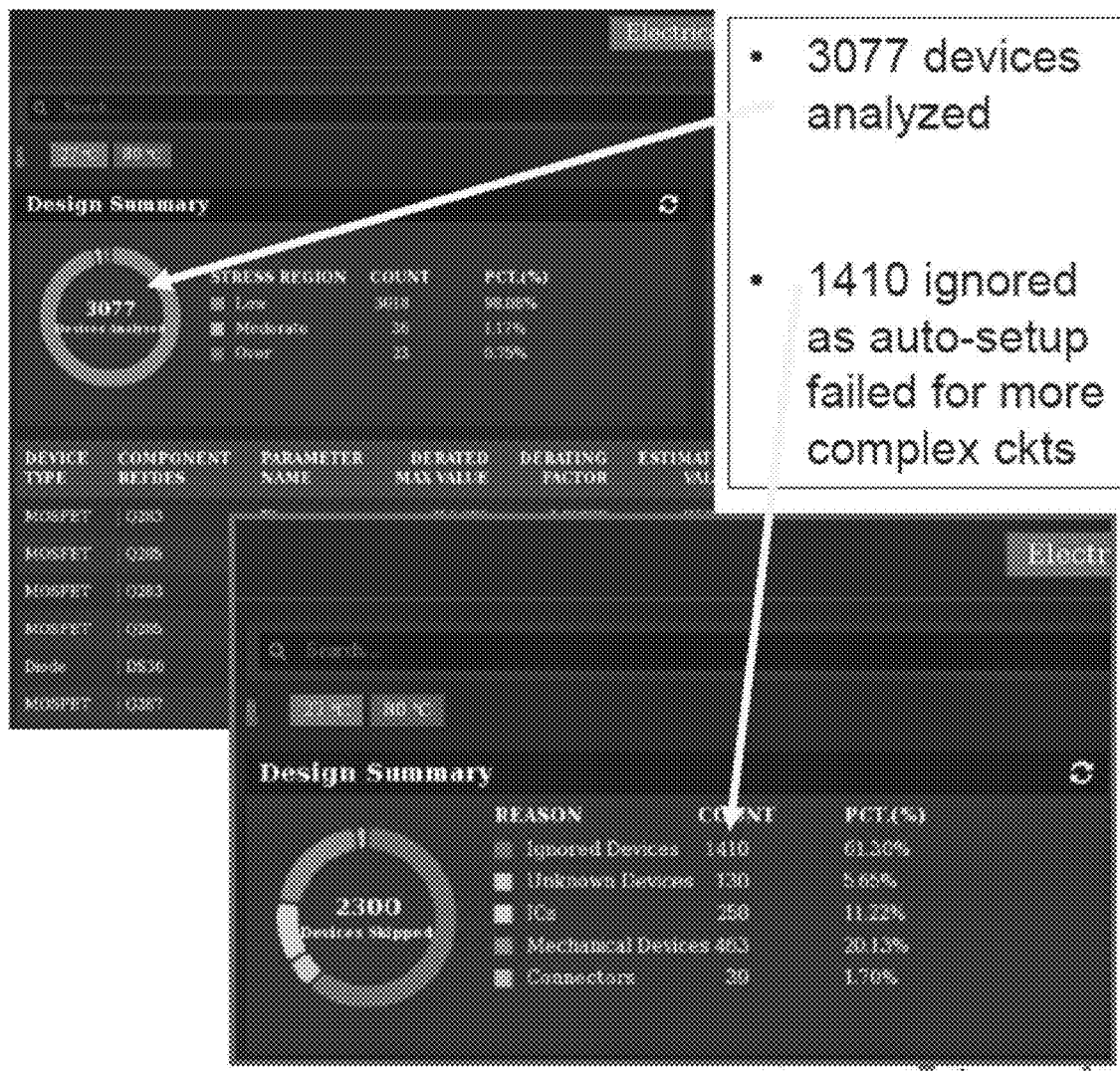
FIG. 32 illustrates an example showing a graphical user interface consistent with embodiments of automatic simulation process.

Referring now to FIG. 32, a graphical user interface is displayed showing the number of devices analyzed and ignored using the approach of FIGS. 30-31. It should be noted that with the advent of 5G and RF technologies, the amount of mixed-signal and analog content on PCBs is increasing. Existing approaches handle circuits very well when those are powered by pins of digital ICs and hence can be estimated by pulse inputs. However, typically 20% or more of the design may be ignored due to its extreme analog nature and hence complicated simulation setup cannot be estimated. Every circuit is simulated even if it repeats multiple times in the PCB due to its lack of ability to recognize that the same circuit has already been analyzed.

For example, a DDR net may be simulated 64 times for a 64-bit data-bus. This causes performance loss. This type of issue may become apparent, for example, when circuits are driven by analog IC pins, the IO swings cannot be determined by VoH/VoL values or IO technologies. Also, when analog sub-circuits need complex stimulus settings in terms of frequencies and waveforms other than pulse. Further problems may arise when multiple stimuli are to power the analog circuits in a special sequence and timing-control and/or when analysis of circuit requires different stimuli to obtain the worst stress of devices. One stimulus could be stressful for one portion of analog sub-circuit while different stimulus could be stressful of other portion. In some cases analysis of a circuit requires different load conditions to get the worst stress of devices. One load could be stressful for one portion of analog sub-circuit while a different load could be stressful on another portion.

Accordingly, embodiments included herein provide an approach to recognize the circuit in its full capacity so that it may be powered up with proper voltages and stimulus conditions that can cause the circuit to go through most-stressed conditions. This may be achieved through building a database of circuits and PCB designs, with the complete simulation setup information. The information may include, but is not limited to, stimulus, load, direction of ports, components in circuit, connectivity of components, etc. Embodiments included herein may also leverage the database through circuit match operations and may also match the analog sub-portion extracted out of PCB schematic with existing template circuits in order to re-use simulation settings.

Figure 33:
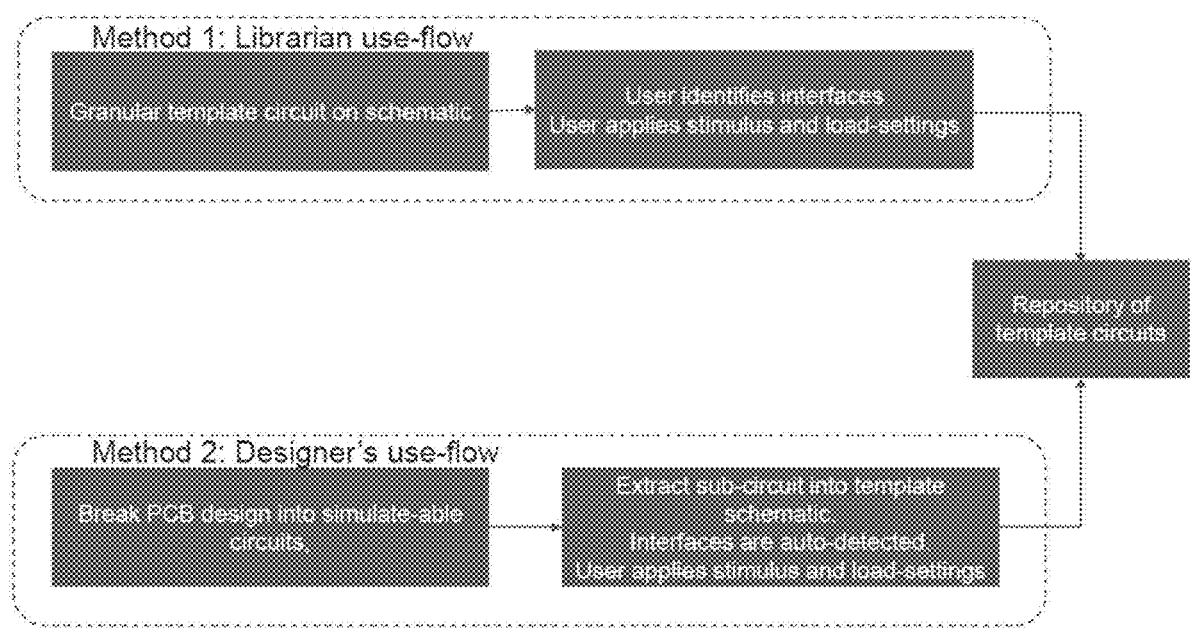
FIG. 33 illustrates a flowchart depicting operations consistent with embodiments of automatic simulation process.

Referring now to FIG. 33, a flowchart showing operations consistent with embodiments of the present disclosure is provided. FIG. 33 shows an approach for storing one or more circuit templates both from a back end and designer viewpoint. This includes details on the information that needs to be stored in the database and the method to build the information as part of a library process and as part of a design process. In some embodiments, the process includes the ability to automatically enhance the database. In this way, as more and more PCB designs get analyzed, the extracted circuits from these designs automatically update within the database.

Figure 34:
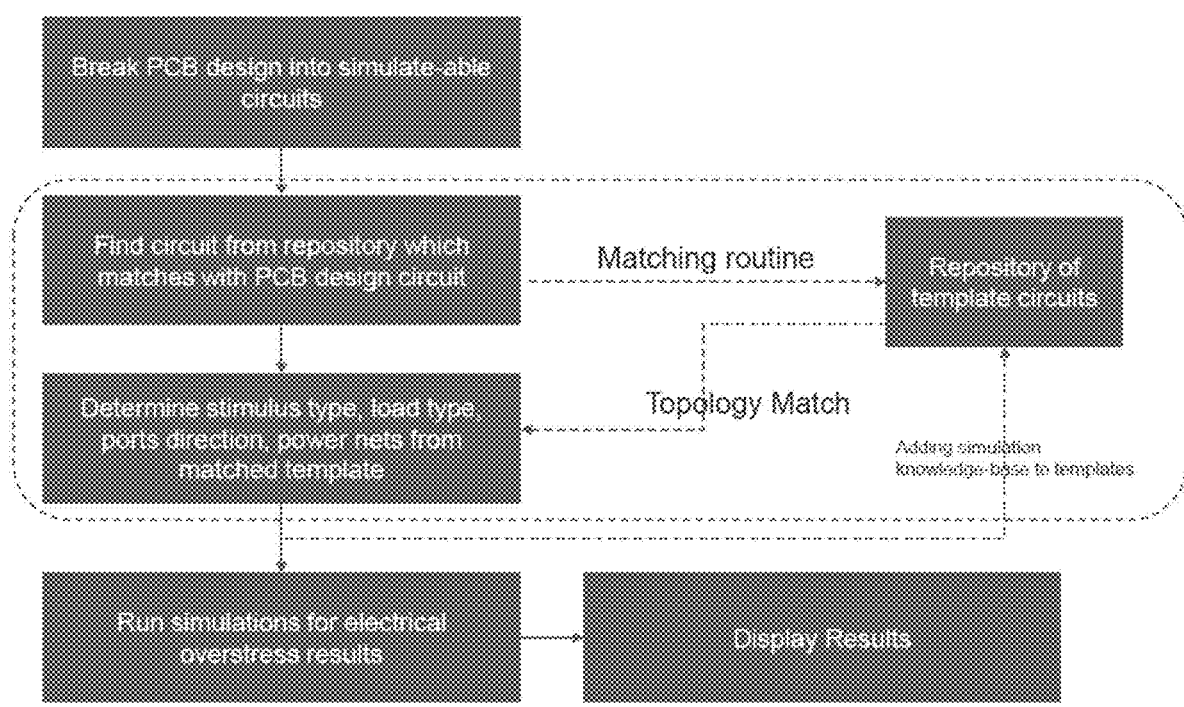
FIG. 34 illustrates a flowchart depicting operations consistent with embodiments of automatic simulation process.

Referring now to FIG. 34, a flowchart showing operations consistent with embodiments of the present disclosure is provided. FIG. 34 shows an approach for using a circuit template for simulations. Embodiments may include breaking the PCB design into a plurality of simulateable circuits. The process may be configured to locate a circuit from the database which matches with the user's PCB design circuit. The process may also determine the stimulus type, load type, ports direction, and/or power nets from the matched template. The process may then run simulations for electrical overstress results and display and results at the graphical user interface. This approach may provide increased accuracy through use of the database while ensuring proper stimulus/load. It should also be noted that embodiments included herein may be configured to match both the template as well as matching the necessary values associated with that template.

Figure 35:
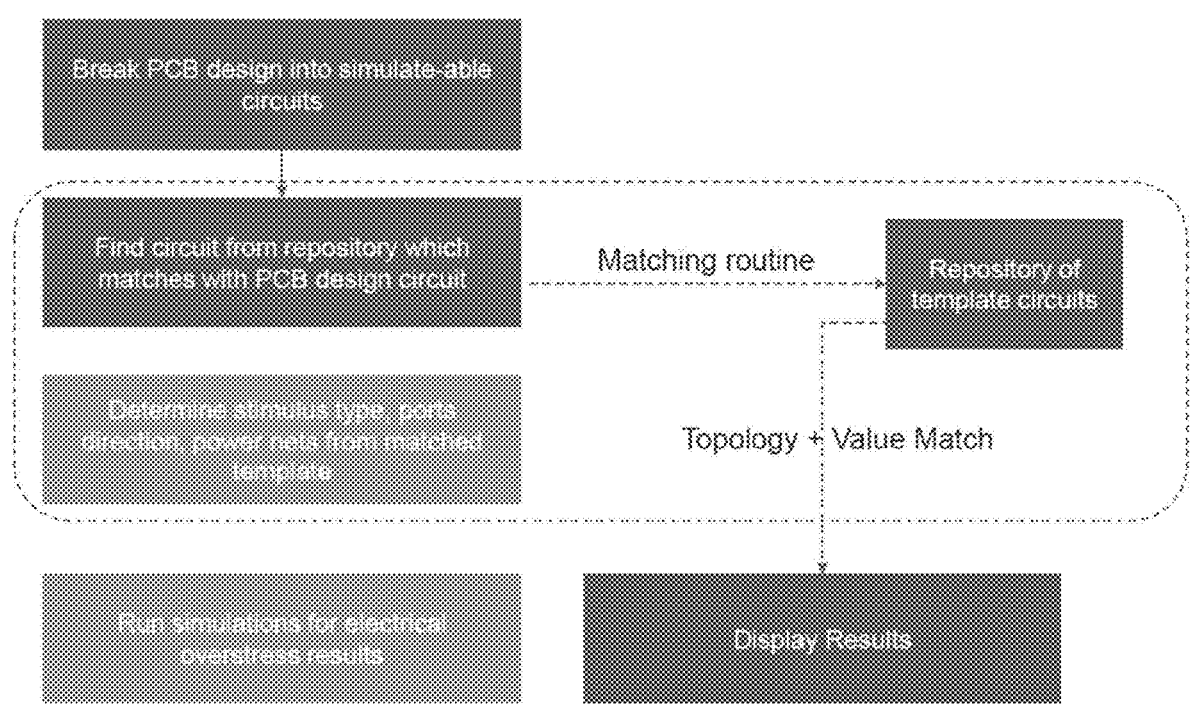
FIG. 35 illustrates a flowchart depicting operations consistent with embodiments of automatic simulation process.

Referring now to FIG. 35, a flowchart showing operations consistent with embodiments of the present disclosure is provided. FIG. 35 shows an approach for using the database to skip simulations. This approach may increase performance through skipping simulations of repeated circuits in PCB.

As discussed above, embodiments included herein may use circuit-matching techniques to simulate analog sub-circuits (e.g., extracted out of PCB schematic) with proper stimulus and load-conditions. Additionally and/or alternatively, embodiments may also include a process to build circuit templates from one or more PCB schematics. The process may identify a representation of a circuit template and provide a use-model to generate the circuit template. The process may provide the ability to automatically add circuits from designs to the database as the designs get analyzed. Embodiments may also include a technique for matching the circuit in a user's design to a template. The system may be configured to determine whether an exact match exists (e.g., a user design circuit that exactly matches in structure with template circuit) and/or whether an in-exact match exists (e.g., a user design circuit that matches approximately with template circuit).

As discussed above, embodiments included herein provide a process that uses circuit-matching to simulate analog sub-circuits (e.g., extracted out of PCB schematic) with proper stimulus and load-conditions. The process may include building a database or repository of templates. The database may include frequently seen analog building blocks in PCB designs. Some of these common analog blocks may include, but are not limited to, amplifiers (e.g., common source, common gate, differential, cascode, op-amp, etc.), converters (e.g., boost converter, buck converter, etc.), high-gate current MOSFET driver, potential divider, rectifier (e.g., half-wave, full-wave, band-wave. The database may include information such as circuit type, ports (e.g., input port, output port, bi-directional port, etc.), stimulus type (e.g., PULSE, DC, SINE, etc.), load type (e.g., resistive, capacitive, etc.), nets (e.g., power nets, ground nets, etc.).

Figure 36:
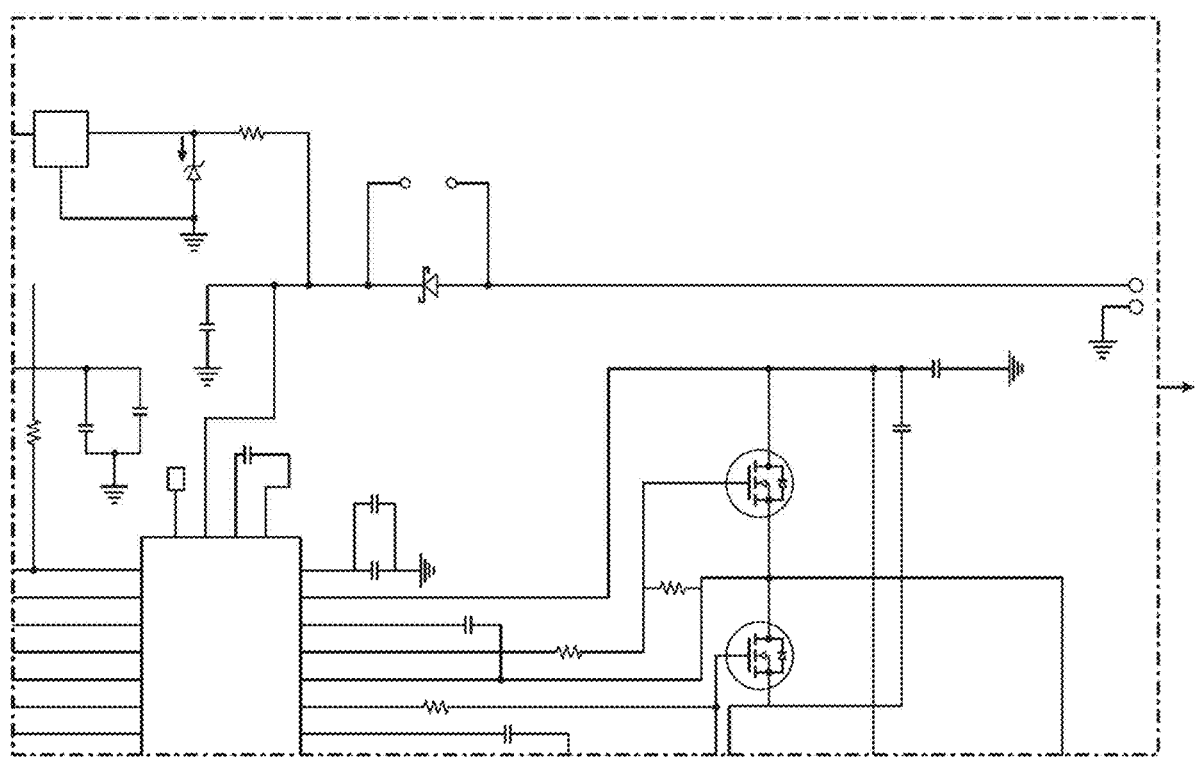
FIG. 36 illustrates an example showing a schematic consistent with embodiments of automatic simulation process.
Figure 37:
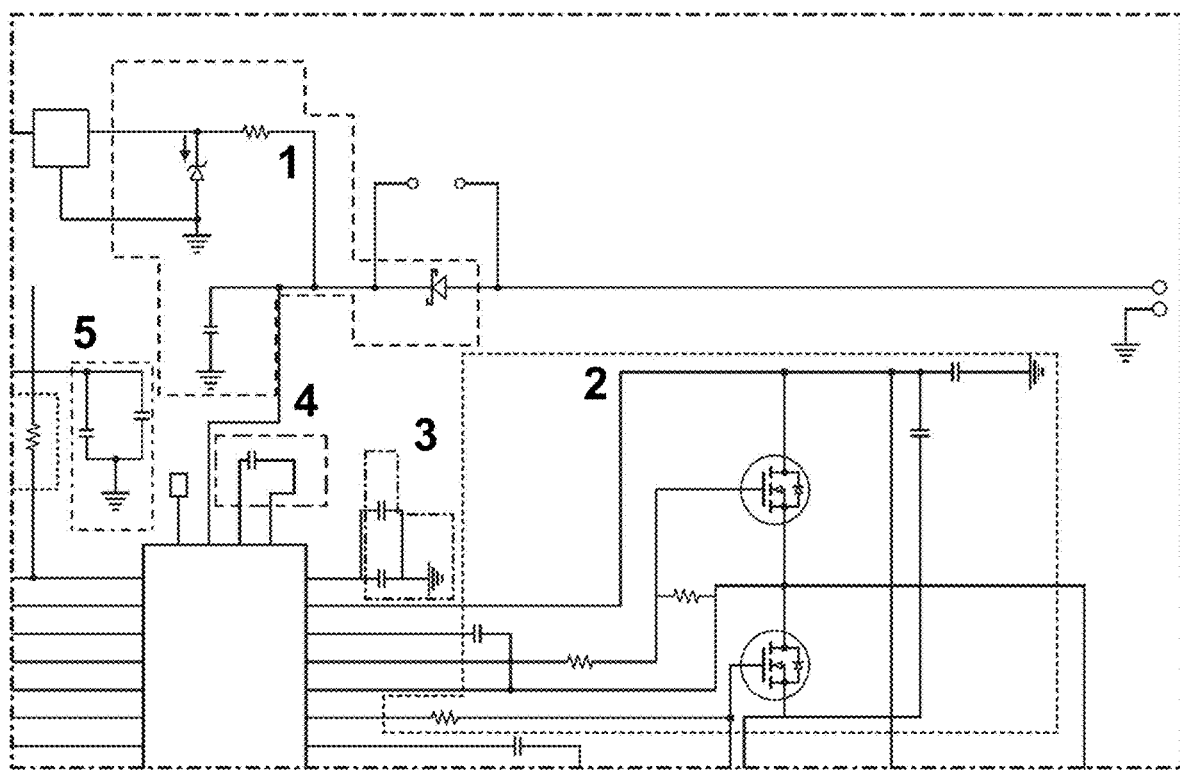
FIG. 37 illustrates an example showing a schematic consistent with embodiments of automatic simulation process.
Figure 38:
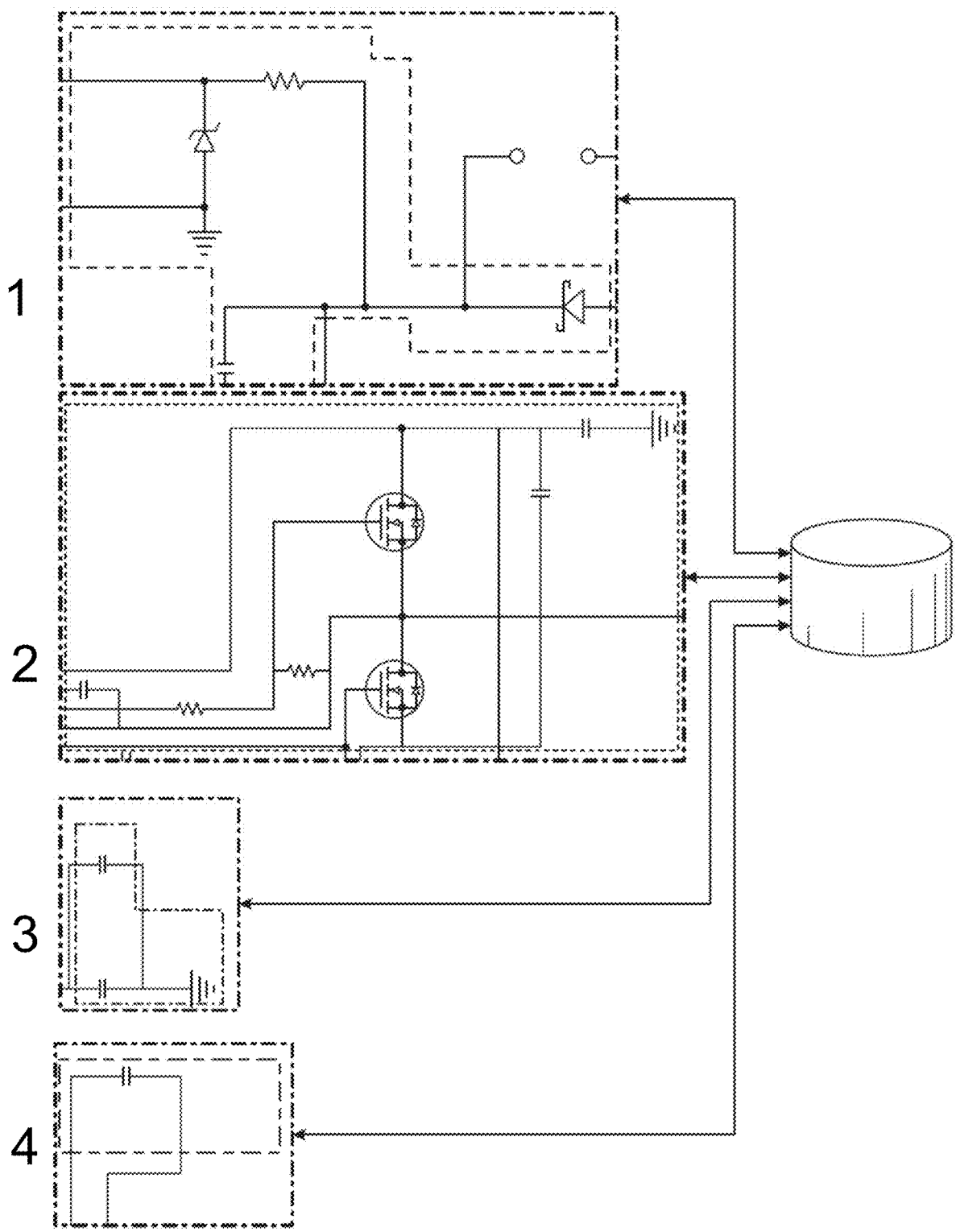
FIG. 38 illustrates an example showing subcircuits consistent with embodiments of automatic simulation process.
Figure 39:
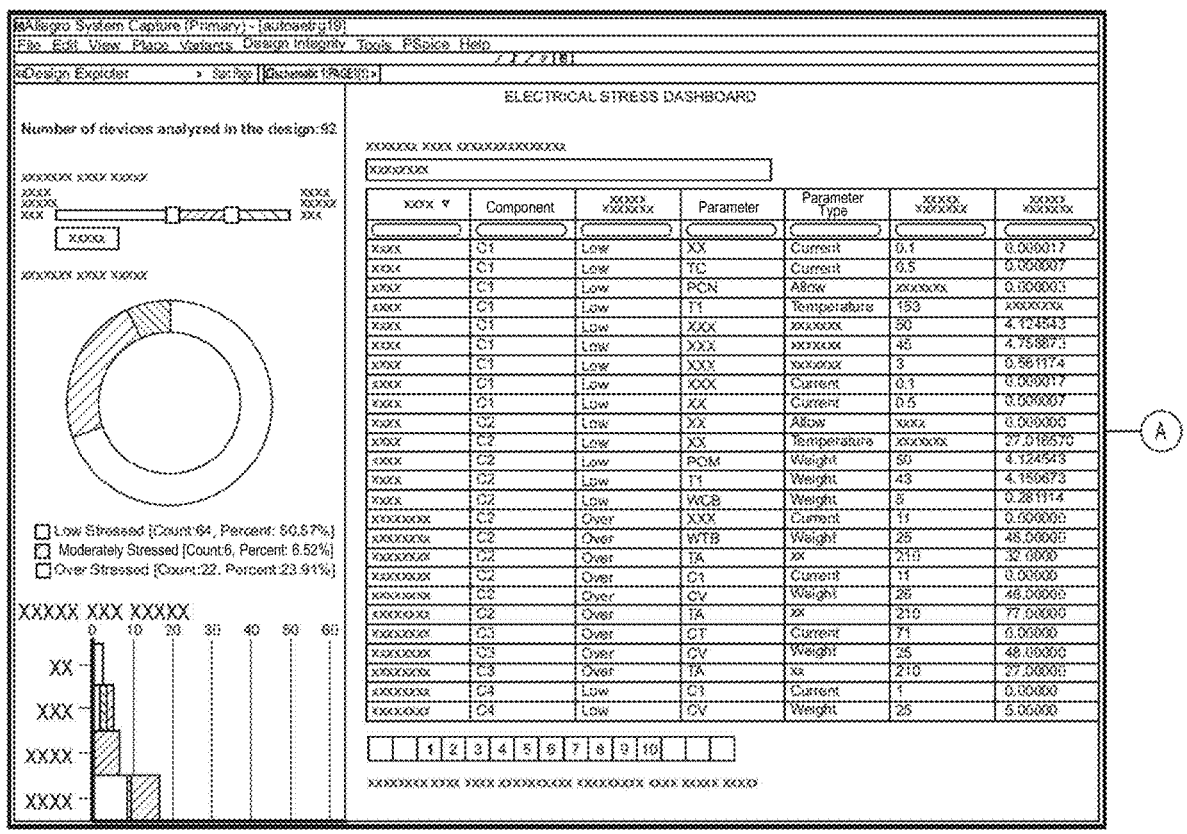
FIG. 39 illustrates an example showing a graphical user interface consistent with embodiments of automatic simulation process.

Referring now to FIGS. 36-38, an embodiment showing an example of breaking a PCB schematic into small simulatable circuits is provided. FIG. 36 shows an example PCB design and a labelled display showing the smaller simulatable circuits are shown in FIG. 37. In FIG. 38, the process may match each small analog circuit (e.g., subcircuits 1-4) to a template to identify the closest match in the database. Once a matched template is identified it may also provide the stimulus and the load setup. The process may return the circuit that matches exactly or most closely with user design's sub-circuit, which may be determined based upon the structural closeness between the circuits. The process may then also return input port and output port information that corresponds to the user's sub-circuit from the matching circuit returned from the database. Information pertaining to stimulus type, load type, power nets, and type of power to be applied may also be provided. Some or all of this information may be available in a graphical user interface such as that shown in FIG. 39. Information about the simulations and accurate electrical over stress computations may be provided through this dashboard.

Figure 40:
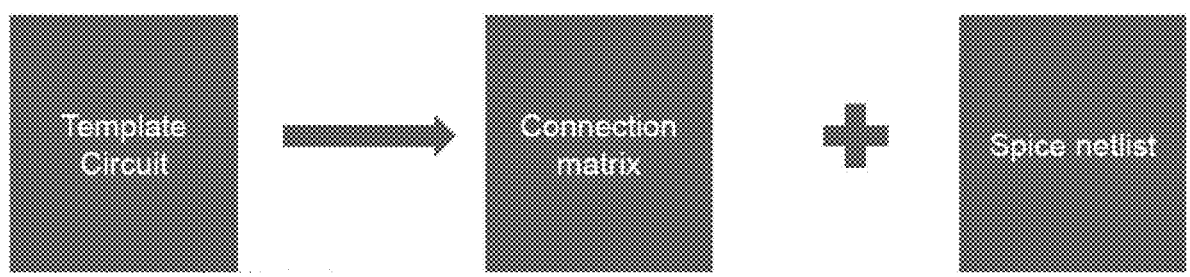
FIG. 40 illustrates a representation of a circuit template consistent with embodiments of automatic simulation process.

In some embodiments, the process may be configured to build circuit templates from a PCB schematic. The representation of the circuit in the database may include both structural information of circuit as well as simulation settings of the circuit. Embodiments included herein provide a representation that helps to lessen storage space, augments faster matching, stores not only connection information, but also related simulation set up. This may be achieved using an arrangement as shown in FIG. 40, namely, a combination of a connection matrix and netlist (e.g. SPICE) to store complete information of the circuit. The matrix may be used for the circuit's structural information (e.g., connectivity, components, etc.) and the netlist may be used for stimulus, load information, etc.

Circuits have been conventionally represented as graphs. Graphs have been used to represent a given circuit's structural information (connectivity) only. Graphs with structural information can be used to do simple matches like resistive networks, and/or digital logic. In order to match analog circuits and re-use them for simulation, information beyond structural connectivity may be required. This information may include, but is not limited to, criticality of components, direction of ports, types of nets (e.g., power or signal), types of devices (e.g., bjt, mos, jfet, etc.), types of pins of the devices (e.g., collector, base, anode, etc.), loads to be driven by circuit, stimulus to power-up the circuit, etc.

In some embodiments, the process included herein may be configured to represent the circuit as an augmented graph. The augmented graph may be stored as a connection matrix where nodes of the graph represent components in the circuit, edges of the graph representing edges in circuit, with edges weighted.

In some embodiments, nodes and edges of the graph may be additionally qualified with various types of additional information. Some types of information may include, but are not limited to, direction of interface ports, criticality of components, net type (e.g., signal, power, ground, device types, pin-types, etc.). This matrix may be stored in a light-weight text file and corresponding file (e.g., SPICE, etc.). The corresponding file may include the simulation setup.

In some embodiments, the connection matrix may be a representation of an augmented graph, where the graph may be augmented with additional properties on its vertices and edges. Connectivity information may be stored as a two-dimensional connection matrix. Components of the circuit may be additionally qualified with criticality of components information. Nets of the circuit may be qualified with various types of information, including, but not limited to, whether it is an interface net, its direction if it is an interface net (e.g., INPUT/OUTPUT/BIDIR), type of net (e.g., POWER/SIGNAL, etc.). This matrix may be stored in a light-weight text file. Entry [i][j] in matrix, that is, in $i_{th}$ row and $j_{th}$ column of the matrix gives the type of pin used for connecting component at row i to net at column j. This allows for distinguishing between different pin types. For example, a diode's pin (e.g., ANODE, CATHODE), a MOSFET's pin (e.g., Gate, Source, Drain), etc.

In some embodiments, the process may create variants of a circuit schematic through criticality. Defining property "criticality" with a component helps in creating variants of the design. A component may be defined as "non-critical" when the absence of this component may create another variant of the circuit, with nature same as base design. That is, for both the base design and its variant, the same simulation set up may be used. In some embodiments, the criticality of a component can be weighted instead of binary (e.g., a criticality of 1 being most important, etc.)

Figure 41:
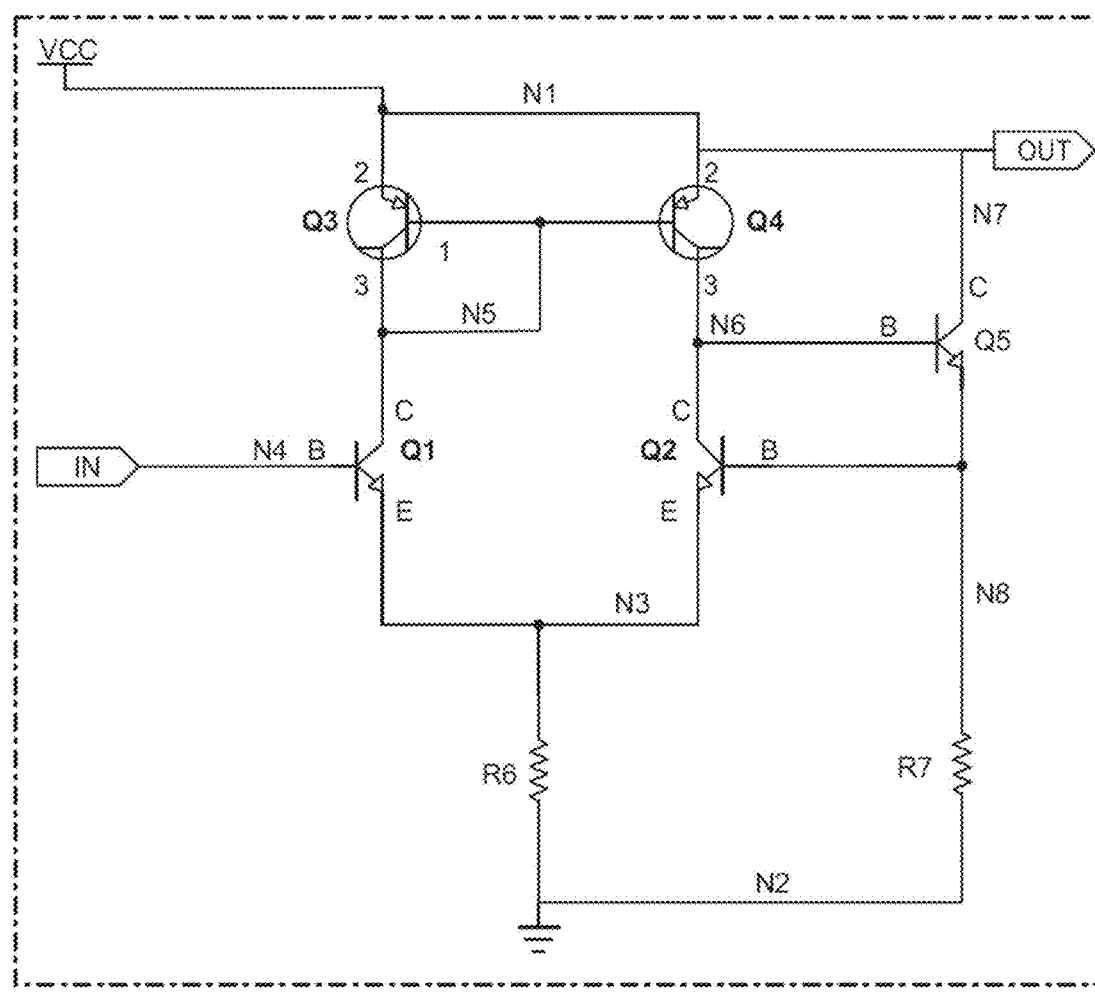
FIG. 41 illustrates an example showing a schematic consistent with embodiments of automatic simulation process.
Figure 42:
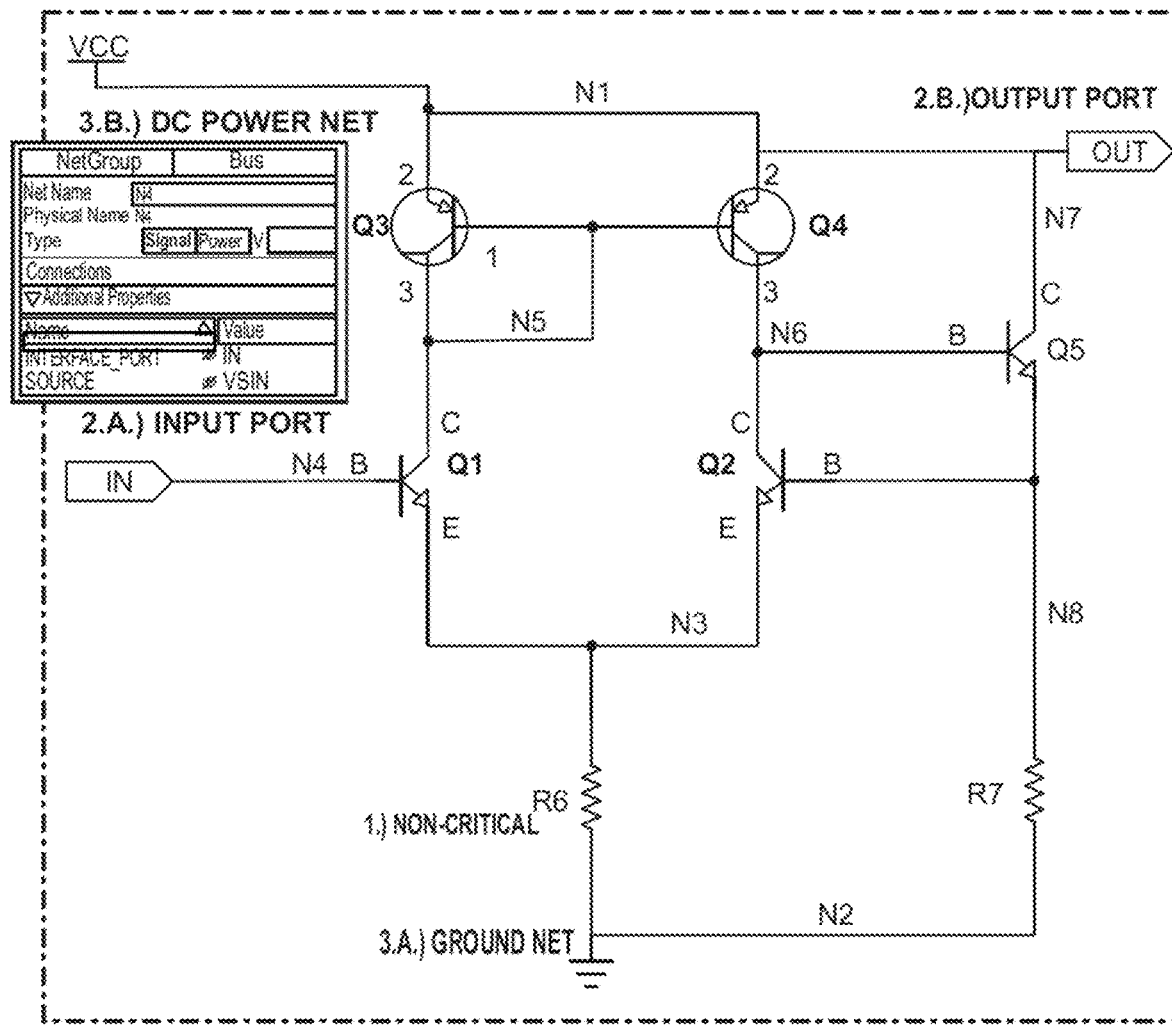
FIG. 42 illustrates an example showing a schematic consistent with embodiments of automatic simulation process.

Referring now to FIGS. 41-42, an example of a template circuit for a current to voltage converter is provided. For connectivity purposes, this circuit includes numerous components, for example, Q1, Q2, Q3, Q4, Q5, R6, and R7 as well as nets, N1, N2, N3, N4, N5, N6, N7, N8. Additional qualifying information in this particular example may include criticality of components, interface ports based on connectivity to rest of circuit, and net types (e.g., signal, power, etc.).

Referring now to FIG. 43, an example of a circuit template represented as a connection matrix is provided. In this example, M corresponds to the number of devices in the circuit, N corresponds to the number of nets in circuit, with (M+2) rows and (N+1) columns. As shown in FIG. 43, with regards to components and nets, this example includes Devices: Q1, Q2, Q3, Q4, Q4, R6, R7 and Nets: N1, N2 N3, N4, N5, N6, N7, N8. In some embodiments, prime numbers may be used for denoting nets connected to pin connections of devices. It should be noted that the system may provide the ability to extend the net-type to user-defined nets and/or system-definable nets with finite set of types.

In some embodiments, the connection matrix may be enhanced with simulation set up information. With regard to interface nets, a "1" may indicate an input port and a "2" may indicate an output port. For example, the "1" corresponding to the N4 column indicates that N4 is an INPUT port and the "2" corresponding to N7 indicates that net N7 is OUTPUT port. With regard to power type the "0" may indicate no power, the "1" indicates DC, the "2" indicates PULSE and the "3" indicates AC. Nets N1 and N2 are DC power nets and Net N4 is a SINE net. With regard to critical components, "1" may indicate critical and "0" for non-critical.

Table 1 provided below provides an example showing one approach indicating how the connection matrix may obtain entries for different pins of different devices.

TABLE 1

| Device Type | Pin Type | Pin Label |
|---|---|---|
| Resistor | — | 2 |
| NPN BJT | Base | 13 |
| | Collector | 11 |
| | Emitter | 3 |
| PNP BJT | Base | 17 |
| | Collector | 5 |
| | Emitter | 7 |
| Diode | Cathode | 19 |
| | Anode | 23 |
| Capacitor | | 29 |
| Pad | | 31 |
| Inductor | | 37 |
| N-Channel MOSFET | Drain | 41 |
| | Gate | 43 |
| | Source | 47 |
| P-Channel MOSFET | Drain | 53 |
| | Gate | 59 |
| | Source | 61 |
| JFET | Drain | 67 |
| | Gate | 71 |
| | Source | 73 |

Referring also to FIG. 44, an example showing the circuit representation as a SPICE netlist is provided. FIG. 44 shows a SPICE model corresponding to a connection matrix for purposes of simulations. In this particular example, a 10 Mega ohm resistor is used as a load resistor and a sine stimulus of 5 V amplitude and 2 Mhz frequency is to be applied.

Figure 45:
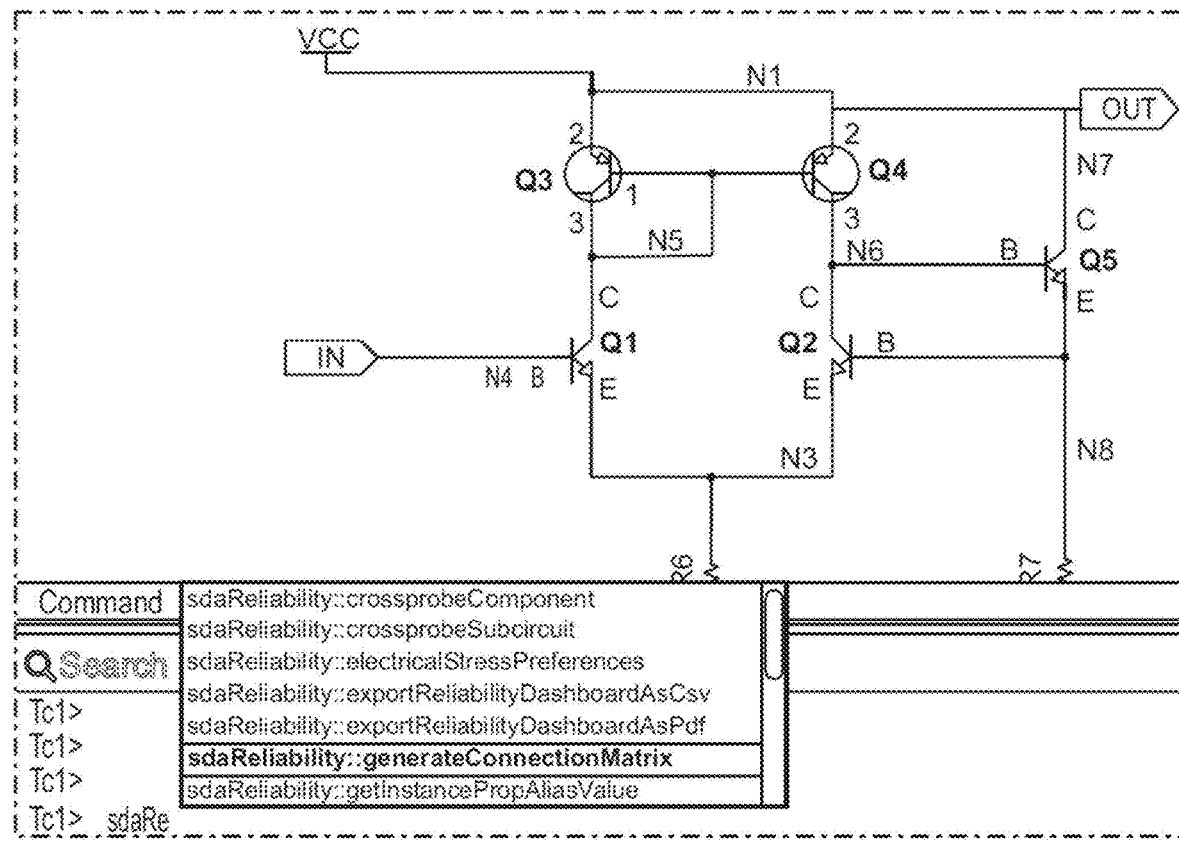
FIG. 45 illustrates an example showing a graphical user interface consistent with embodiments of automatic simulation process.

Referring now to FIG. 45, a graphical user interface showing the ability to generate a template through a schematic circuit is provided. In this example, the circuit may be drawn using a front end schematic tool. Input/Output ports may be specified by the user and may be followed by the generation of a template represented by matrix. This may be implemented TCL API: generateConnectionMatrix. An example of a corresponding voltage_converter.txt file is provided below:

```
VCC, N5, N6, N3, N4, N8, N7, GND
Q3, 7, 85, 0, 0, 0, 0, 0, 0
Q4, 7, 17, 5, 0, 0, 0, 0, 0
Q1, 0, 11, 0, 3, 13, 0, 0, 0
Q2, 0, 0, 11, 3, 0, 13, 0, 0
Q5, 0, 0, 13, 0, 0, 3, 11, 0
R6, 0, 0, 0, 2, 0, 0, 0, 2
R7, 0, 0, 0, 0, 0, 2, 0, 2
Interface Net, 0, 0, 0, 0, 1, 0, 2, 0
Power Type, 1, 0, 0, 0, 3, 0, 0, 4
```

Figure 46:
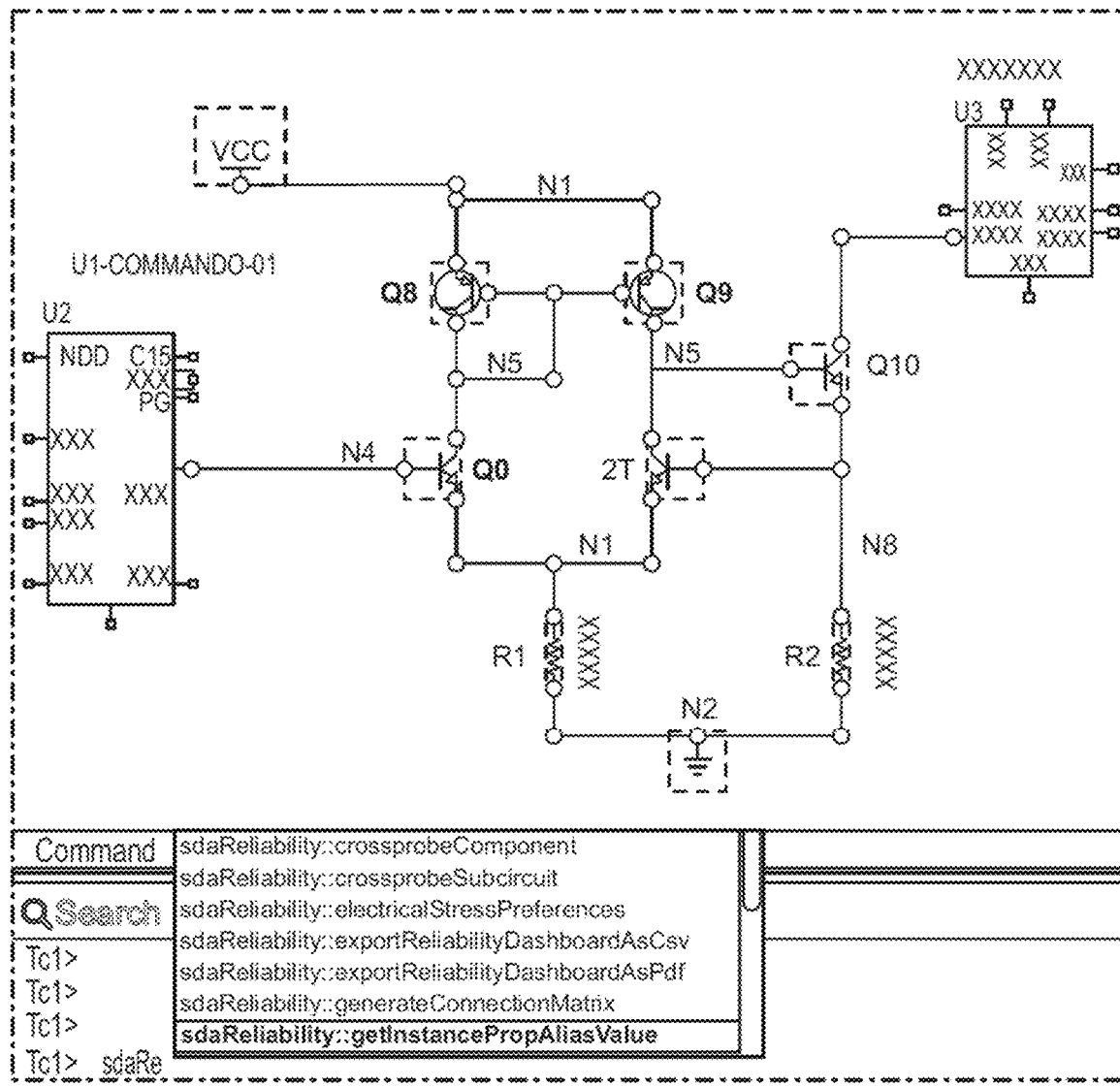
FIG. 46 illustrates an example showing a graphical user interface consistent with embodiments of automatic simulation process.

Referring now to FIG. 46, a graphical user interface showing the ability to generate a template as part of a sub-circuit extracted from the main PCB schematic is provided. In operation, the process may include selecting the device to extract the circuit that impacts this device performance. The circuit topology may be highlighted with an automatic annotation of input, output ports and power-nets. In some embodiments, ports information, stimulus information and power net information may be changed by providing information as properties on pins and nets respectively. The circuit may be automatically added into the database as a template as the design gets analyzed. Additionally and/or alternatively, the user can also manually extract the circuit into representative template matrix and netlist. An example of a corresponding voltage_converter.txt file is provided below:

```
_| VCC, N5, N6, N3, N4, N8, N7, GND
Q8, 3, 143, 0, 0, 0, 0, 0, 0
Q9, 3, 11, 13, 0, 0, 0, 0, 0
Q6, 0, 17, 0, 7, 5, 0, 0, 0
Q7, 0, 0, 17, 7, 0, 5, 0, 0
Q10, 0, 0, 5, 0, 0, 7, 17, 0
R6, 0, 0, 0, 2, 0, 0, 0, 2
R7, 0, 0, 0, 0, 0, 2, 0, 2
Interface Net, 0, 0, 0, 0, 1, 0, 2, 0
Power Type, 1, 0, 0, 0, 0, 0, 0, 4
```

Embodiments of the present disclosure may include a process for matching the circuit in the user's design to a template. The user may have their own user-design circuit and access to the database described above. The process may be configured to find the appropriate circuit from the database that best matches the user-design circuit. This approach has numerous advantages over existing approaches. The processing time to find a match does not increase exponentially while finding the circuit from template that matches with the circuit extracted from PCB design. The process uses intelligent pruning of the search space where the circuit-match may be preceded by rough categorization of templates to be searched.

Figure 47:
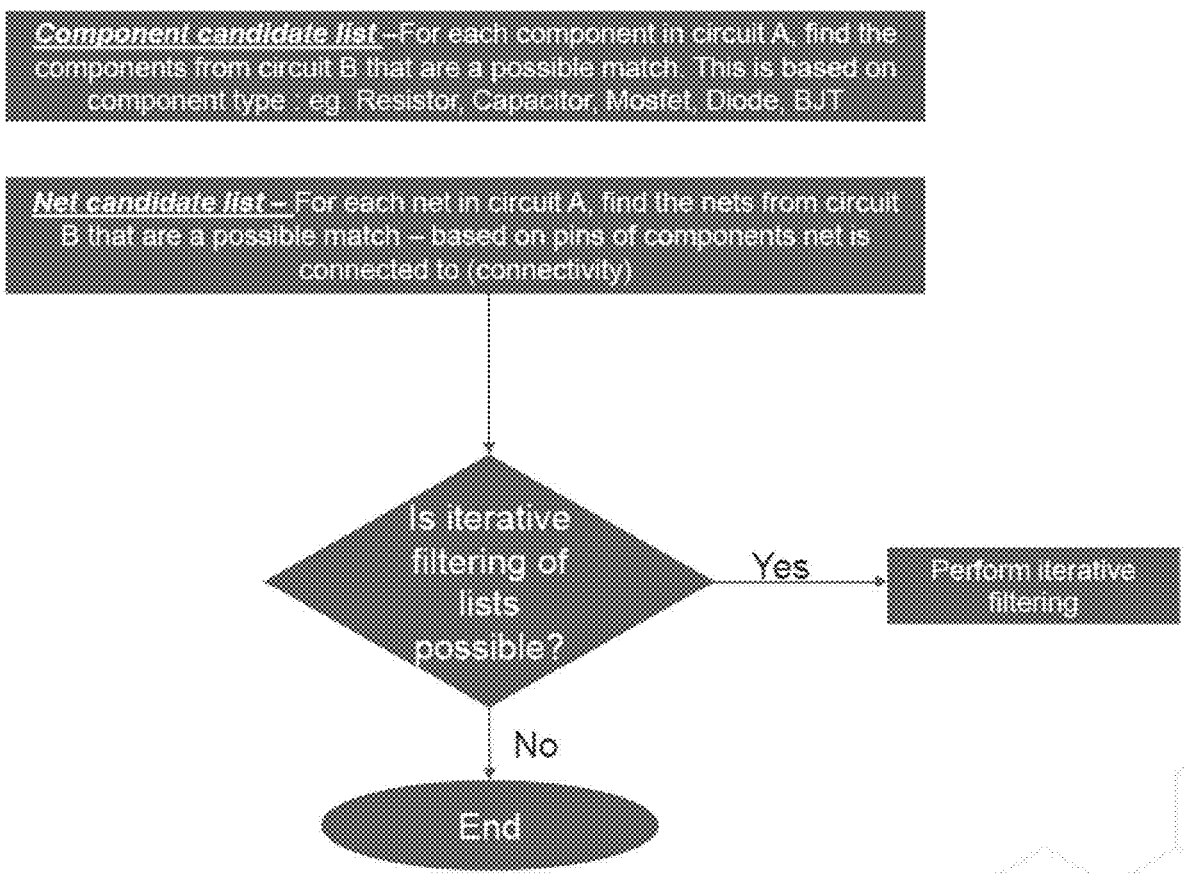
FIG. 47 illustrates a flowchart depicting operations consistent with embodiments of automatic simulation process.

Referring now to FIGS. 47-51, embodiments directed towards the circuit matching process are provided. The process may include setting circuit A to be the analog circuit extracted from user design. The process may then iterate through each circuit of the database as indicated by the example pseudocode provided below:

set circuit B to be the iterator circuit
   Set isMatchFound=Circuit_match(circuit A, circuit B)
   If (isMatchFound):
   Print "Circuit from knowledge-base found that matches with user-design circuit"
   Return FIG. 47 shows an example flowchart consistent with embodiments of the present disclosure. Using the operations of FIG. 47, the process provides a methodology for finding exactly the same circuit from repository as the user's circuit. As shown in FIG. 47, the process may analyze both component candidate lists and net candidate lists. For each component in circuit A the process may locate the components from circuit B that are a possible match. This may be based on the component type. For each net in circuit A, the process may locate the nets from circuit B that are a possible match based on the pins of components the net may be connected to, referred to herein as connectivity. Based upon this information the process may determine whether or not iterative filtering of these lists is possible.

Figure 48:
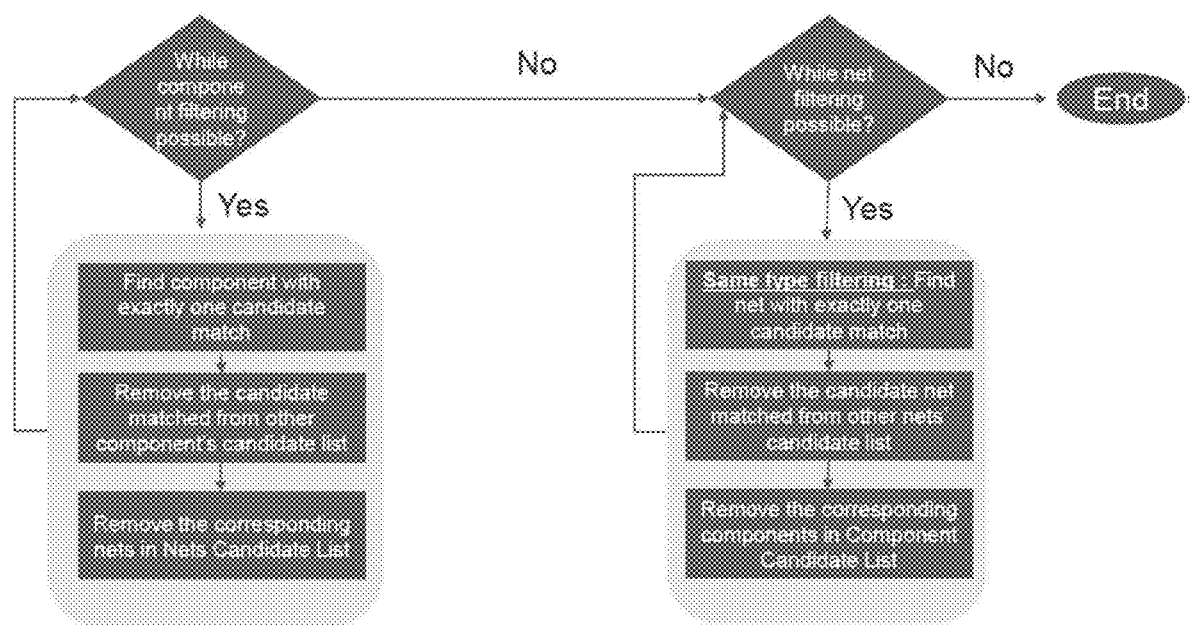
FIG. 48 illustrates a flowchart depicting operations consistent with embodiments of automatic simulation process.

Referring now to FIG. 48, a flowchart showing operations corresponding to iterative filtering approaches is provided. Iterative filtering may include both same type filtering and neighborhood filtering, which are discussed below in further detail. If component filtering is possible, the process may locate the component with exactly one candidate match, remove the candidate matched from other component's candidate list, and remove the corresponding nets in the nets candidate list. If net filtering is possible, the process may locate a net with exactly one candidate match, remove the candidate net matched from the other nets' candidate list and remove the corresponding components in the component candidate list.

Figure 49:
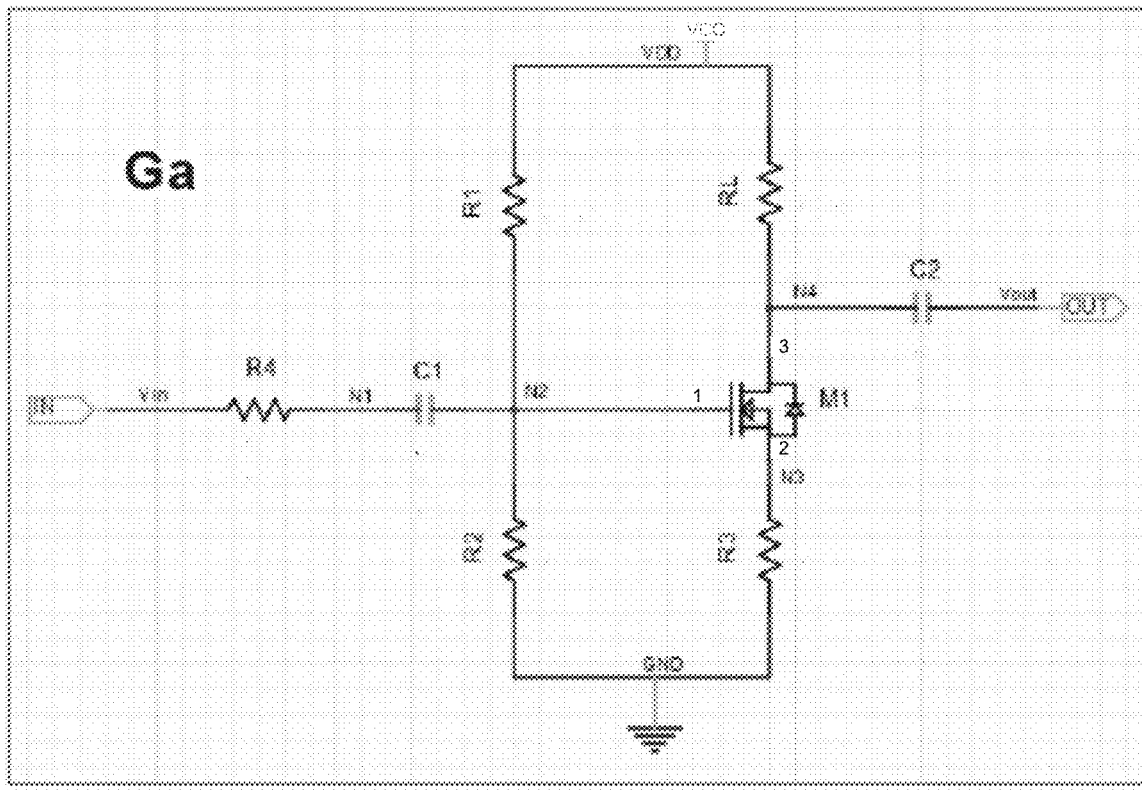
FIG. 49 illustrates an example schematic consistent with embodiments of automatic simulation process.
Figure 50:
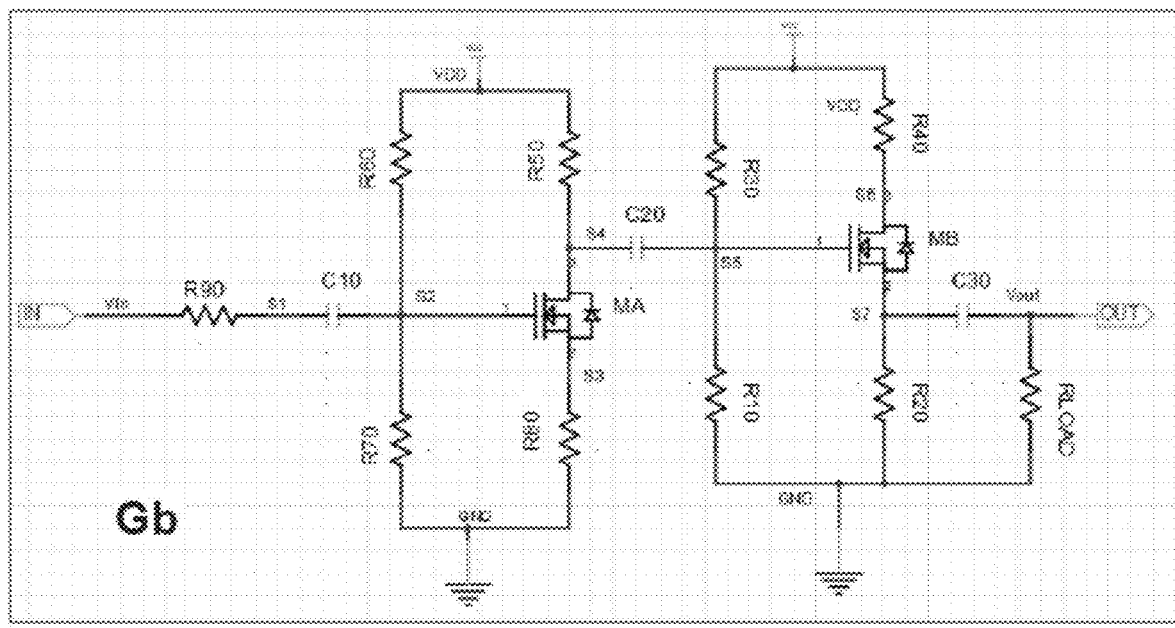
FIG. 50 illustrates an example schematic consistent with embodiments of automatic simulation process.

Referring now to FIGS. 49-50, an example showing the process for detecting a subcircuit (e.g., "Ga") from a larger circuit (e.g., "Gb") is provided. An example component candidate list and nets candidate list are shown in each of FIG. 49 and FIG. 50, respectively.

Figure 51:
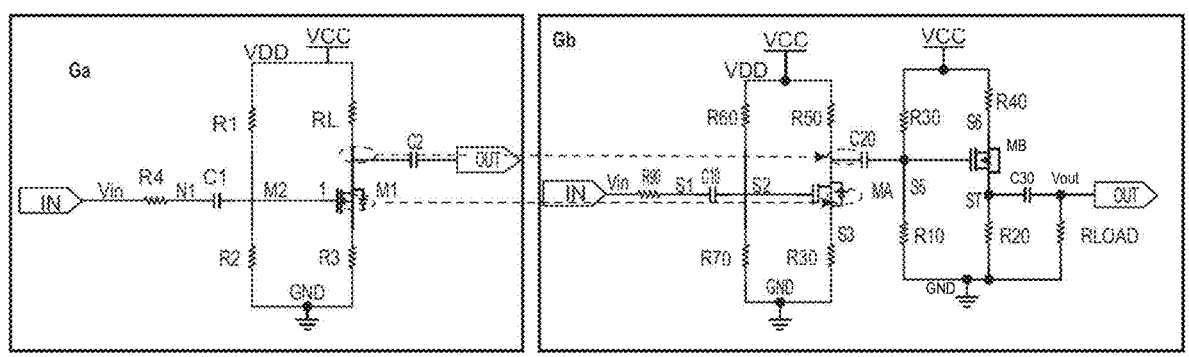
FIG. 51 illustrates an example schematic consistent with embodiments of automatic simulation process.

Referring also to FIG. 51, a graphical user interface is provided illustrating an iterative filtering approach is provided. In this particular example, the nets N4 and N3 have single candidates. This example illustrates an embodiment of neighborhood refining. In this example, the neighborhood devices of N4 include M1, C2 and RL. The neighborhood devices of its candidate S4 include MA, C20 and R50. Accordingly, in the candidate list of M1, C2 and RL, the process may remove all other candidates except MA, C20 and R50 respectively. Similarly, the neighborhood devices of N3 include M1 and R3. The neighborhood devices of its candidate S3 include MA and R80. As such, in candidate list of M1 and R3, the process may be configured to remove all other candidates except MA and R80 respectively. Accordingly, the process determines that circuit Ga exists in circuit Gb. In this example, the components in circuit Ga that map with components in circuit Gb include (M1, MA), (R3, R80), (RL, R50), (R1, R60), (R2, R70), (R4, R90), (C2, C20). The process also determines that nets in circuit Ga that map with nets in circuit Gb include (N4, S4), (N1, S1), (Vin, Vin), (Gnd, Gnd), and (N3, S3).

Figure 52:
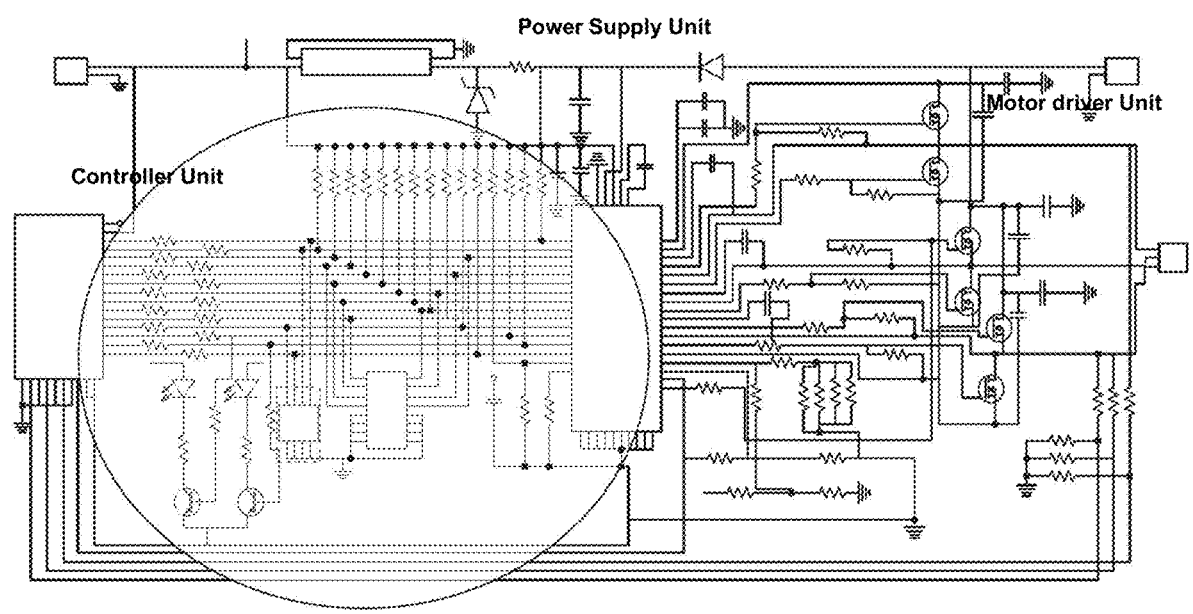
FIG. 52 illustrates an example schematic consistent with embodiments of automatic simulation process.
Figure 53:
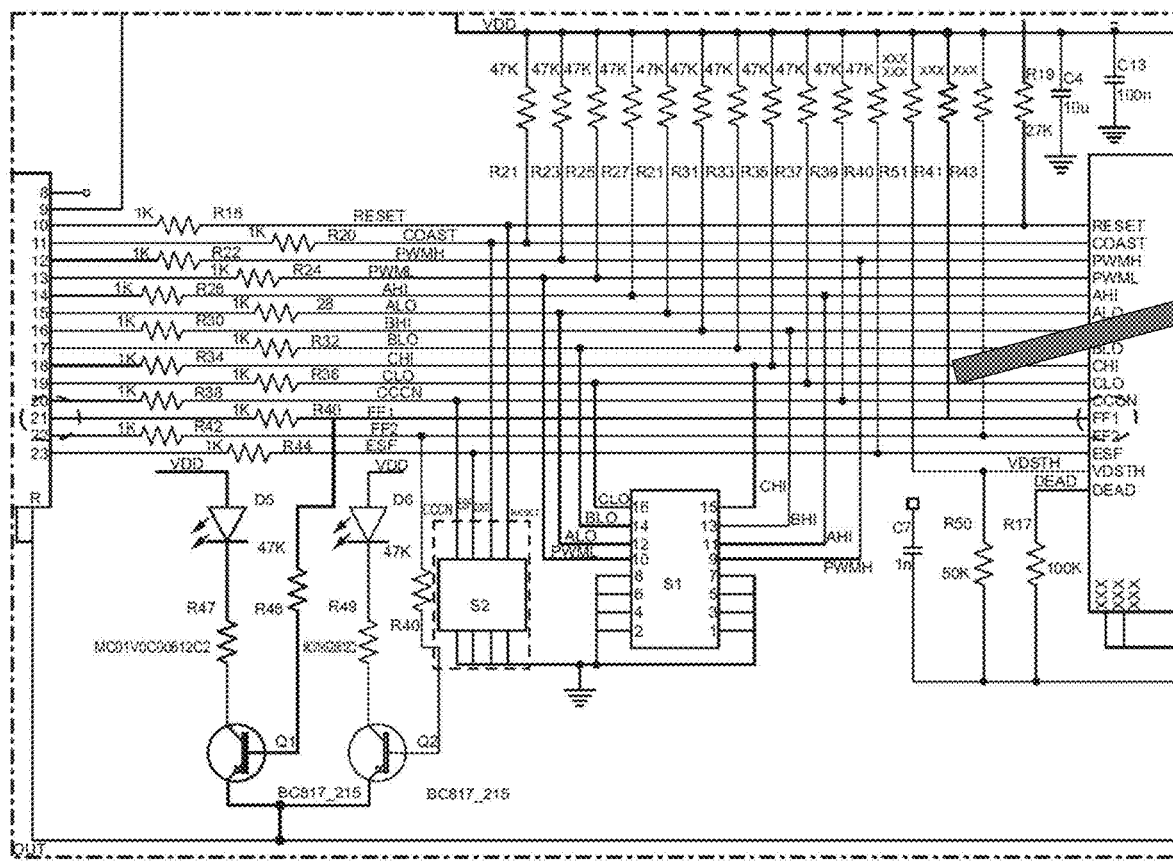
FIG. 53 illustrates an example schematic consistent with embodiments of automatic simulation process.
Figure 54:
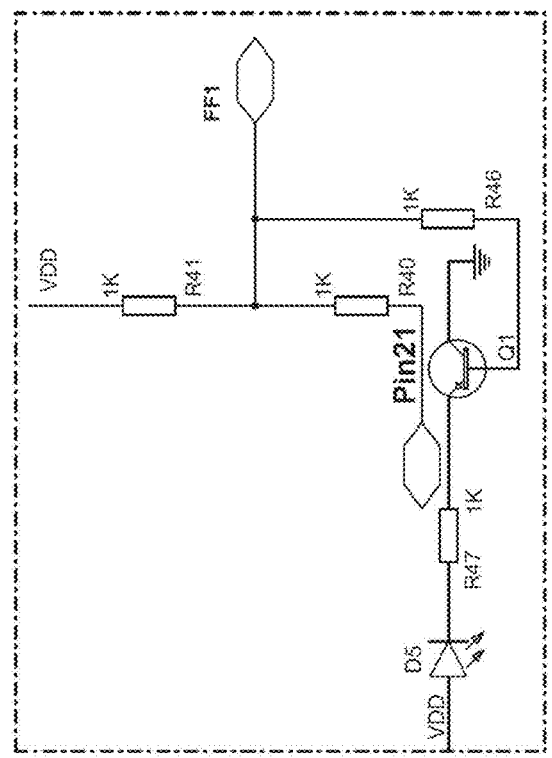
FIG. 54 illustrates an example schematic consistent with embodiments of automatic simulation process.
Figure 55:
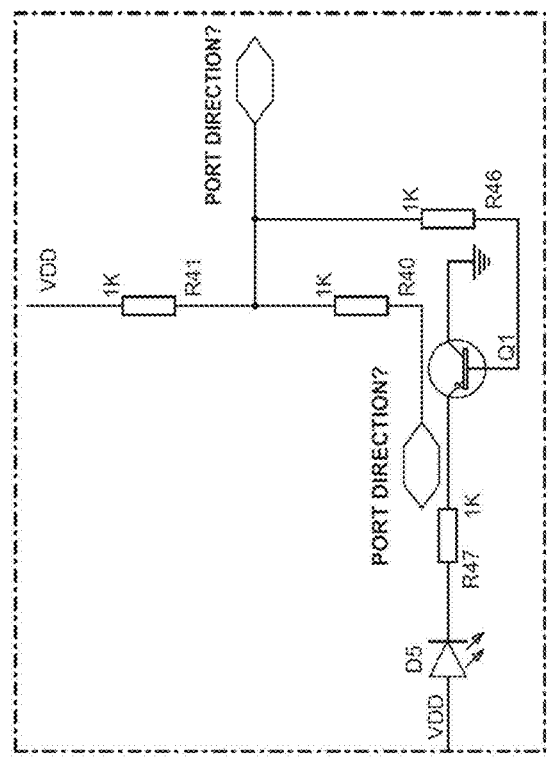
FIG. 55 illustrates an example schematic consistent with embodiments of automatic simulation process.

Referring now to FIGS. 52-59, embodiments of the present disclosure showing an example of a controller unit associated with an automotive board design are provided. Embodiments included herein may provide an accurate electrical overstress analysis of a PCB by identifying parts of PCB circuit through the use of the circuit-matching approaches described herein. FIG. 52 displays an example automotive board design with the controller unit circled and FIG. 53 displays an example of the controller unit with the sub-circuit extracted. FIG. 54 shows an example of the sub-circuit after auto-extraction from the PCB design. FIG. 55 shows that this particular circuit does not include any information regarding how to power up the circuit. In this example, the ports appeared to indicate interface of the circuit to ICs and there is no information regarding how to excite the ports.

Figure 56:
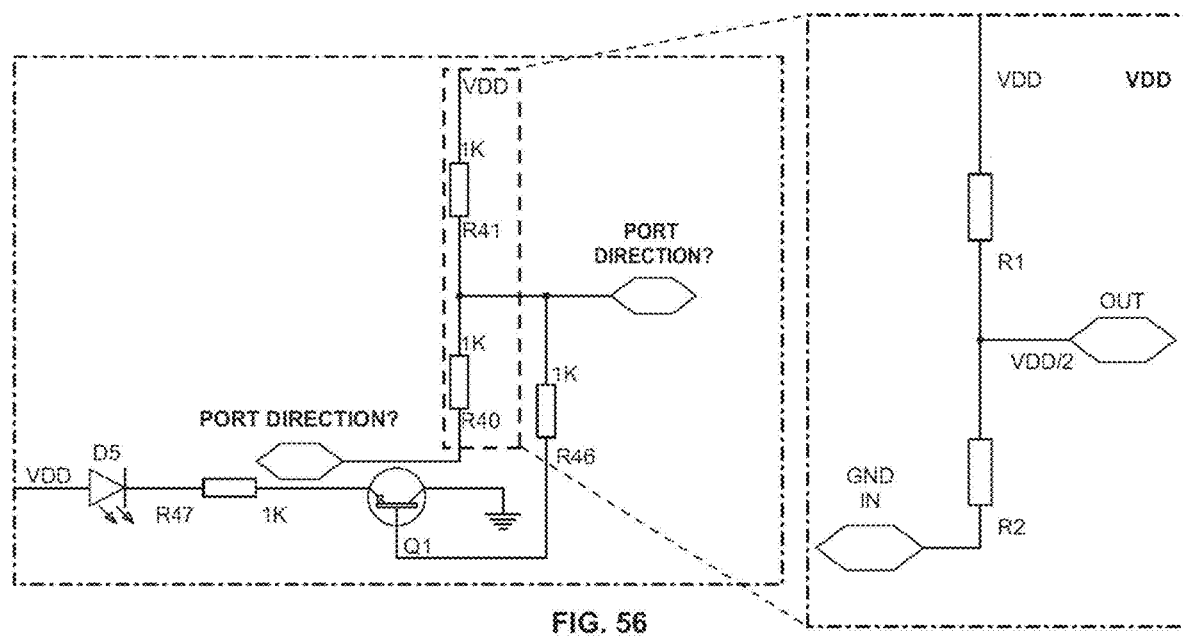
FIG. 56 illustrates an example schematic consistent with embodiments of automatic simulation process.
Figure 57:
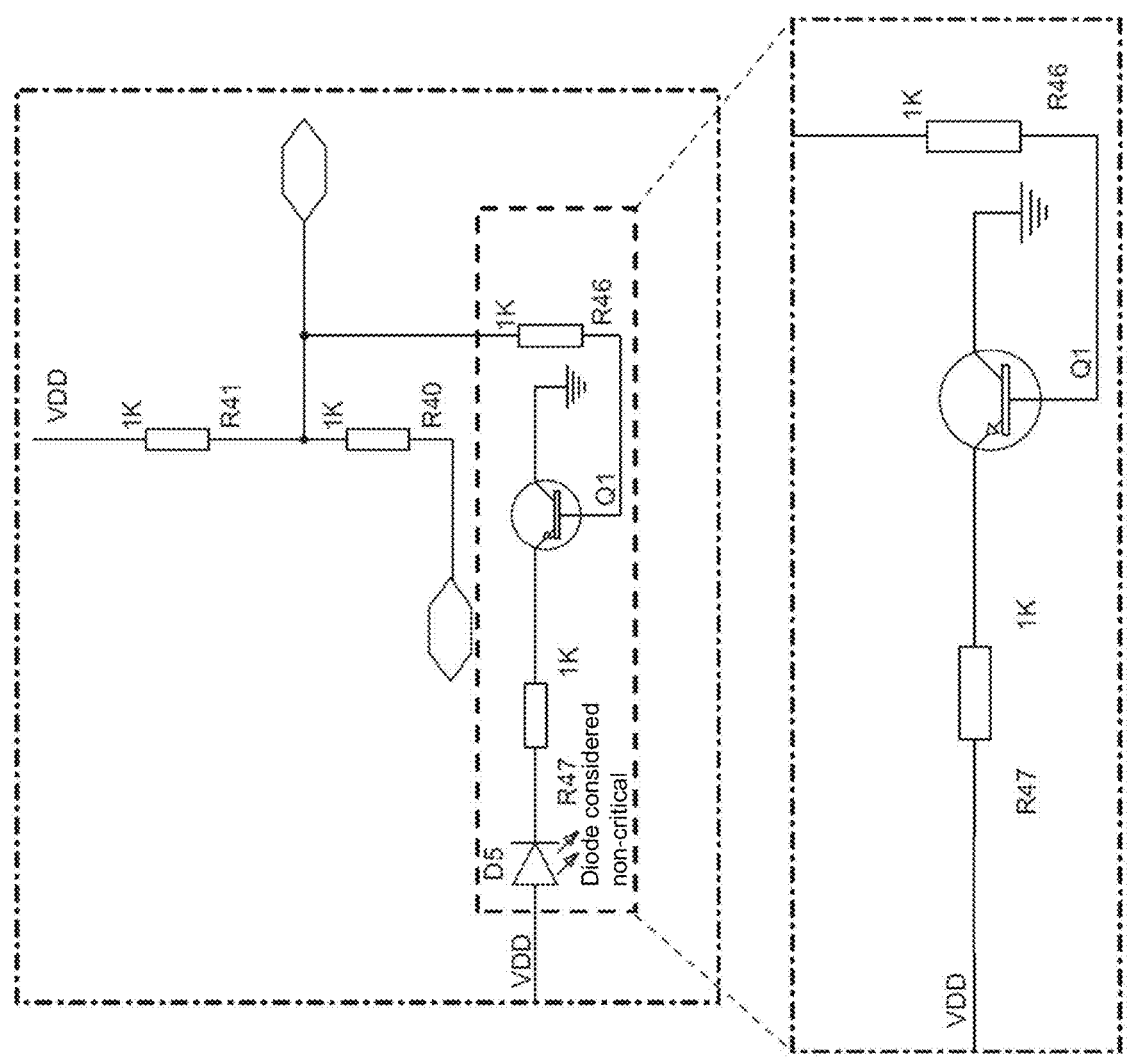
FIG. 57 illustrates an example schematic consistent with embodiments of automatic simulation process.

Accordingly, FIG. 56 displays an example where the process has determined that the circuit-match was successful for a first portion of sub-circuit. This example shows a matched potential divider/biasing circuit. The template circuit matched is shown as a POTENTIAL DIVIDER template circuit shown in the right-hand portion of FIG. 56. FIG. 57 displays a circuit-match successful for a second portion of the sub-circuit. This example shows a matched PNP switching transistor circuit leading to accurate simulations with bias from previously identified portion. The template circuit matched is shown at the bottom of FIG. 57 as a PNP switching topology with diode ignored. The process may provide the ability to synthesize large templates from small templates. This provides another source for enhancement of knowledge-base. For example, if multiple templates match with a user design circuit, the process provides the ability to synthesize large templates from small templates that have matched in the database and then adding them to the database.

Figure 58:
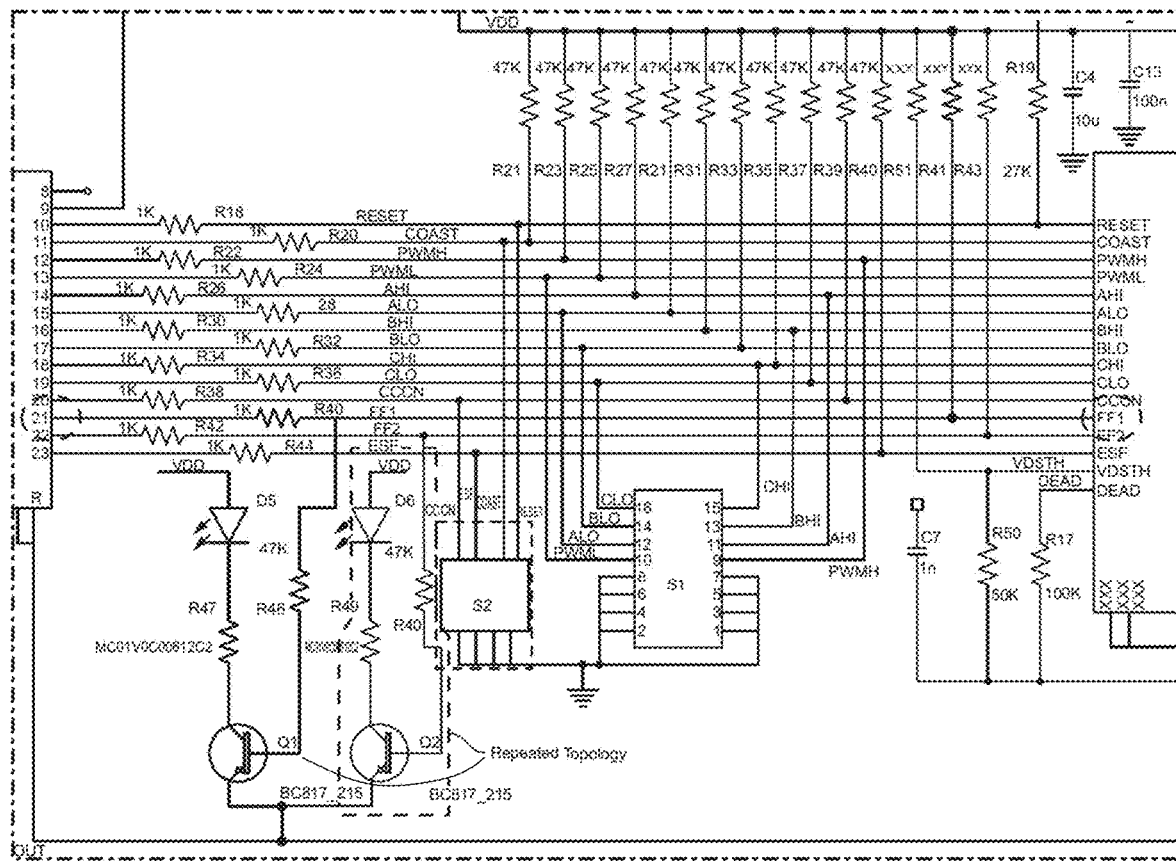
FIG. 58 illustrates an example schematic consistent with embodiments of automatic simulation process.
Figure 59:
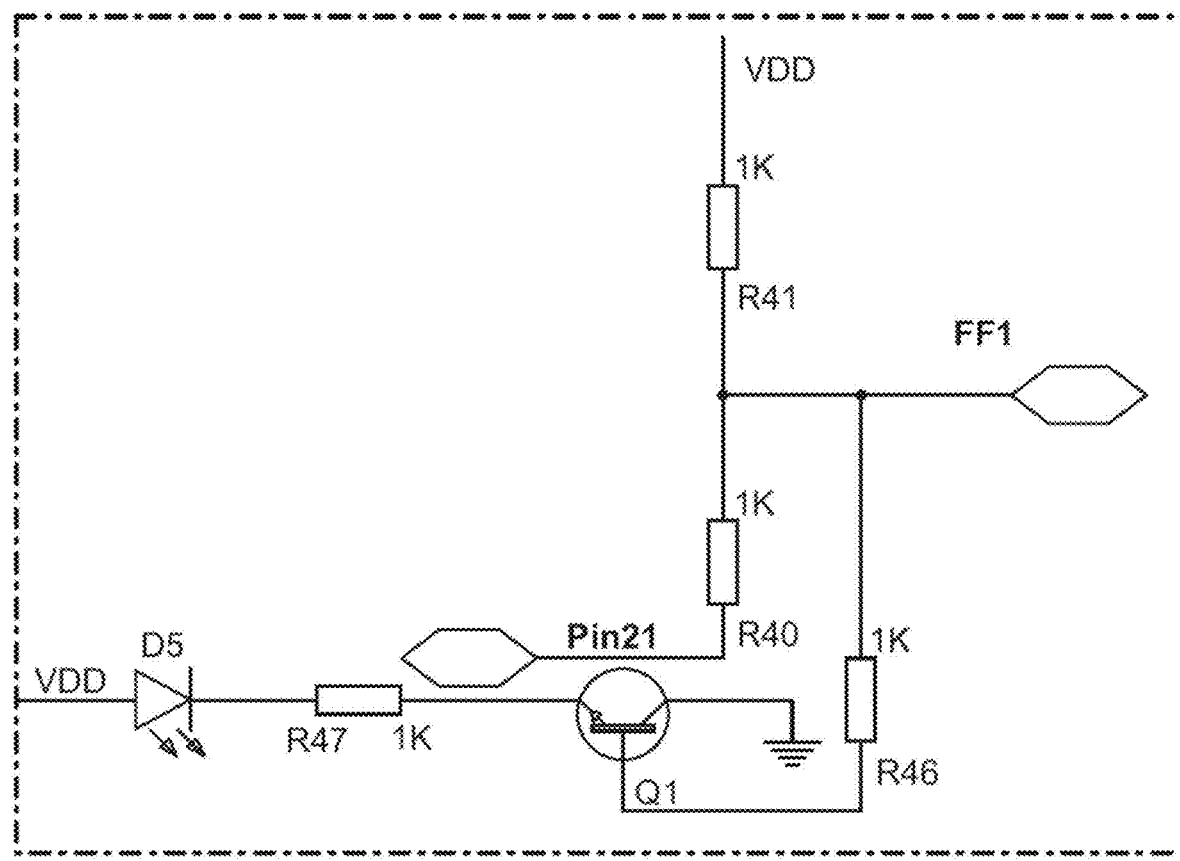
FIG. 59 illustrates an example schematic consistent with embodiments of automatic simulation process.

Referring now to FIGS. 58-59, an example showing a PCB design and the auto-extracted subcircuit are displayed. In some embodiments, simulations of a repeated topology may be skipped if it matched the previous iteration. FIG. 58 shows the user's PCB design and FIG. 59 shows the extracted subcircuit.

Figure 60:
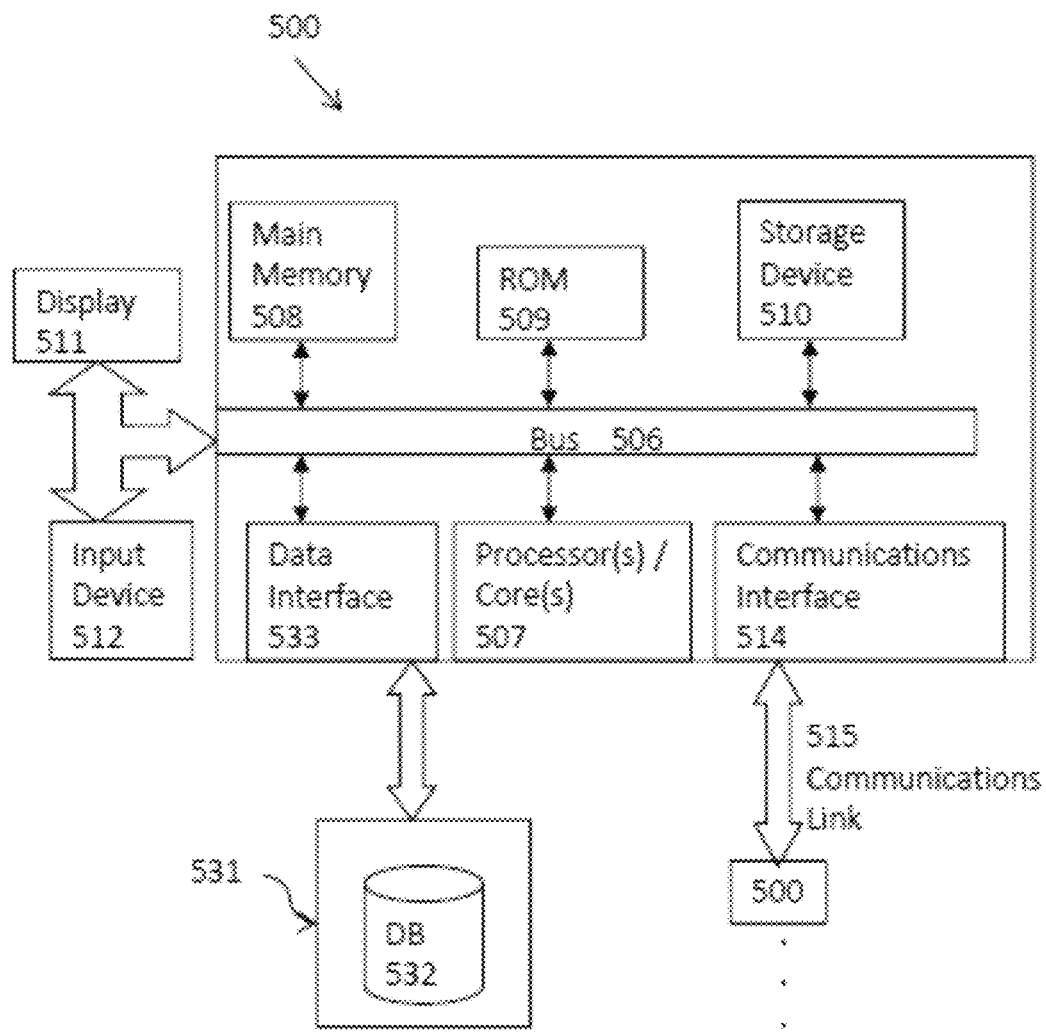
FIG. 60 illustrates a system diagram that may be used to implement one or more embodiments.

Embodiments of the present disclosure provide numerous advantages over existing approaches. For example, more content of a PCB design could be setup for auto-simulation and analysis. Coverage of PCB devices analyzed increased to more than 90% for most PCBs. Embodiments included herein allow for re-use of information for circuits stored in a database leading to increased performance. Performance gain is also applicable to pure digital PCBs as well where there may be repeated topologies like a DDR-bus or serial interfaces. Embodiments included herein may operate upon complex circuits and ensures accurate analysis as applied to electrical over-stress analysis of PCB. Due to use of the database, the simulation setup is much more accurate as against estimated Pulse inputs derived out of IO buffers of digital ICs FIG. 60 illustrates a block diagram of an illustrative computing system 500 suitable for power-grid aware simulation of an IC-Package schematic as described in the preceding paragraphs with reference to various figures. Computer system 500 includes a bus 506 or other communication mechanism for communicating information, which interconnects subsystems and devices, such as processor 507, system memory 508 (e.g., RAM), static storage device 509 (e.g., ROM), disk drive 510 (e.g., magnetic or optical), communication interface 514 (e.g., modem or Ethernet card), display 511 (e.g., CRT or LCD), input device 512 (e.g., keyboard), and cursor control (not shown).

According to one embodiment, computing system 500 performs specific operations by one or more processor or processor cores 507 executing one or more sequences of one or more instructions contained in system memory 508. Such instructions may be read into system memory 508 from another computer readable/usable storage medium, such as static storage device 509 or disk drive 510. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 507, where the one or more processors, one or more processor cores, or combination thereof executes one or more threads. For example, various acts of identifying, various acts of determining, various acts of classifying, various acts of implementing, various acts of performing, various acts of transforming, various acts of decomposing, various acts of updating, various acts of presenting, various acts of modifying, etc. may be performed by one or more processors, one or more processor cores, or combination thereof.

A mechanisms described herein may also be implemented as a pure hardware module (e.g., a block of electronic circuit components, electrical circuitry, etc.) or a combination of a hardware module and a software block that jointly perform various tasks to achieve various functions or purposes described herein or equivalents thereof. For example, a mechanism described herein may be implemented as an application-specific integrated circuit (ASIC) in some embodiments.

In these embodiments, a mechanism may thus include, for example, a microprocessor or a processor core and other supportive electrical circuitry to perform specific functions which may be coded as software or hard coded as a part of an application-specific integrated circuit, ROM (read only memory), PROM (programmable read only memory), EPROM (erasable programmable read only memory), etc. despite the fact that these microprocessor, processor core, and electrical circuitry may nevertheless be shared among a plurality of mechanism. A mechanism described herein or an equivalent thereof may perform its respective functions alone or in conjunction with one or more other mechanisms. A mechanism described herein or an equivalent thereof may thus invoke one or more other mechanisms by, for example, issuing one or more commands or function calls. The invocation of one or more other mechanisms may be fully automated or may involve one or more user inputs.

The term "computer readable storage medium" or "computer usable storage medium" as used herein refers to any non-transitory medium that participates in providing instructions to processor 507 for execution. Such a medium may take many forms, including but not limited to, non-volatile media and volatile media. Non-volatile media includes, for example, optical or magnetic disks, such as disk drive 510. Volatile media includes dynamic memory, such as system memory 508. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 500. According to other embodiments of the invention, two or more computer systems 500 coupled by communication link 515 (e.g., LAN, PTSN, or wireless network) may perform the sequence of instructions required to practice the invention in coordination with one another.

Computer system 500 may transmit and receive messages, data, and instructions, including program, e.g., application code, through communication link 515 and communication interface 514. Received program code may be executed by processor 507 as it is received, and/or stored in disk drive 510, or other non-volatile storage for later execution. In an embodiment, the computing system 500 operates in conjunction with a data storage system 531, e.g., a data storage system 531 that includes a database 532 that is readily accessible by the computing system 500. The computing system 500 communicates with the data storage system 531 through a data interface 533. A data interface 533, which is coupled with the bus 506, transmits and receives electrical, electromagnetic or optical signals that include data streams representing various types of signal information, e.g., instructions, messages and data. In embodiments of the invention, the functions of the data interface 533 may be performed by the communication interface 514. It also should be appreciated that the computer system 500 may be extended to a cloud-based computing system.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer-implemented method for use in an electronic design environment comprising:
   receiving, using at least one processor, a printed circuit board schematic by accessing at least one schematic design database and one or more electronic circuits by accessing at least one electronic circuit design specification database;
   automatically generating, one or more circuit templates based upon, at least in part, the printed circuit board schematic and one or more electronic circuits;
   storing the one or more circuit templates at an electronic design database;
   receiving a current printed circuit board schematic; and
   automatically determining whether a subcircuit of the current printed circuit board schematic is an exact or approximate match with the one or more circuit templates.

2. The computer-implemented method of claim 1, further comprising:
   separating the current printed circuit board schematic into a plurality of simulateable circuits.

3. The computer-implemented method of claim 2, further comprising:
   returning a matched template with one or more stimulus or load setup parameters.

4. The computer-implemented method of claim 3, wherein the parameters include at least one of input port information, output port information, stimulus type, load type, power nets, and type of power to be applied.

5. The computer-implemented method of claim 3, further comprising:
   simulating the current printed circuit board schematic with the matched template.

6. The computer-implemented method of claim 1, wherein automatically determining is based upon, at least in part, one or more of a component candidate list and a net candidate list.

7. The computer-implemented method claim 1, further comprising:
   representing the one or more electronic circuits as a connection matrix and a netlist.

8. The computer-implemented method claim 6, further comprising:
   performing iterative filtering of at least one of the component candidate list and the net candidate list.

9. The computer-implemented method claim 1, further comprising:
   automatically adding a new subcircuit from the current printed circuit board schematic to the electronic design database.

10. A non-transitory computer-readable storage medium having stored thereon instructions that when executed by a machine result in the following operations:
    receiving, using at least one processor, a printed circuit board schematic by accessing at least one schematic design database and one or more electronic circuits by accessing at least one electronic circuit design specification database;
    automatically generating, one or more circuit templates based upon, at least in part, the printed circuit board schematic and one or more electronic circuits;
    storing the one or more circuit templates at an electronic design database;
    receiving a current printed circuit board schematic; and
    determining whether a subcircuit of the current printed circuit board schematic is an exact or approximate match with the one or more circuit templates.

11. The non-transitory computer-readable storage medium of claim 10, further comprising:
    separating the current printed circuit board schematic into a plurality of simulateable circuits.

12. The non-transitory computer-readable storage medium of claim 11, further comprising:
    returning a matched template with one or more stimulus or load setup parameters.

13. The non-transitory computer-readable storage medium of claim 12, wherein the parameters include at least one of input port information, output port information, stimulus type, load type, power nets, and type of power to be applied.

14. The non-transitory computer-readable storage medium of claim 12, further comprising:
    simulating the current printed circuit board schematic with the matched template.

15. The non-transitory computer-readable storage medium of claim 10, wherein determining is based upon, at least in part, one or more of a component candidate list and a net candidate list.

16. The non-transitory computer-readable storage medium of claim 15, further comprising:
    representing the one or more electronic circuits as a connection matrix and a netlist.

17. The non-transitory computer-readable storage medium of claim 16, further comprising:
    performing iterative filtering of at least one of the component candidate list and the net candidate list.

18. The non-transitory computer-readable storage medium of claim 10, further comprising:
    automatically adding a new subcircuit from the current printed circuit board schematic to the electronic design database.

19. A system for use in an electronic design environment comprising:
    a computing device having at least one processor configured to receive, using at least one processor, a printed circuit board schematic by accessing at least one schematic design database and one or more electronic circuits by accessing at least one electronic circuit design specification database, the at least one processor is further configured to automatically generate one or more circuit templates based upon, at least in part, the printed circuit board schematic and one or more electronic circuits, the at least one processor is further configured to store the one or more circuit templates at an electronic design database, the at least one processor further configured to receive a current printed circuit board schematic and automatically determine whether a subcircuit of the current printed circuit board schematic is an exact or approximate match with the one or more circuit templates.

20. The system of claim 19, wherein the at least one processor is further configured to separate the current printed circuit board schematic into a plurality of simulateable circuits.

\* \* \* \* \*